United States Patent
Tran et al.

(10) Patent No.: US 9,414,004 B2
(45) Date of Patent: Aug. 9, 2016

(54) METHOD FOR COMBINING VOICE SIGNALS TO FORM A CONTINUOUS CONVERSATION IN PERFORMING A VOICE SEARCH

(71) Applicant: The DIRECTV Group, Inc., El Segundo, CA (US)

(72) Inventors: Huy Q. Tran, Westminster, CA (US); Vlad Zarney, Calabasas, CA (US); Kapil Chaudhry, Cerritos, CA (US); Douglas T. Kuriki, Brea, CA (US); Todd T. Tran, West Covina, CA (US); David K. Homan, Torrance, CA (US); An T. Lam, Alhambra, CA (US); Michael E. Yan, Redondo Beach, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 229 days.

(21) Appl. No.: 13/832,924

(22) Filed: Mar. 15, 2013

(65) Prior Publication Data
US 2014/0244686 A1   Aug. 28, 2014

Related U.S. Application Data

(60) Provisional application No. 61/768,163, filed on Feb. 22, 2013.

(51) Int. Cl.
*G06F 17/30* (2006.01)
*H04N 5/44* (2011.01)
(Continued)

(52) U.S. Cl.
CPC .............. *H04N 5/4403* (2013.01); *G06F 3/165* (2013.01); *G06F 17/30654* (2013.01);
(Continued)

(58) Field of Classification Search
CPC .................. G06F 17/30448; G06F 15/17306; G06F 3/167; G06F 17/30976; G06F 17/30755; G06F 17/30654; G10L 15/22; G10L 15/063; G10L 15/1822; G10L 2015/0638; G10L 15/26; G10L 15/30; H04N 21/6143; H04N 5/4403; H04N 21/2221; H04N 21/42204; H04N 21/432; H04N 21/4394; H04N 21/4828; H04N 2005/4428; H04N 21/4126; G08C 2201/31
USPC ......... 707/775, 705, 736, 737, 767, 728, 755, 707/E17.058, E17.014, E17.065; 704/275, 704/201, 235, 246, 251, 270.1, 260, 704/E11.001; 455/414.1, 3.02, 3.05, 563, 455/564; 709/204, 226, 212, 217, 220, 229, 709/246, 248, 249; 725/87, 110, 13, 14, 20, 725/53, 46; 726/9, 3, 6, 7; 713/158, 156, 713/173
See application file for complete search history.

(56) References Cited

U.S. PATENT DOCUMENTS 5,127,055 A     6/1992  Larkey
5,195,086 A  *  3/1993  Baumgartner et al. ........ 370/264
(Continued)

FOREIGN PATENT DOCUMENTS

EP   1207452 A2   5/2002

OTHER PUBLICATIONS

Doug Beeferman et al.—"'Your Word is my Command": Google Search by Voice: A Case Study"—Chapter Advances in Speech Recognition—pp. 61-90—Date: Aug. 13, 2010.*
(Continued)

*Primary Examiner* — Anh Ly
(74) *Attorney, Agent, or Firm* — Harness, Dickey & Pierce, P.L.C.

(57) ABSTRACT

A system and method for operating the same includes a conversation manager that receives a receiving a first search request and, after receiving the first search request, receives a second search request. The system also includes a classifier module within the conversation manager classifying the first search request relative to the second search request as related or not related. A context merger module within the classifier module combines the first search request and the second search request to form a merged search request. A search module performs a second search based on the merged search request.

38 Claims, 38 Drawing Sheets

(51) Int. Cl.

| | | |
|---|---|---|
| *G10L 15/22* | (2006.01) | |
| *H04N 21/422* | (2011.01) | |
| *H04N 21/439* | (2011.01) | |
| *H04N 21/482* | (2011.01) | |
| *H04N 21/41* | (2011.01) | |
| *H04N 21/4147* | (2011.01) | |
| *H04N 21/433* | (2011.01) | |
| *H04N 21/4722* | (2011.01) | |
| *H04N 21/488* | (2011.01) | |
| *H04N 21/61* | (2011.01) | |
| *G06F 3/16* | (2006.01) | |
| *G08C 17/02* | (2006.01) | |
| *H04N 21/4415* | (2011.01) | |
| *H04N 21/475* | (2011.01) | |
| *G10L 15/26* | (2006.01) | |
| *G10L 15/06* | (2013.01) | |
| *G10L 15/30* | (2013.01) | |
| *H04N 21/458* | (2011.01) | |
| *H04N 21/472* | (2011.01) | |
| *H04N 21/222* | (2011.01) | |

(52) U.S. Cl.
CPC ... *G06F 17/30755* (2013.01); *G06F 17/30976* (2013.01); *G08C 17/02* (2013.01); *G10L 15/22* (2013.01); *G10L 15/26* (2013.01); *H04N 21/4126* (2013.01); *H04N 21/4147* (2013.01); *H04N 21/4222* (2013.01); *H04N 21/42203* (2013.01); *H04N 21/42204* (2013.01); *H04N 21/42207* (2013.01); *H04N 21/42209* (2013.01); *H04N 21/42222* (2013.01); *H04N 21/42224* (2013.01); *H04N 21/4334* (2013.01); *H04N 21/4394* (2013.01); *H04N 21/4398* (2013.01); *H04N 21/4415* (2013.01); *H04N 21/475* (2013.01); *H04N 21/4722* (2013.01); *H04N 21/4753* (2013.01); *H04N 21/47214* (2013.01); *H04N 21/4828* (2013.01); *H04N 21/4882* (2013.01); *H04N 21/6143* (2013.01); *H04N 21/6175* (2013.01); *G08C 2201/31* (2013.01); *G10L 15/063* (2013.01); *G10L 15/30* (2013.01); *G10L 2015/0638* (2013.01); *H04N 21/2221* (2013.01); *H04N 21/4583* (2013.01); *H04N 21/47211* (2013.01); *H04N 2005/4428* (2013.01)

(56) References Cited

U.S. PATENT DOCUMENTS

| | | | |
|---|---|---|---|
| 5,222,234 A * | 6/1993 | Wang | G06F 17/30011 707/999.003 |
| 6,377,793 B1 | 4/2002 | Jenkins | |
| 6,470,306 B1 | 10/2002 | Pringle et al. | |
| 6,574,624 B1 | 6/2003 | Johnson et al. | |
| 6,636,831 B1 | 10/2003 | Profit et al. | |
| 7,308,484 B1 | 12/2007 | Dodrill et al. | |
| 7,676,026 B1 | 3/2010 | Baxter, Jr. | |
| 8,131,548 B2 | 3/2012 | Blass et al. | |
| 8,315,878 B1 | 11/2012 | Burns et al. | |
| 8,983,299 B2 | 3/2015 | Lee et al. | |
| 2002/0049899 A1 | 4/2002 | Kenworthy | |
| 2002/0052746 A1 | 5/2002 | Handelman | |
| 2002/0069059 A1* | 6/2002 | Smith | G10L 15/193 704/257 |
| 2002/0177435 A1 | 11/2002 | Jenkins | |
| 2003/0004728 A1 | 1/2003 | Keiller | |
| 2004/0054539 A1 | 3/2004 | Simpson | |
| 2005/0010422 A1 | 1/2005 | Ikeda | |
| 2005/0025127 A1 | 2/2005 | Strathmeyer | |
| 2005/0027539 A1 | 2/2005 | Weber et al. | |
| 2005/0060311 A1* | 3/2005 | Tong et al. | 707/7 |
| 2005/0131698 A1 | 6/2005 | Tischer | |
| 2005/0177568 A1* | 8/2005 | Diamond et al. | 707/5 |
| 2006/0041713 A1* | 2/2006 | Charles et al. | 711/105 |
| 2006/0173682 A1 | 8/2006 | Manabe et al. | |
| 2006/0293897 A1 | 12/2006 | White et al. | |
| 2007/0005370 A1* | 1/2007 | Elshout | 704/275 |
| 2007/0061146 A1 | 3/2007 | Jaramillo et al. | |
| 2007/0150288 A1 | 6/2007 | Wang et al. | |
| 2007/0203887 A1* | 8/2007 | Dynin | 707/3 |
| 2008/0104541 A1 | 5/2008 | McDonald et al. | |
| 2008/0120665 A1 | 5/2008 | Relyea et al. | |
| 2008/0153465 A1* | 6/2008 | Evermann et al. | 455/414.1 |
| 2008/0154608 A1 | 6/2008 | Evermann et al. | |
| 2008/0154611 A1* | 6/2008 | Evermann et al. | 704/275 |
| 2008/0154612 A1* | 6/2008 | Evermann | H04M 1/72522 704/275 |
| 2008/0154870 A1* | 6/2008 | Evermann | G06F 17/30867 707/E17.109 |
| 2008/0239169 A1 | 10/2008 | Moon et al. | |
| 2009/0030681 A1* | 1/2009 | Sureka et al. | 704/235 |
| 2009/0030995 A1 | 1/2009 | Boudreau | |
| 2009/0100182 A1* | 4/2009 | Chaudhry | 709/229 |
| 2009/0112602 A1 | 4/2009 | Alfred et al. | |
| 2009/0112605 A1 | 4/2009 | Gupta | |
| 2009/0144275 A1* | 6/2009 | Fish et al. | 707/5 |
| 2009/0204409 A1 | 8/2009 | Mozer et al. | |
| 2009/0217399 A1* | 8/2009 | Stern et al. | 800/13 |
| 2009/0271399 A1* | 10/2009 | Chaudhry | 707/5 |
| 2009/0287483 A1 | 11/2009 | Co et al. | |
| 2010/0161328 A1 | 6/2010 | Krumel et al. | |
| 2010/0178025 A1 | 7/2010 | Bhogal | |
| 2010/0185445 A1 | 7/2010 | Comerford et al. | |
| 2010/0274786 A1 | 10/2010 | Harris | |
| 2010/0312546 A1* | 12/2010 | Chang | G06N 99/005 704/9 |
| 2010/0313215 A1* | 12/2010 | McCoskey et al. | 725/31 |
| 2010/0323615 A1 | 12/2010 | Vock et al. | |
| 2010/0333163 A1* | 12/2010 | Daly | 725/133 |
| 2011/0040741 A1* | 2/2011 | Korte et al. | 707/706 |
| 2011/0043652 A1 | 2/2011 | King et al. | |
| 2011/0067059 A1 | 3/2011 | Johnston et al. | |
| 2011/0161341 A1 | 6/2011 | Johnston | |
| 2011/0209039 A1 | 8/2011 | Hinckley et al. | |
| 2011/0210816 A1 | 9/2011 | Wang | |
| 2011/0283232 A1 | 11/2011 | Jordan et al. | |
| 2011/0289064 A1 | 11/2011 | Lebeau et al. | |
| 2011/0301943 A1* | 12/2011 | Patch | 704/9 |
| 2012/0036151 A1 | 2/2012 | Jitkoff et al. | |
| 2012/0095958 A1* | 4/2012 | Pereira et al. | 707/609 |
| 2012/0169874 A1 | 7/2012 | Thomas et al. | |
| 2012/0202459 A1 | 8/2012 | Martell | |
| 2012/0316876 A1* | 12/2012 | Jang et al. | 704/246 |
| 2012/0323948 A1* | 12/2012 | Li et al. | 707/765 |
| 2013/0041662 A1 | 2/2013 | Sampathkumaran | |
| 2013/0073293 A1* | 3/2013 | Jang et al. | 704/275 |
| 2013/0080463 A1* | 3/2013 | Yamada | G06F 17/30442 707/769 |
| 2013/0080483 A1* | 3/2013 | Richards | G06F 17/3087 707/803 |
| 2013/0127712 A1* | 5/2013 | Matsubayashi | 345/158 |
| 2013/0262107 A1 | 10/2013 | Bernard | |
| 2013/0297318 A1* | 11/2013 | Balasubramanyam et al. | 704/275 |
| 2013/0312019 A1* | 11/2013 | McMillan | 725/14 |
| 2014/0013275 A1 | 1/2014 | Ochi et al. | |
| 2014/0032220 A1 | 1/2014 | Lerner | |
| 2014/0053209 A1 | 2/2014 | Young et al. | |
| 2014/0058732 A1 | 2/2014 | Labsky et al. | |
| 2014/0082139 A1 | 3/2014 | Shimomoto | |
| 2014/0359523 A1 | 12/2014 | Jang | |

OTHER PUBLICATIONS

Geoffrey Zweig et al.—"Confidence Measures for Voice Search Applications"—Interspeech 2007, pp. 2721-2724, ISCA, Antwerp, Belgium, 2007.*

International Search Report and Written Opinion dated Jun. 12, 2014 in International Application No. PCT/US2014/017849 filed Feb. 21, 2014.

(56) References Cited

OTHER PUBLICATIONS

Shen, Xuehua et al.; "Implicit User Modeling for Personalized Search"; Proceedings of the 14th International Conference on Information and Knowledge Management; CIKM 2005; Bremen, Germany; Oct. 31, 2005-Nov. 5, 2005; pp. 824-831; XP002667629; ACM; New York, New York, US; ISBN: 978-1-59593-140-5; section 4.2; figure 1.

Daoud, Mariam et al.; "A Session Based Personalized Search Using an Ontological User Profile"; ACM Symposium on Applied Computing; Honolulu, Hawaii, US; DOI: 10.1145/1529282.1529670; ISBN: 978-1-60558-166-8; section 2; section 3.

International Search Report and Written Opinion dated Jun. 17, 2014 in International Application No. PCT/US2014/017847 filed Feb. 21, 2014 by Huy Q. Tran et al.

Intenational Search Report and Written Opinion dated Jun. 20, 2014 in International Application No. PCT/US2014/017844 filed Feb. 21, 2014 by Romulo Pontual et al.

Non-final Office action dated Jan. 7, 2015 in U.S. Appl. No. 13/832,745, filed Mar. 15, 2013 by Romulo Pontual et al.

Final Rejection dated May 28, 2015 in U.S. Appl. No. 13/832,745, filed Mar. 15, 2013 by Romulo Pontual et al.

Non-final Office action dated Jun. 10, 2015 in U.S. Appl. No. 13/832,680, filed Mar. 15, 2013 by Romulo Pontual et al.

Final Rejection dated Oct. 28, 2015 in U.S. Appl. No. 13/832,790 filed Mar. 15, 2013 by John M. Han et al.

Non-final Office action dated Jul. 24, 2015 in U.S. Appl. No. 13/832,874, filed Mar. 15, 2013 by Huy Q. Tran et al.

Non-final Office action dated Apr. 22, 2015 in U.S. Appl. No. 13/832,790, filed Mar. 15, 2013 by John M. Han et al.

Final Rejection dated Dec. 8, 2015 in U.S. Appl. No. 13/832,680, filed Mar. 15, 2013 by Romulo Pontual et al.

Final Rejection dated Jan. 21, 2016 in U.S. Appl. No. 13/832,874, filed Mar. 15, 2013 by Huy Q. Tran et al.

Opposition filed by ANTEL (Administracion Nacional de Telecomunicaciones) dated Oct. 24, 2014 in Uruguayan Patent Application No. 35.342 filed Feb. 21, 2014 by Romulo Pontual et al.

Non-final Office action dated Apr. 15, 2016 in U.S. Appl. No. 13/832,745, filed Mar. 15, 2013 by Romulo Pontual et al.

Non-final Office action Apr. 1, 2016 in U.S. Appl. No. 13/832,680, filed Mar. 15, 2013 by Romulo Pontual et al.

\* cited by examiner

| request | verb phrase | count | title | sports team | person | genre | media type | on channel | with description | airing, day, date |
|---|---|---|---|---|---|---|---|---|---|---|
| "Find me dramas about time travel." | I found | 12 results for | | | | dramas | | | with "time travel" | |
| "Find me something to watch tonight." | Here are | 5 results for | | | | | programs | | | airing tonight |
| "Find any comedy movies on HBO." | I found | 10 results for | | | | comedy | movies | | | airing tonight |
| "Find The Godfather with the line about the cannoli." | I found | 1 result for | The Godfather | | | | | | with "the line about the cannoli" | |
| "Find the Tigers game that starts at 1:05 tomorrow." | I found | 2 results for | | Tigers | | | | | | airing at 1:05 pm tomorrow |
| "When are the Pistons playing?" | I found | 1 result for | | Pistons | | | | | | |
| "Find the U of M football game." | I found | 1 result for | | U of M | | | | | | |
| "Find Brad Pitt." | I found | 1 result for | | | Brad Pitt | | | | | |
| "Find me movies with Ben Stiller tomorrow." | I found | 6 results for | | | Ben Stiller | | movies | | | airing tomorrow |
| "Find Claire Danes on HBO." | I found | 10 results for | | | Claire Danes | | | on HBO | | |
| "Find HBO." | I found | 3 results for | | | | | | HBO | | |

FIG. 30

METHOD FOR COMBINING VOICE SIGNALS TO FORM A CONTINUOUS CONVERSATION IN PERFORMING A VOICE SEARCH

CROSS-REFERENCE TO RELATED APPLICATIONS

This application claims the benefit of U.S. Provisional Application No. 61/768,163, filed on Feb. 22, 2013. The disclosure of the above application is incorporated herein by reference.

TECHNICAL FIELD

The present disclosure relates generally to voice controlled operation of an electronic device, and, more specifically, to a method and system for controlling a user receiving device using voice commands to form a continuous conversation.

BACKGROUND

The statements in this section merely provide background information related to the present disclosure and may not constitute prior art.

Television programming content providers are increasingly providing a wide variety of content to consumers. Available content is typically displayed to the user using a grid guide. The grid guide typically includes channels and timeslots as well as programming information for each information timeslot. The programming information may include the content title and other identifiers such as actor information and the like.

Because the number of channels is so great, all of the channels cannot be simultaneously displayed on the screen display. A user can scroll up and down and sideways to see various portions of the program guide for different times and channels. Because of the large number of content titles, and timeslots and channels, is often difficult to decide on a program selection to view.

Providing convenient ways for users to select and find content is useful to content providers. The cell phone industry and computer industry have used voice recognition as an input to control various aspects of a particular device. Mobile phones are now equipped with voice recognition for performing various functions at the mobile device. For example, voice recognition is used to generate emails or fill in various query boxes.

SUMMARY

The present disclosure provides a system and method for controlling a device such as a user receiving device using voice commands.

In one aspect of the disclosure, a method includes converting an audible signal into a textual signal, converting the textual signal into a user receiving device control signal and controlling a function of the user receiving device in response to the user receiving device control signal.

In yet another aspect of the disclosure, a system includes a language processing module converting an electrical signal corresponding to an audible signal into a textual signal. The system further includes a command generation module converting the textual signal into a user receiving device control signal. A controller controlling a function of a user receiving device in response to the user receiving device control signal.

In another aspect of the disclosure, a method includes receiving a plurality of content data at a mobile device comprising a content identifier, displaying a list of entries comprising the plurality of content data, selecting a first content entry from the list and in response to selecting the first content entry, storing a first content identifier corresponding in a bookmark list within the mobile device.

In a further aspect of the disclosure, a mobile device includes a display displaying a list of entries comprising a plurality of content data. Each of the plurality of content data is associated with a content identifier. The mobile device further includes a controller selecting the first content entry and storing a first content identifier corresponding first content entry in a bookmark list within the mobile device.

In yet another aspect of the disclosure a method includes receiving a first voice command, comparing the first voice command to a command library, when a first control command corresponding to the first voice command cannot be determined, storing the first voice command in a temporary set, prompting an second voice command, receiving a second voice command, comparing the second voice command to the command library, determining a second control command corresponding to the second voice command in response to comparing the second voice command to the command library and storing the first voice command in the command library after determining the control command corresponding to the second voice command.

In yet another aspect of the disclosure, a system includes a voice converter converting a first voice command into a first electrical command corresponding to the first voice command and a command library having library contents. A language responsiveness module stores the first electrical command in a temporary set when a first control command cannot be determined from the library contents. A voice prompt module prompts a second voice command and receives the second voice command when the first control command cannot be determined from the library contents. The voice converter converts a second voice command into a second electrical command corresponding to the second voice command. The language responsiveness module compares the second electrical command corresponding to the second voice command to the command library. The language responsiveness module determines a second control command corresponding to the second electrical command in response to comparing the second voice command to the command library and stores the first voice command in the command library after determining the control command corresponding to the second voice command.

In another aspect of the disclosure, a method includes generating a search request text signal, generating search results in response to the search request text signal, determining identified data from the search request text signal, classifying the search request text signal into a response classification associated with a plurality of templates, selecting a first template from the plurality of templates in response to the response classification, correcting the search results in response to the identified data and the template to form a corrected response signal and displaying the corrected response signal.

In yet another aspect of the disclosure, a system includes a language processing module generating a search request text signal and determining identified data from the search request text signal. A search module generates search results in response to the search request text signal. A dialog manager classifies the search request text signal into a response classification associated with a plurality of templates, selects a first template from the plurality of templates in response to the response classification, and corrects search results in response to the identified data and the template to form a corrected response signal. A device receives and displays the corrected response signal.

In yet another aspect of the disclosure, a method includes receiving a first search request, after receiving the first search request, receiving a second search request, classifying the first search request relative to the second search request as related or not related, when the first search request is related to the second search request in response to classifying, combining the first search request and the second search request to form a merged search request and performing a second search based on the merged search request.

In yet another aspect of the disclosure, a system includes a conversation manager that receives a receiving a first search request and, after receiving the first search request, receives a second search request. The system also includes a classifier module within the conversation manager classifying the first search request relative to the second search request as related or not related. A context merger module within the classifier module combines the first search request and the second search request to form a merged search request. A search module performs a second search based on the merged search request.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 30 are examples of dialog templates.

DETAILED DESCRIPTION

Figure 1:
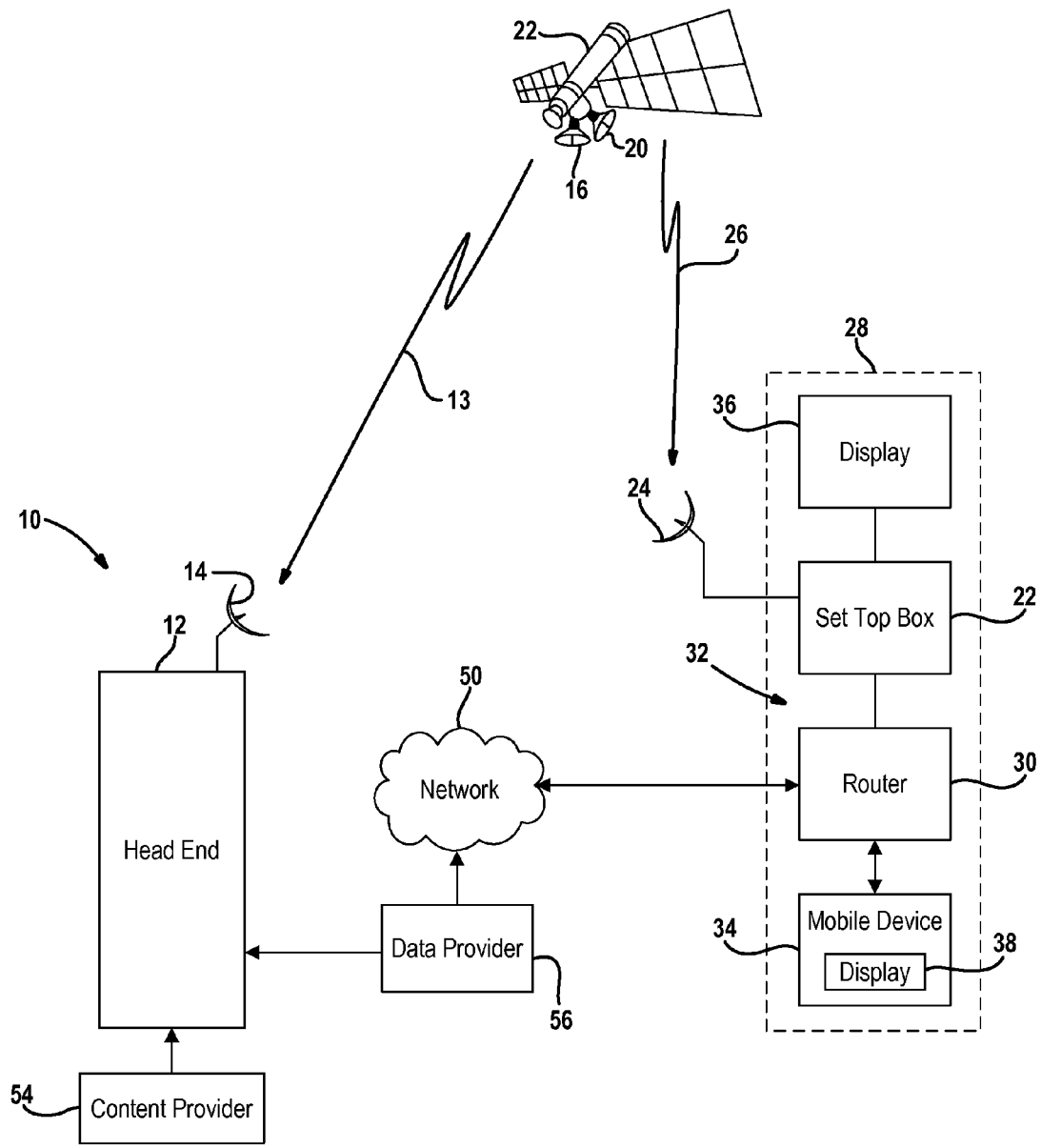
FIG. 1 is a block diagrammatic view of a communication system according to one example of the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie. While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Referring now to FIG. 1, a satellite television broadcasting system 10 is illustrated. The satellite television broadcast system 10 includes a head end 12 that generates wireless signals 13 through an antenna 14 which are received by an antenna 16 of a satellite 18. The wireless signals 13, for example, may be digital. The wireless signals 13 may be referred to as an uplink signal. A transmitting antenna 20 generates downlink signals 26 that are directed to a user receiving device 22. The user receiving device 22 may be located within a building 28 such as a home, multi-unit dwelling or business. The user receiving device 22 is in communication with an antenna 24. The antenna 24 receives downlink signals 26 from the transmitting antenna 20 of the satellite 18. Thus, the user receiving device 22 may be referred to as a satellite television receiving device. However, the system has applicability in non-satellite applications such as a wired or wireless terrestrial system. Therefore the user receiving device may be referred to as a television receiving device. More than one user receiving device 22 may be included within a system or within a building 28. The user receiving devices 22 may be interconnected.

The user receiving device 22 may be in communications with a router 30 that forms a local area network 32 with a mobile device 34. The router 30 may be a wireless router or a wired router or a combination of the two. For example, the user receiving device 22 wired to the router 30 and wirelessly coupled to the mobile device 34. The router 30 may communicate internet protocol (IP) signals to the user receiving device 22. The IP signals may be used for controlling various functions of the user receiving device 22. IP signals may also originate from the user receiving device 22 for communication to other devices such as the mobile device 34 through the router 30. The mobile device 34 may also communicate signals to the user receiving device 22 through the router 30.

The mobile device 34 may be a mobile phone, tablet computer, laptop computer or any other type of computing device.

The user receiving device 22 includes a screen display 36 associated therewith. The display 36 may be a television or other type of monitor. The display 36 may display both video signals and audio signals.

The mobile device 34 may also have a display 38 associated therewith. The display 38 may also display video and audio signals. The display 38 may be integrated into the mobile device. The display 38 may also be a touch screen that acts as at least one user interface. Other types of user interfaces on the mobile devices may include buttons and switches.

The user receiving device 22 may be in communication with the head end 12 through an external network or simply, network 50. The network 50 may be one type of network or multiple types of networks. The network 50 may, for example, be a public switched telephone network, the internet, a mobile telephone network or other type of network. The network 50 may be in communication with the user receiving device 22 through the router 30. The network 50 may also be in communication with the mobile device 34 through the router 30. Of course, the network 50 may be in direct communication with the mobile device 34 such as in a cellular setting.

The system 10 may also include a content provider 54 that provides content to the head end 12. The head end 12 is used for distributing the content through the satellite 18 or the network 50 to the user receiving device 22.

A data provider 56 may also provide data to the head end 12. The data provider 56 may provide various types of data such as schedule data or metadata that is provided within the program guide system. The metadata may include various descriptions, actor, director, star ratings, titles, user ratings, television or motion picture parental guidance ratings, descriptions, related descriptions and various other types of data. The data provider 56 may provide the data directly to the head end and may also provide data to various devices such as the mobile device 34 and the user receiving device 22 through the network 50. This may be performed in a direct manner through the network 50.

Figure 2:
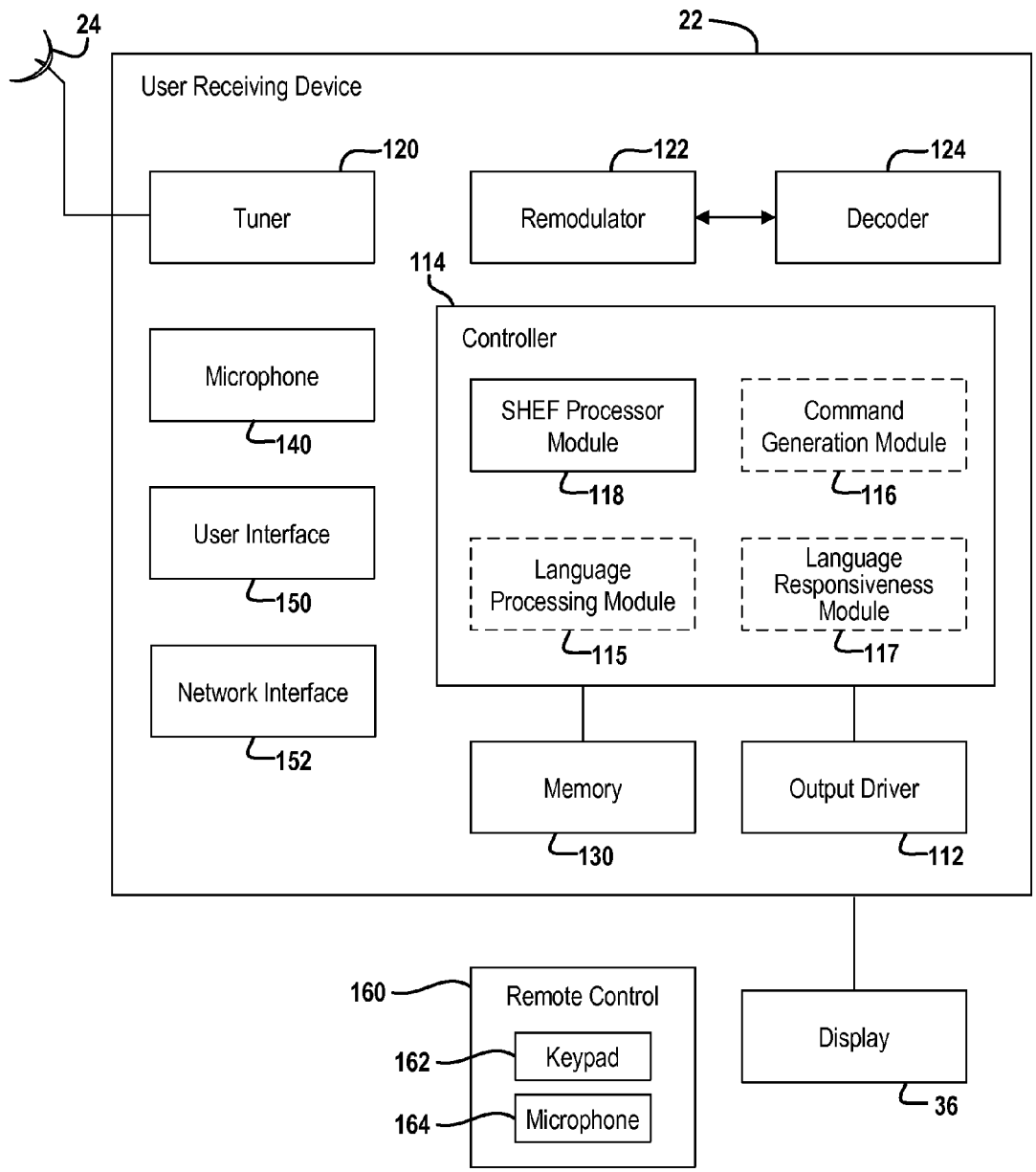
FIG. 2 is a block diagrammatic view of a user receiving device according to one example of the present disclosure.

Referring now to FIG. 2, a user receiving device 22, such as a set top box is illustrated in further detail. Although, a particular configuration of the user receiving device 22 is illustrated, it is merely representative of various electronic devices with an internal controller used as a content receiving device. The antenna 24 may be one of a number of different types of antennas that includes one or more low noise blocks. The antenna 24 may be a single antenna 24 used for satellite television reception. The user receiving device 22 is in communication with the display 36. The display 110 may have an output driver 112 within the user receiving device 22.

A controller 114 may be a general processor such as a microprocessor that cooperates with control software. The controller 114 may be used to coordinate and control the various functions of the user receiving device 22. These functions may include a tuner 120, a demodulator 122, a decoder 124 such as a forward error correction decoder and any buffer or other functions. The controller 114 may also be used to control various function of the user receiving device 22.

The controller 114 may also include one or more of a language processing module 115, a command generation module 116, a language responsiveness module 117 and a set-top box HTTP export functionality (SHEF) processor module 118. Each of these modules is an optional feature of the user receiving device 22. As will be described below the functions associated with each of the modules 115-118 may be performed in the user receiving device or one of the other devices such as the head end or the mobile device or a combination of the three. The modules 115-118 may be located remotely from each other and may also be stand-alone devices or vendors on the network 50. In general, the language processing module 115 converts electrical signals that correspond to audible signals into a textual format or textual signal. The command generation module 116 determines a user receiving device control command that corresponds with the textual signal. The language responsiveness module 117 is used to train the system to recognize various commands.

The SHEF processor module 118 is used to receive SHEF commands and translate the SHEF commands into actual control signals within the user receiving device. Various types of SHEF commands for controlling various aspects of the user receiving device may be performed. The SHEF processor module 118 translates the hypertext transfer protocol signals received through the network into control signals within the user receiving device 22.

The tuner 120 receives the signal or data from the individual channel. The tuner 120 may receive television programming content, program guide data or other types of data. The demodulator 122 demodulates the signal or data to form a demodulated signal or data. The decoder 124 decodes the demodulated signal to form decoded data or a decoded signal. The controller 114 may be similar to that found in current DIRECTV® set top boxes which uses a chip-based multi-functional controller. Although only one tuner 120, one demodulator 122 and one decoder 124 are illustrated, multiple tuners, demodulators and decoders may be provided within a single user receiving device 22.

The controller 114 is in communication with a memory 130. The memory 130 is illustrated as a single box with multiple boxes therein. The memory 130 may actually be a plurality of different types of memory including the hard drive, a flash drive and various other types of memory. The different boxes represented in the memory 130 may be other types of memory or sections of different types of memory. The memory 130 may be non-volatile memory or volatile memory.

The memory 130 may include storage for content data and various operational data collected during operation of the user receiving device 22. The memory 130 may also include advanced program guide (APG) data. The program guide data may include various amounts of data including two or more weeks of program guide data. The program guide data may be communicated in various manners including through the satellite 18 of FIG. 1. The program guide data may include a content or program identifiers, and various data objects corresponding thereto. The program guide may include program characteristics for each program content. The program characteristic may include ratings, categories, actor, director, writer, content identifier and producer data. The data may also include various other settings.

The memory 130 may also include a digital video recorder. The digital video recorder 132 may be a hard drive, flash drive, or other memory device. A record of the content stored in the digital video recorder 132 is a playlist. The playlist may be stored in the DVR 132 or a separate memory as illustrated.

The user receiving device 22 may include a voice converter such as a microphone 140 in communication with the controller 114. The microphone 140 receives audible signals and converts the audible signals into corresponding electrical signals. Typically, this is done through the use of a transducer or the like. The electrical signal corresponding to the audible may be communicated to the controller 114. The microphone 140 is an optional feature and may not be included in some examples as will be described in detail below. The electrical signal may also be process in a remotely located language processing module. Thus, the controller 114 may convert the electrical signal into a ".wav" file or other suitable file type suitable for communication through a network 50.

The user receiving device 22 may also include a user interface 150. The user interface 150 may be various types or combinations of various types of user interfaces such as but not limited to a keyboard, push buttons, a touch screen or a remote control. The user interface 150 may be used to select a channel, select various information, change the volume, change the display appearance, or other functions. The user interface 150 may be used for generating a selection signal for selecting content or data on the display 38.

A network interface 152 may be included within the user receiving device 22 to communicate various data through the network 50 illustrated above. The network interface 152 may be a WiFi, WiMax, WiMax mobile, wireless, cellular, or other types of communication systems. The network interface 152 may use various protocols for communication therethrough including, but not limited to, hypertext transfer protocol (HTTP).

A remote control device 160 may be used as a user interface for communicating control signals to the user receiving device 22. The remote control device may include a keypad 162 for generating key signals that are communicated to the user receiving device 22. The remote control device may also include a microphone 164 used for receiving an audible signal and converting the audible signal to an electrical signal. The electrical signal may be communicated to the user receiving device 22.

Figure 3:
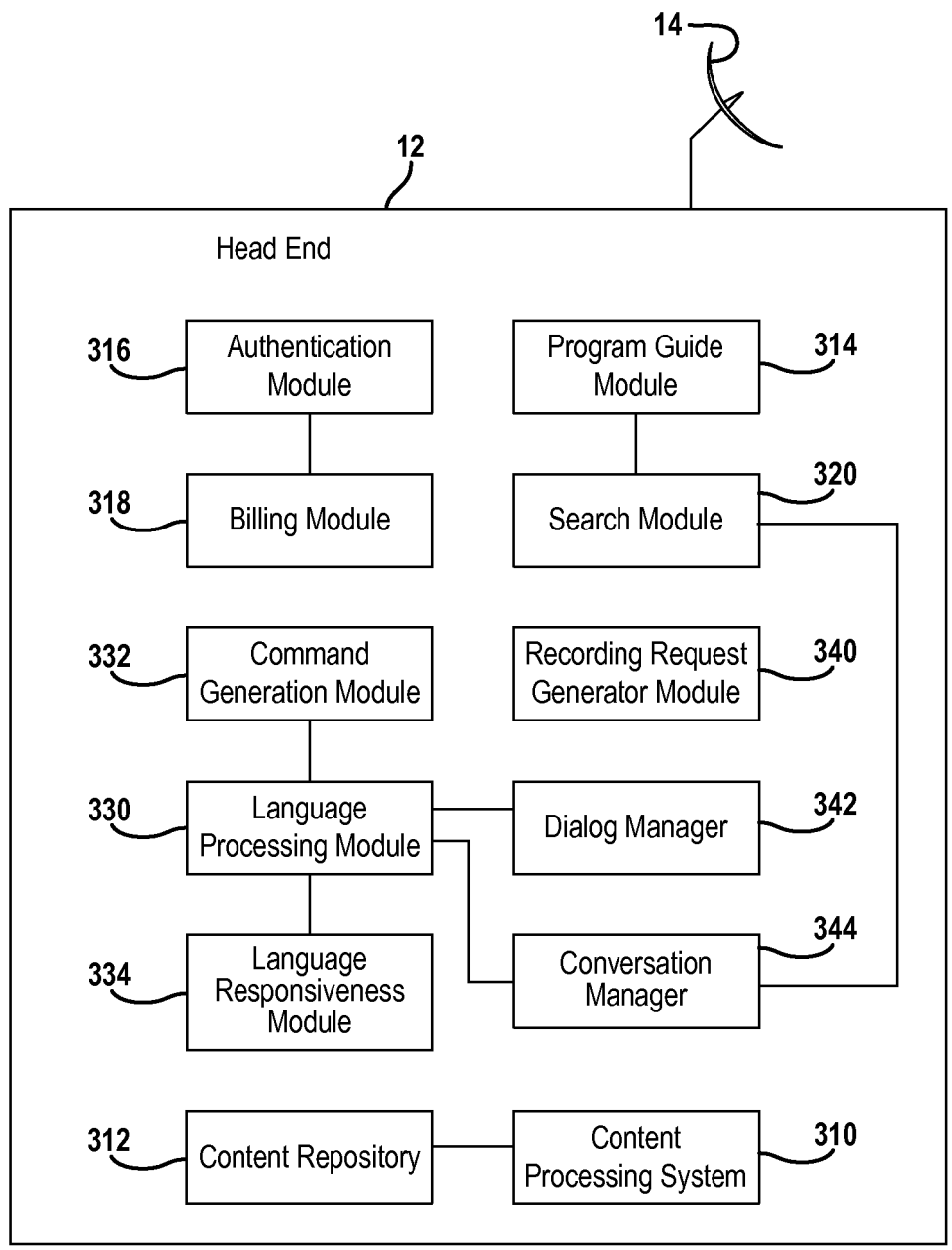
FIG. 3 is a block diagram of a head end according to one example of the present disclosure.

Referring now to FIG. 3, the head end 12 is illustrated in further detail. The head end 12 may include various modules for intercommunicating with the mobile device 34 and the user receiving device 22 illustrated in FIG. 1. Only a limited number of interconnections of the modules are illustrated in the head end 12 for drawing simplicity. Other interconnections may, of course, be present in a constructed embodiment. The head end 12 receives content from the content provider 54 illustrated in FIG. 1. A content processing 310 processes the content for communication through the satellite 18. The content processing system 310 may communicate live content as well as recorded content. The content processing system 310 may be coupled to a content repository 312 for storing content therein. The content repository 312 may store and process On-Demand or Pay-Per-View content for distribution at various times. The Pay-Per-View content may be broadcasted in a linear fashion (at a predetermined time according to a predetermined schedule). The content repository 312 may also store On-Demand content therein. On-Demand content is content that is broadcasted at the request of a user receiving device and may occur at any time (not on a predetermined schedule). On-Demand content is referred to as non-linear content.

The head end 12 also includes a program guide module 314. The program guide module 314 communicates program guide data to the user receiving device 22 illustrated in FIG. 1.

The program guide module 314 may create various objects that are communicated with various types of data therein. The program guide module 314 may, for example, include schedule data, various types of descriptions for the content and content identifier that uniquely identifies each content item. The program guide module 314, in a typical system, communicates up to two weeks of advanced guide data to the user receiving devices. The guide data includes tuning data such as time of broadcast, end time, channel, and transponder to name a few.

An authentication module 316 may be used to authenticate various user receiving devices and mobile devices that communicate with the head end 12. The authentication module 316 may be in communication with a billing module 318. The billing module 318 may provide data as to subscriptions and various authorizations suitable for the user receiving devices and the mobile devices that interact with the head end. The authentication module 316 ultimately permits the user receiving devices and mobile devices to communicate with the head end 12.

A search module 320 may also be included within the head end 12. The search module 320 may receive a search query from various devices such as a mobile device or user receiving device. The search module 320 may communicate search results to one of the user receiving device or the mobile device. The search module 320 may interface with the program guide module 314 or the content processing system 310 or both to determine search result data.

The head end 12 may also include a language processing module 330. The language processing module 330 may be used to generate text signals from electrical signals that correspond to audible signals received through the network 50 from a mobile device 34 or user receiving device 22 illustrated in FIG. 1. The language processing module 330 may also be or include a voice converter. The language processing module 330 may communicate the text signals to a command generation module 332. The command generation module 332 generates a user receiving device control command that corresponds to the textual signal generated by the language processing module 330. The command generation module may include various variations that correspond to a particular command. That is, people speak in various ways throughout the country and various regions. Accents and other language anomalies may be taken into consideration within the command generation module 332. Details of this will be described further below.

The head end 12 may also include a language responsiveness module 334 that is used to improve the responsiveness of the language processing module 330 and the command generation module 332. The language responsiveness module 334 is a learning mechanism used to recognize various synonyms for various commands and associate various synonyms with various commands. The details of the language responsiveness module 334 will be described in greater detail below.

The head end 12 may also include a recording request generator module 340. Various signals may be communicated from a mobile device 34 illustrated in FIG. 1 or another networked type computing device. A request to generate a recording may be communicated to the head end 12 and ultimately communicated to the user receiving device 22. The recording request may include a user receiving device identifier and a time to initiate recording. Other data that may be included in the recording request may include a channel, a transponder, a start time, an end time, a content delivery network identifier such as an IP address and various other types of identifiers that allow the user receiving device 22 to tune and record the desired content.

The head end 12 may also include a dialog manager 42. The dialog manager 42 is used to generate a corrected text response such as a sentence in response to a search request. The corrected text response may be a grammatically corrected text response. The grammatically correct text response may be based on a classification that is derived from the received text of the original audible signal. The grammatically correct text response may also be provided in a voice signal that may be played back at the receiving device. An audible signal may be useful in a mobile device where text may not easily be reviewed without being distracted from other tasks. As will be described below, templates may be used in the dialog manager based upon identified data from the original audible request. The output of the dialog manager 342, because of the grammatical correctness, may be easily be read and understood by the user of the device to which the results are returned.

The head end 12 may also include a conversation manager 344. The conversation manager is used to determine whether a second search request is related to a previous first search request. As will be mentioned in detail below, the conversation manager 344 determines whether intents or mentions within the search request are related. The conversation manager starts a new context when the second search is not related to the first search.

The search module 320, language processing module 330, the command generation module 332, the language responsiveness module 334, the dialog manager 342 and the conversation manager 344 are illustrated by way of example for convenience within the head end 12. As those skilled in the art will recognize, these modules 320-342 may also be located in various other locations together or remote to/from each other including outside the head end 12. The network 50 may be used to communicate with modules 320-342 located outside the head end 12.

Figure 4:
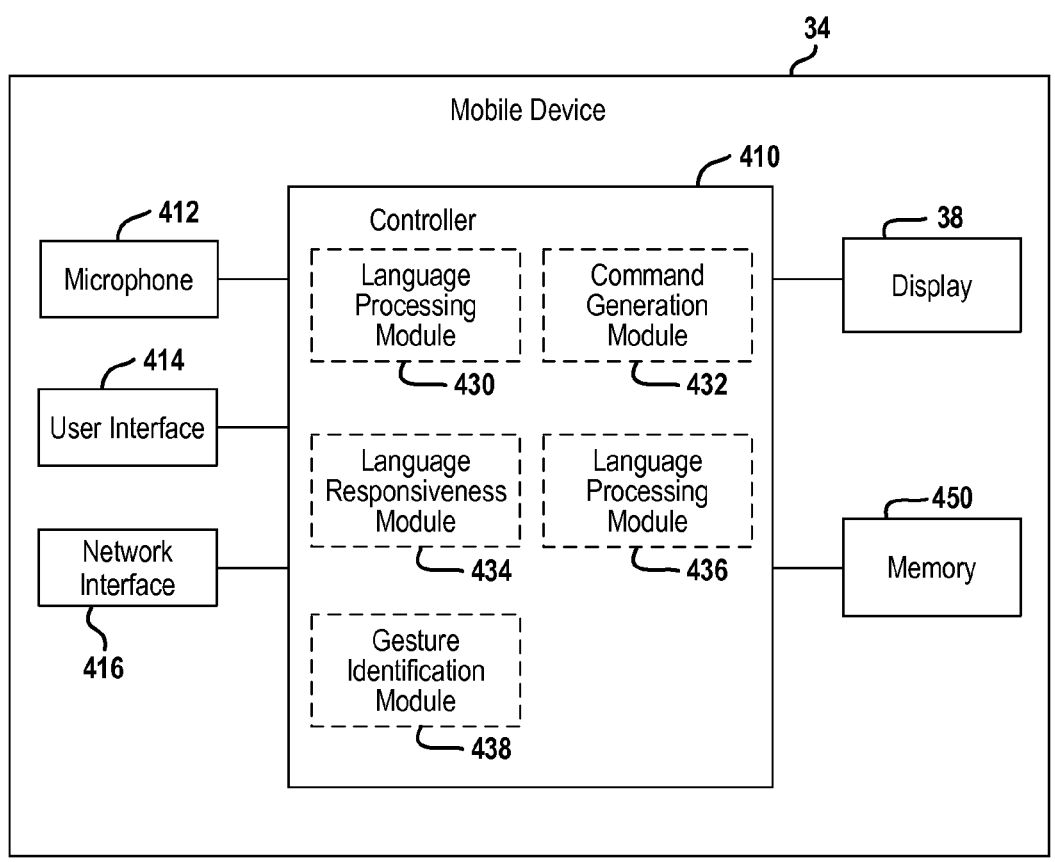
FIG. 4 is a mobile device according to one example of the present disclosure.

Referring now to FIG. 4, the mobile device 34 is illustrated in further detail. The mobile device 34 includes a controller 410 that controls the various functions therein. The controller 410 is in communication with a microphone 412 that receives audible signals and converts the audible signals into electrical signals.

The controller 410 is also in communication with a user interface 414. The user interface 414 may be buttons, input switches or a touch screen.

A network interface 416 is also in communication with the controller 410. The network interface 416 may be used to interface with the network 50. As mentioned above, the network 50 may be a wireless network or the internet. The network interface 416 may communicate with a cellular system or with the internet or both. A network identifier may be attached to or associated with each communication from the mobile device so that a determination may be made by another device as to whether the mobile device and the user receiving device are in the same local area network.

The controller 410 may also be in communication with the display 38 described above in FIG. 1.

The controller 410 may also include a language processing module 430, a command generation module 432 and a language processing module 434. Modules 430, 432 and 434 are optional components. That is, command generation and language responsiveness may be performed in remote locations such as external to the mobile device. Each of the head end 12, the user receiving device 22 or the mobile device 34 may optionally include one or more language processing module, command generation module or language responsiveness module. Also, as mentioned above, none of the devices may include the modules. Rather, the modules may be interconnected with the network 50 without residing in the head end, the user receiving device or the mobile device. Variations of this will be provided in the example set forth below.

A recommendation engine 436 may also be included within the controller 410. The recommendation engine 436 may have various data that is stored in a memory 450 of the mobile device 34. For example, selected content, content for which further data was sought, recorded content may all be stored within the memory 450. The recommendation engine 436 may provide recommendations obtained whose content data or metadata has been obtained from the head end 12. The recommendations may be tailored to the interests of the user of the mobile device.

The controller 410 may also include a gesture identification module 438 that identifies gestures performed on the display 438. For example, the gestures may be a move of dragging the user's finger up, down, sideways or holding in a location for a predetermined amount of time.

Figure 5:
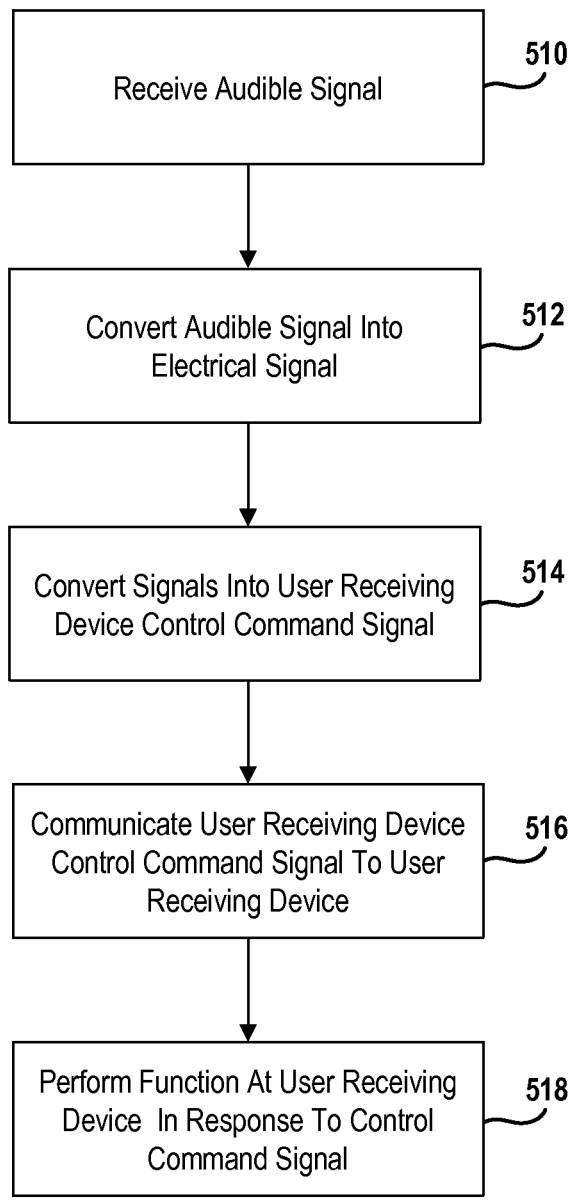
FIG. 5 is a flow chart of a high level example of controlling a user receiving device using voice recognition.

Referring now to FIG. 5, one example of a method for controlling a user receiving device such as a set top box is set forth. In step 510, an audible signal is generated by a user and received at a device. The audible signal may be received in a microphone. The audible signal is converted into an electrical signal that corresponds to the audible signal in step 512. The electrical signal may be a text signal, the words of which correspond to the words received in the spoken or audible signal. Steps 510 and 512 may be performed in the mobile device 34, the user receiving device 22 or the head end 12 illustrated in FIG. 1.

In step 514 the electrical signal that corresponds to the audible signal is converted into a user receiving device control command such as a SHEF command described above. Again, this function may be performed in the user receiving device 22, the mobile device 34 or the head end illustrated in FIG. 1. Of course, the signals may be communicated from one module to another through described above. Further, the conversion of the electrical signal may be performed in an external or remote module that is in communication with the network 50.

In step 516, the user receiving device control command signal is communicated to the user receiving device if the control command signal is not generated at the user receiving device. The control command signal may be in an IP format. The control command signal may be one of a number of predetermined types of control command signals that the user receiving device recognizes and performs various functions in response thereto. One example of a control command is the set top box HTTP exported functionality (SHEF) signal described above.

In step 518, a function is performed at the user receiving device in response to the control command signal. Various functions may be performed at the user receiving device including DVR functionalities such as obtaining play lists, tuning to different channels, requesting detailed program data, playing back content stored within the DVR, tuning to various channels, performing functions usually reserved for the remote control, changing the display of the user receiving device to display searched content that was searched for on the mobile device and other functions.

Figure 6:
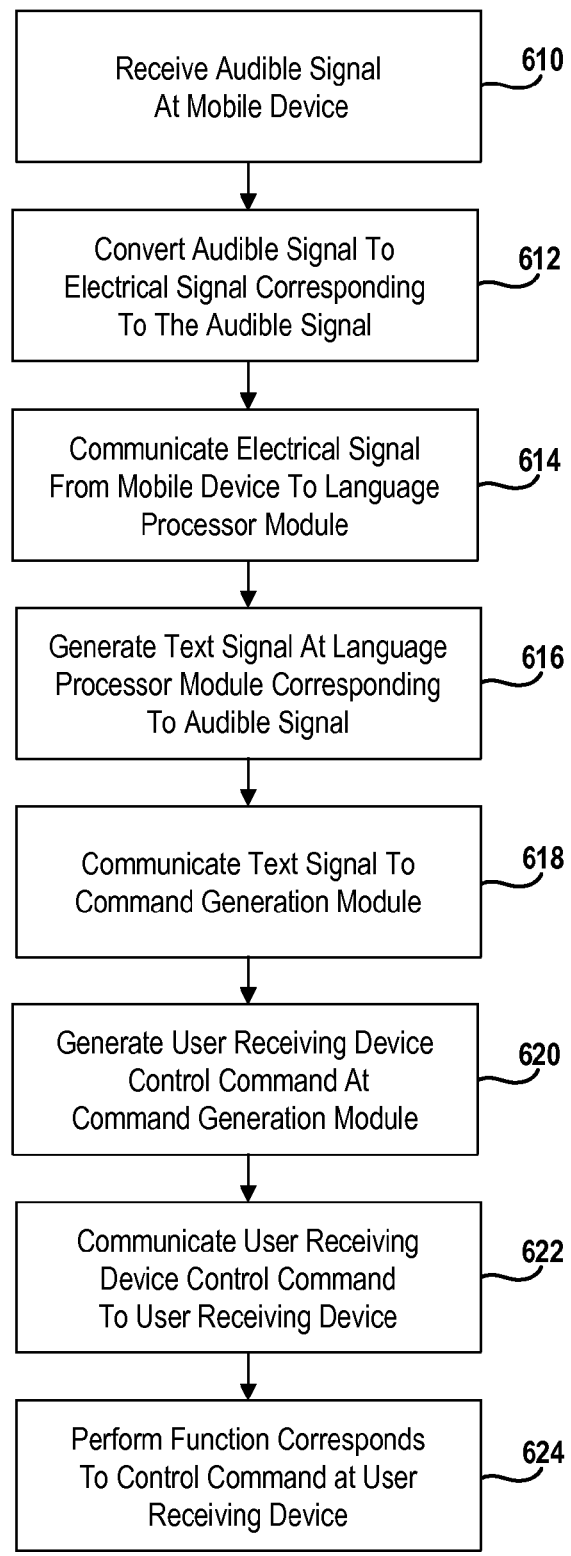
FIG. 6 is a detailed flow chart of a method for controlling the user receiving device according to a second example of the disclosure.

Referring now to FIG. 6, another example of operating a system according to the present disclosure is set forth. In this example, the mobile device is used to receive the audible signal from the user in step 610. The mobile device may be a mobile phone, tablet or other computing device with a microphone or other sound receiving system. In step 612 the audible signal is converted into an electrical signal. The signal may be saved in a file format such as a digital file format. In step 614 the electrical signal corresponding to the audible signal is communicated from the mobile device to a language processor module. The language processor module may be a remote module outside of the mobile device and also outside of the user receiving device. The language processor module may also be outside of the head end in a remote location. In one example, the language processor module may be a third party language processor vendor.

In step 616 a text signal is generated at the language processor module that corresponds to the audible signal. The words in the text signal correspond to the words spoken by the user from the audible signal. Voice recognition is used in this process. The text signal comprises words that are recognized from the electrical signal received at the language processor vendor. In step 618 the text signal is communicated to a command generation module. In this example, the command generation module is located separately from the language processor module. These elements may, however, be located at the same physical location. The command generation module may also be located at a separate location such as a standalone web service or a web service located within the head end. It is also possible for the command generation module to be located in the user receiving device or the mobile device. In step 620 a user receiving device control command is determined based on the text signal at the command generation module. Various methods may be used for correlating a particular text signal with a command. Fuzzy logic or other types of logic may be used in this process. Various spoken words may be interpreted to coordinate with actual commands. For example, "show me movies" may generate a search for currently showing movies. Thus more than one voice command may be used to obtain the same user receiving device control command.

In step 622 the user receiving device control command is communicated to the user receiving device. The user receiving device control command may be communicated through the local area network to the user receiving device. In one example, when the mobile device is not located within the same local area network, the user receiving device control command may not be sent to or used to control the user receiving device. The control command may be sent wirelessly or through a wire. That is, a wireless signal may be communicated to the router that corresponds to the user receiving device control command. The user receiving device control command may then be routed either wirelessly or through a wire to the user receiving device.

In step 624 the user receiving device receives the user receiving device control command and performs a function that corresponds to the control command. In this example the SHEF processor module 118 located within the controller 114 of the user receiving device 22 illustrated in FIG. 2 may perform this function. Various functions include but are not limited to tuning to a particular channel, recording a particular content, changing display functions or one of the other types of functions mentioned above.

Figure 7:
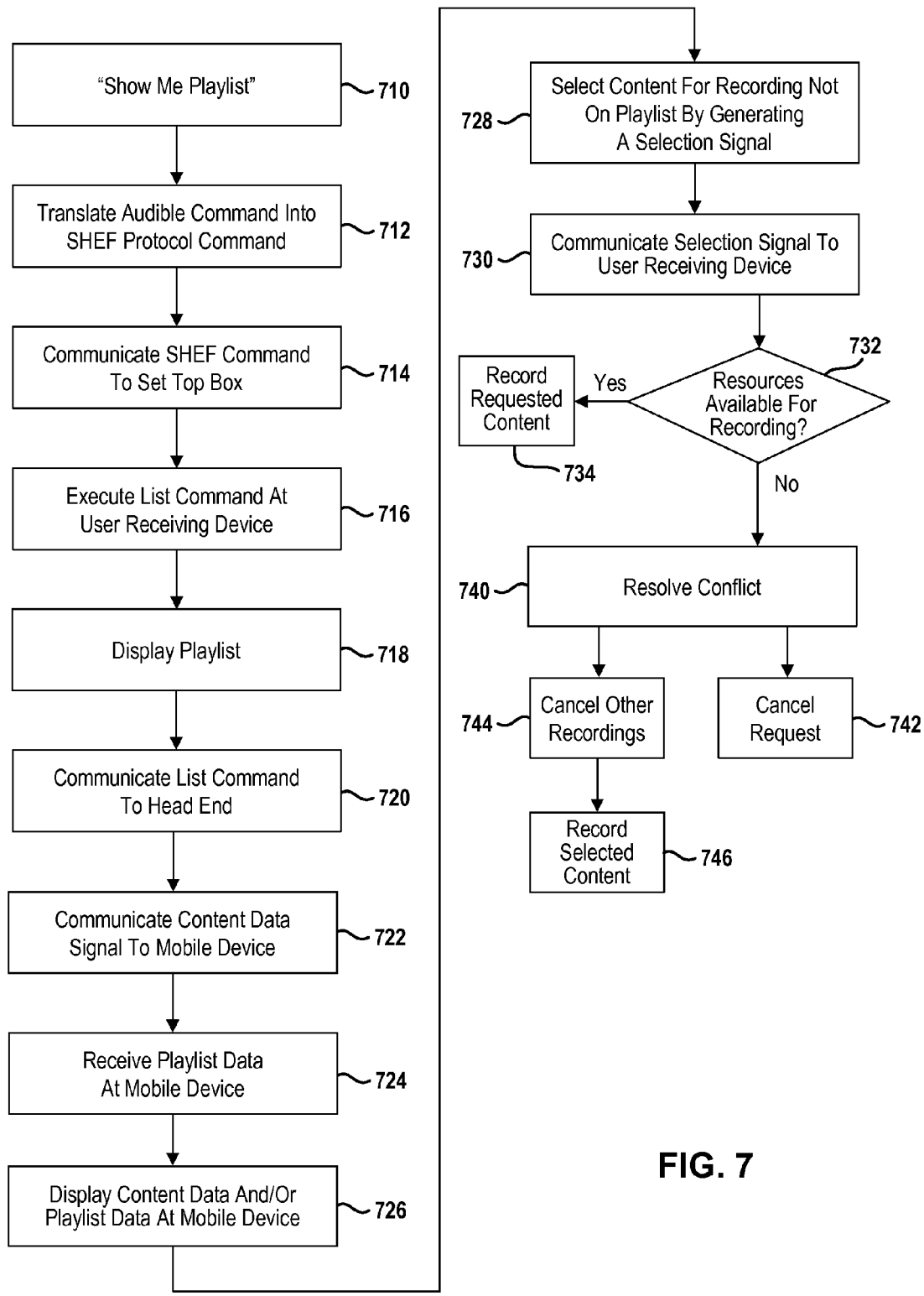
FIG. 7 is a flow chart of a detailed example for controlling a user receiving device and resolving a conflict within the user receiving device.

Referring now to FIG. 7, another specific example of interaction between a mobile device and user receiving device is set forth. In step 710 an audible signal is received at the mobile device. In this example, "show me playlist" was the audible signal received from the user. In step 712 the audible command is communicated into SHEF protocol in the manner described above in FIGS. 5 and 6. In step 714, the SHEF command is communicated to the user receiving device.

In step 716 the user receiving device receives the SHEF command signal and executes the "list" command at the user receiving device. In step 718 the play list stored within the user receiving device is retrieved from the memory and displayed on the display associated with the user receiving device. The playlist is the list of content stored in the user receiving device available for immediate playback from the video recorder.

The system may also be interactive with the mobile device. That is, the list command or some form thereof may be communicated to the head end. In step 722 content data is retrieved from the head end and communicated through a content data signal to the mobile device. The content data signal may comprise metadata that describes content that is available from the head end. A content identifier, title, channel and the like may be included in the control data. The content available may be different than the content within the playlist. That is, the head end may suggest alternatives or related programs corresponding to the play list data.

In step 724 the play list from the user receiving device may be received at the mobile device. In step 726 the content data and/or play list data is displayed at the mobile device. That is, both the play list data and the data received from the head end may be displayed on the mobile device display. The play list data may be scrolled and during scrolling the play list data on the display associated with the user receiving device may also be scrolled. The scrolling on the display of the user receiving device may be commanded by SHEF commands.

In step 728 a selection signal is generated at the mobile device for content not on the play list, in this example. The selection signal may include a content identifier unique to the particular content. In step 730 the selection signal is communicated to the user receiving device. This may also be done with a SHEF command corresponding to recording the selected content. In step 732 the controller of the user receiving device determines whether resources are available for recording. If resources are available for recording the requested content is recorded or booked for recording.

In step 732 when there are not available resources for recording step 740 resolves the conflict. The conflict may be resolved by communicating a resolution signal from the user receiving device to the mobile device. The resolution signal may query the user whether to cancel the current request in step 742 or cancel another recording in step 744. A screen display may be generated on the display associated with the mobile device that generates a query as to the desired course of action. When a cancellation of another recording is selected, a SHEF command corresponding to cancelling a request is communicated to the user receiving device. After a content recording is cancelled, step 746 records the selected content corresponding to the selection signal at the user receiving device.

Figure 8:
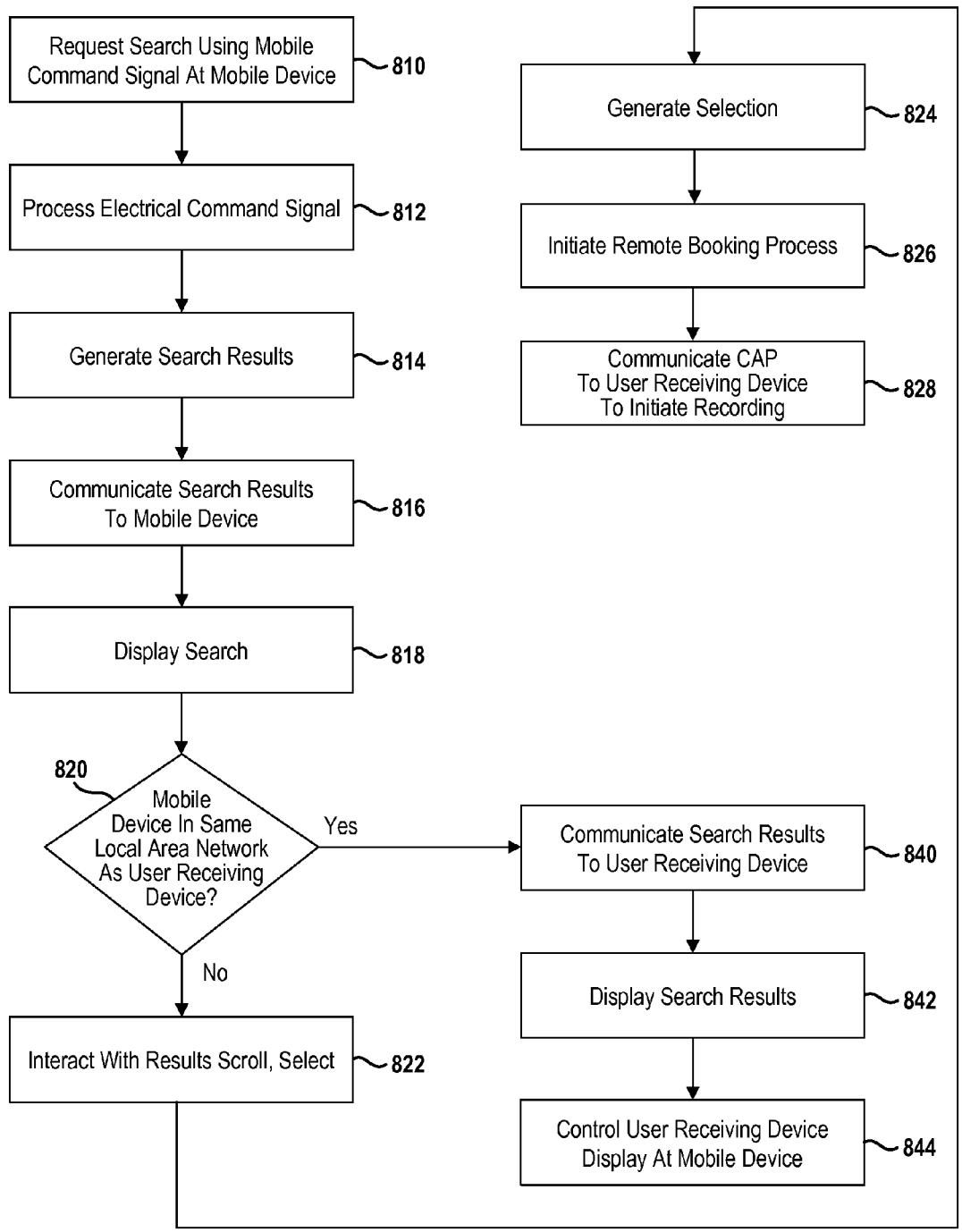
FIG. 8 is a flow chart of a method for interacting with content.

Referring now to FIG. 8, another request for searching is generated. In step 810 a request for a particular type of content is generated using an audible command. In step 812 the electrical command signal is generated and processed as described above in the previous figures. It should be noted that control of the user receiving device may be performed is in the local area network. Network identifiers may be associated with the signals exchanged. In step 814 search results are generated from the head end in response to the voice recognized signal. In step 816 the search results are communicated to the mobile device. In step 818 the search results are displayed at the mobile device. In step 820 the determination of whether the mobile device is in the same local area network as the user receiving device is determined by comparing the network identifier in the exchanged signals. If the mobile device is not in the same local network as the user receiving device, step 822 allows the mobile device to interact with the results, scroll and select various content. But only on the screen of the mobile device. Once a content selection signal is generated in step 824, step 826 initiates a remote booking process in which a conditional access packet is generated and communicated to the user receiving device by way of the satellite or network in step 828. The conditional access packet commands the user receiving device to record the content at a predetermined time, for a predetermined time and at a predetermined channel. Other data may also be included within the conditional access packet.

Referring back to step 820, the mobile device may communicate the search results to the user receiving device in step 840 when the mobile device is in the same local area network as the user receiving device. This may be performed using a SHEF command as described above. The content of the SHEF command may include the search results received at the mobile device. In step 842 the search results received through the SHEF command are displayed on the display associated with the user receiving device. In step 844 the user receiving device display is controlled using the mobile device. That is, as the user scrolls through the returned results, the user receiving device display also scrolls through the results. Thus, swiping actions and tapping actions at the mobile device are communicated to the user receiving device for control of the screen display. Again, these commands may be SHEF commands. A selection signal communicated from the mobile device to the user receiving device may allow the user to tune or record the selected content using the appropriate SHEF command.

Figure 9:
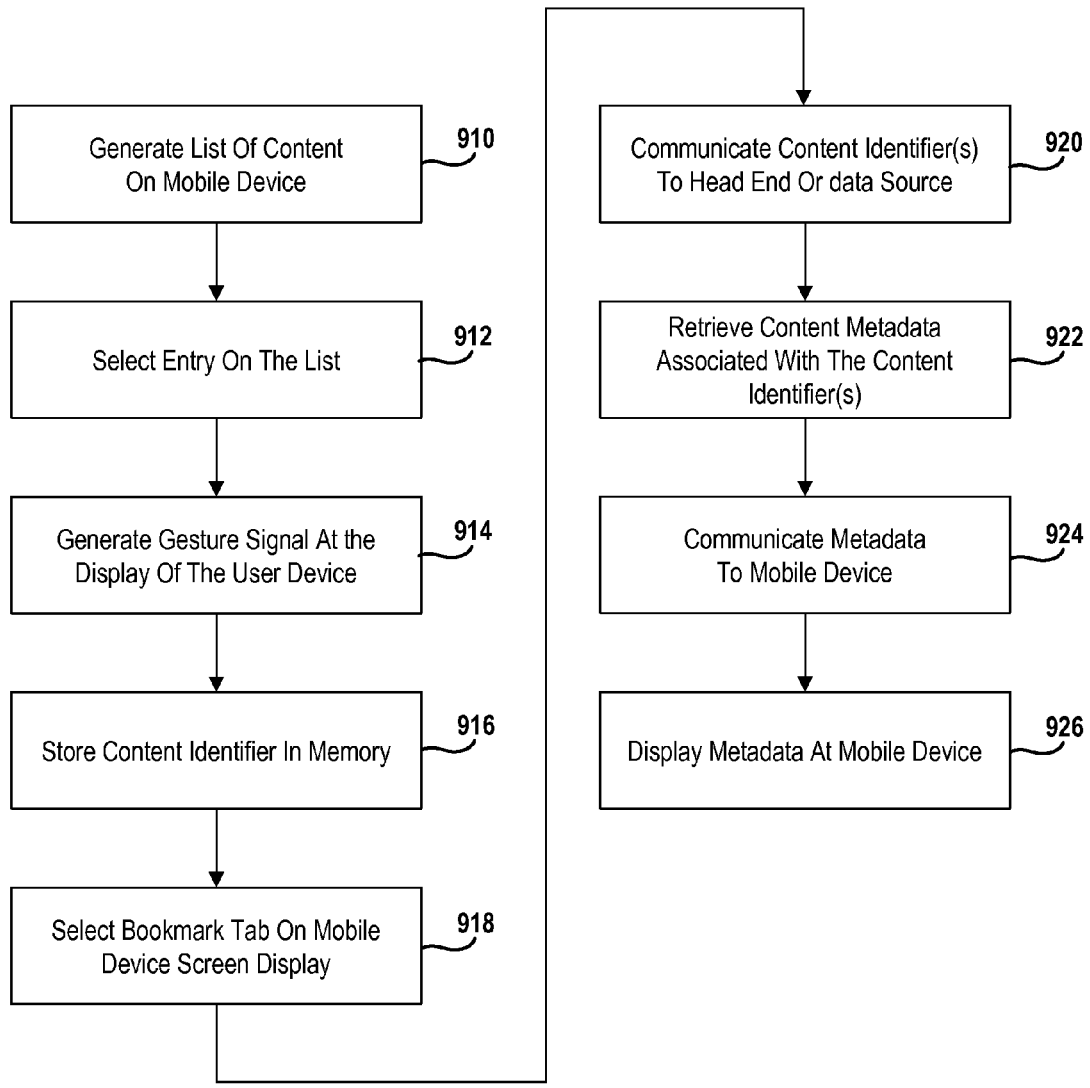
FIG. 9 is a flow chart of a method for bookmarking content at the mobile device.

Referring now to FIG. 9, a specific example of interacting with the mobile device is set forth. In step 910 a list of content is displayed on the display of the mobile device. The process for doing so was set forth immediately above. The list may be arranged alphabetically or in order of airtime. That is earlier airtimes are displayed first and later airtimes later in the list. Each list entry has a content identifier associated therewith which may not be displayed. In step 912 an entry on the list is selected by tapping the entry on the screen of the mobile device. It may be desirable to bookmark the title within the user receiving device for later interaction, such as, reviewing further information or recording the content. From the initial position of selecting a move is performed on the screen display such as moving a finger in an upward direction to generate a movement or gesture signal. In step 916 the movement or gesture is interpreted as a desire to bookmark the content. In step 916 content identifier associated with the selected content is stored in the user receiving device. The number of content titles available for bookmarking may be limited. In one example ten titles are allowed to be bookmarked. In step 918 to review data about the bookmarks a bookmark tab is selected on the mobile device screen display.

By selecting the bookmark tab the content identifier or identifiers associated with the bookmark may be communicated to the head end. The may also be done in response to the selection of one of the content titles associated with the content identifier. The content identifiers may be communicated to a head end or another data source such as an external data source operated by a third party or vendor associated with the content provider. In step 922 content metadata corresponding to the content identifier or identifiers is retrieved from the data source. In step 924 the metadata is communicated to the mobile device. In step 926 the metadata is displayed at the mobile device. After displaying of the metadata, further metadata may be requested in a similar manner to that set forth above. Further, other interactions with the metadata may include a recording function or tuning function for the content. Both of these processes were described in detail above.

Figure 10:
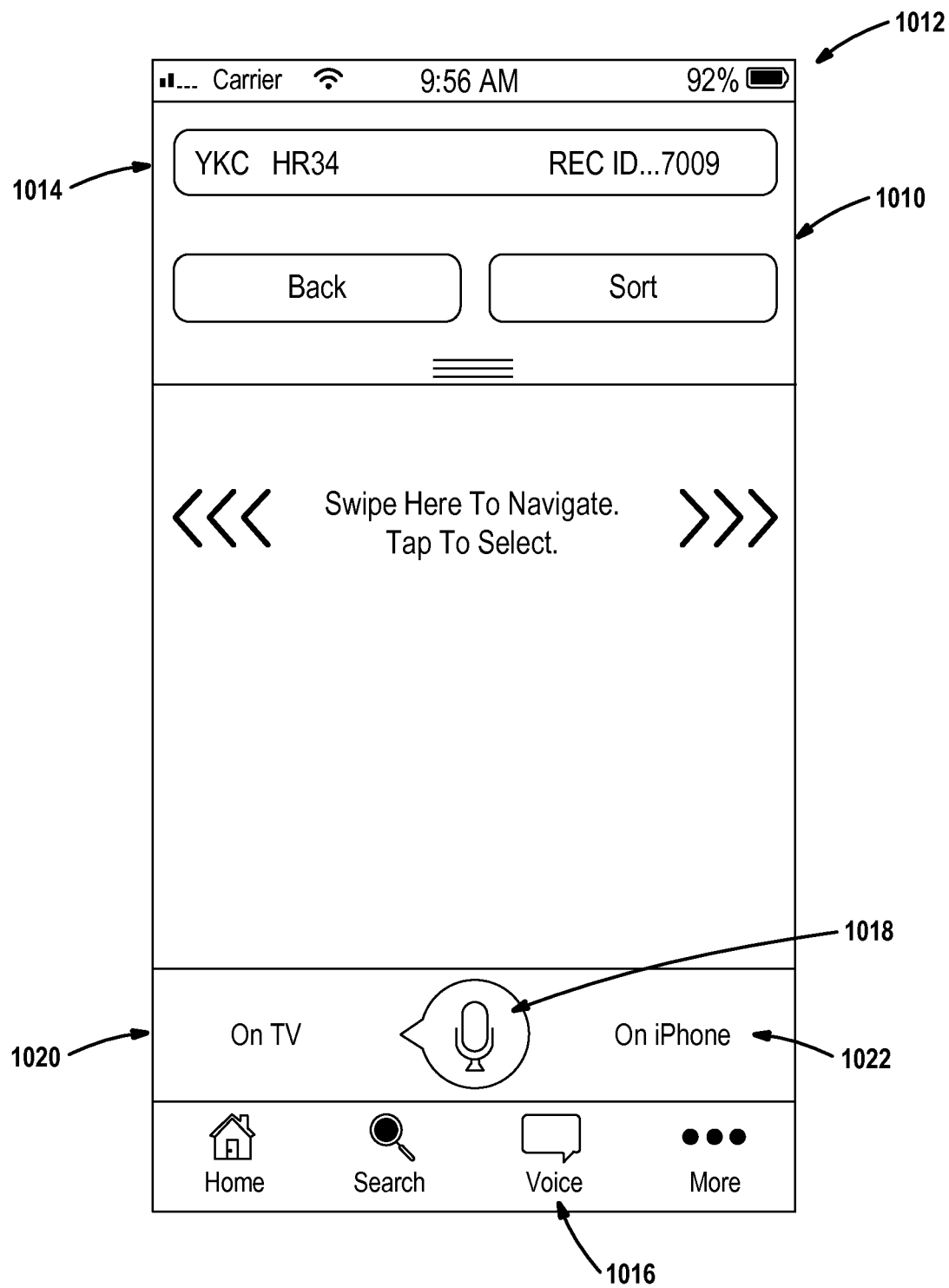
FIG. 10 is a screen display of a mobile device with a voice command interface.

Referring now to FIG. 10, a screen display 1010 for a mobile device is illustrated. In this example, phone data 1012 is displayed at the top of the phone in a conventional manner. In this example the signal strength, the carrier, the cellular signal strength, the time and battery life are illustrated. Of course, the actual displayed phone data may vary by design.

When the mobile device is connected on the same network as the user receiving device a user receiving device identifier 1014 is displayed. The type of box and a receiver identifier may be generated. Rather than a numerical identifier, a word identifier such as "family room" may be displayed. Various other selections may also be provided to the user on the display 1010. For example, a voice selection has been selected in the present example using the voice icon 1016. By selecting the voice icon 1016, voice commands and various choices about the voice commands are set forth. In this example a microphone icon 1018 is generated on the screen display.

Indicators or selectors 1020 and 1022 are generated to either select or indicate that the phone and the user receiving device are connected. Indicator 1020 may be selected so that the screen display may be also displayed on the user receiving device when in the same network. If the user desires not to have the screen display of the mobile device displayed on the user receiving device or when the user receiving device and the mobile device are not in the same local area network indicator 1022 may indicate to illustrate that the phone and the user receiving device are not interconnected.

Figure 11:
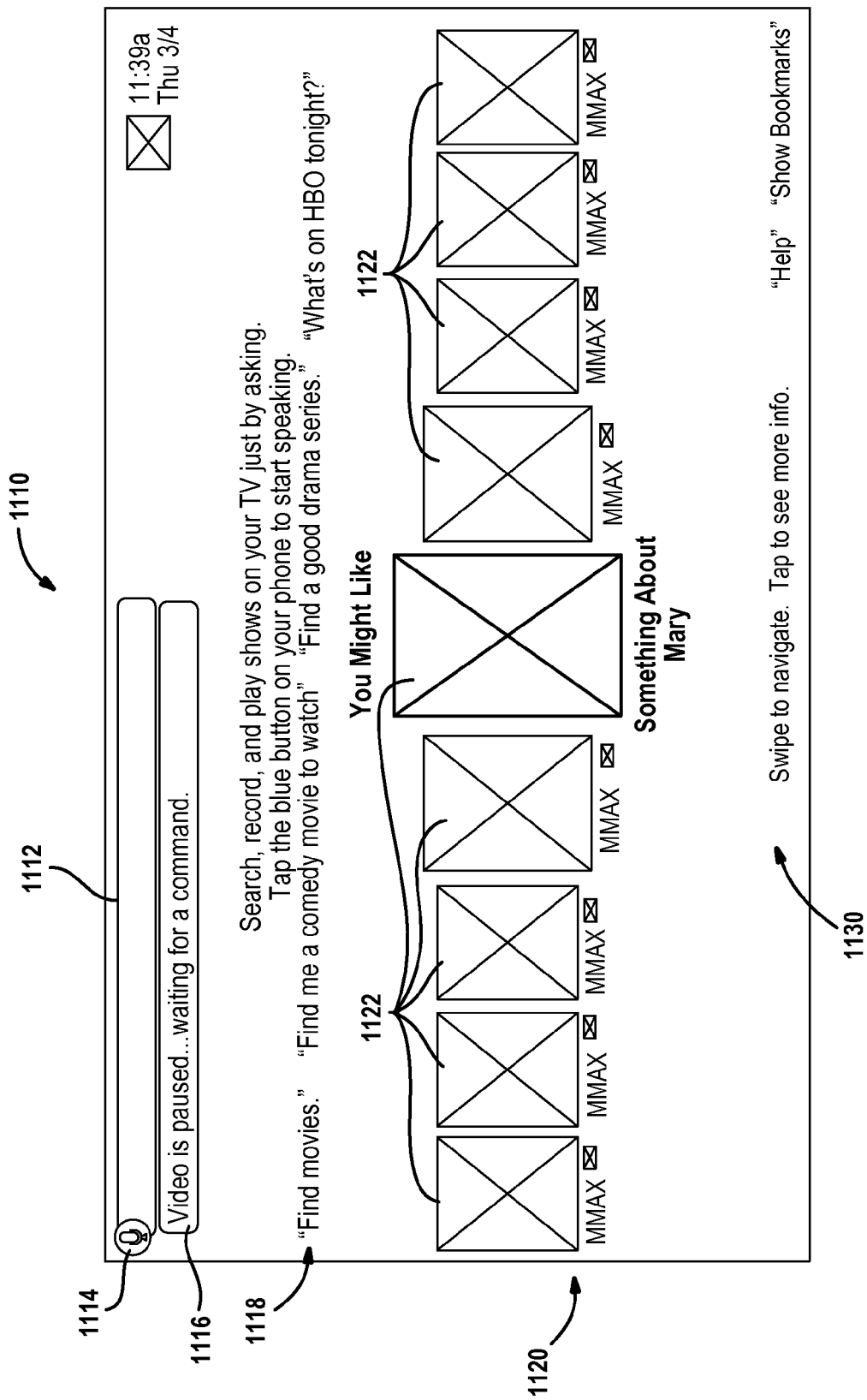
FIG. 11 is a screen display of a default screen for a voice command system.

Referring now to FIG. 11, one example of a screen display 1110 of a landing screen is illustrated. A text box 1112 is displayed at blank in this example. To select or input a voice command the microphone icon 1114 is selected. A status box 1116 indicates the status of the system. In this example "video is paused . . . waiting for a command" has been selected. This indicates that the device is waiting for a voice command to be input. The icon 1114 may also be animated or colored in a different color to indicate that a voice command is expected. The status box 1116 may provide an interpretation of the received voice command converted into text. An example area 1118 provides examples of suitable voice commands. Of course, as described further below, various voice commands outside of the "normal" example voice commands may still be used to control the user receiving device or the screen display of the mobile device.

A recommendations area 1120 may also be generated on the screen display 1110. In this example, nine posters 1122 are illustrated. Each poster may comprise a graphic image corresponding to the particular content. Each poster 1122 may also include a channel call sign 1124. Although only nine posters are displayed, several posters may be provided by swiping the screen right or left. The posters 1122 may be referred to as a "you might like" section on the screen display.

An instruction area 1130 may also be generated on the screen display. The instruction area may provide various instructions to the user such as swipe to navigate, "tap to see more information", "help" and "show bookmarks." By tapping on one of the instruction areas further instructions may be provided to the user.

Figure 12:
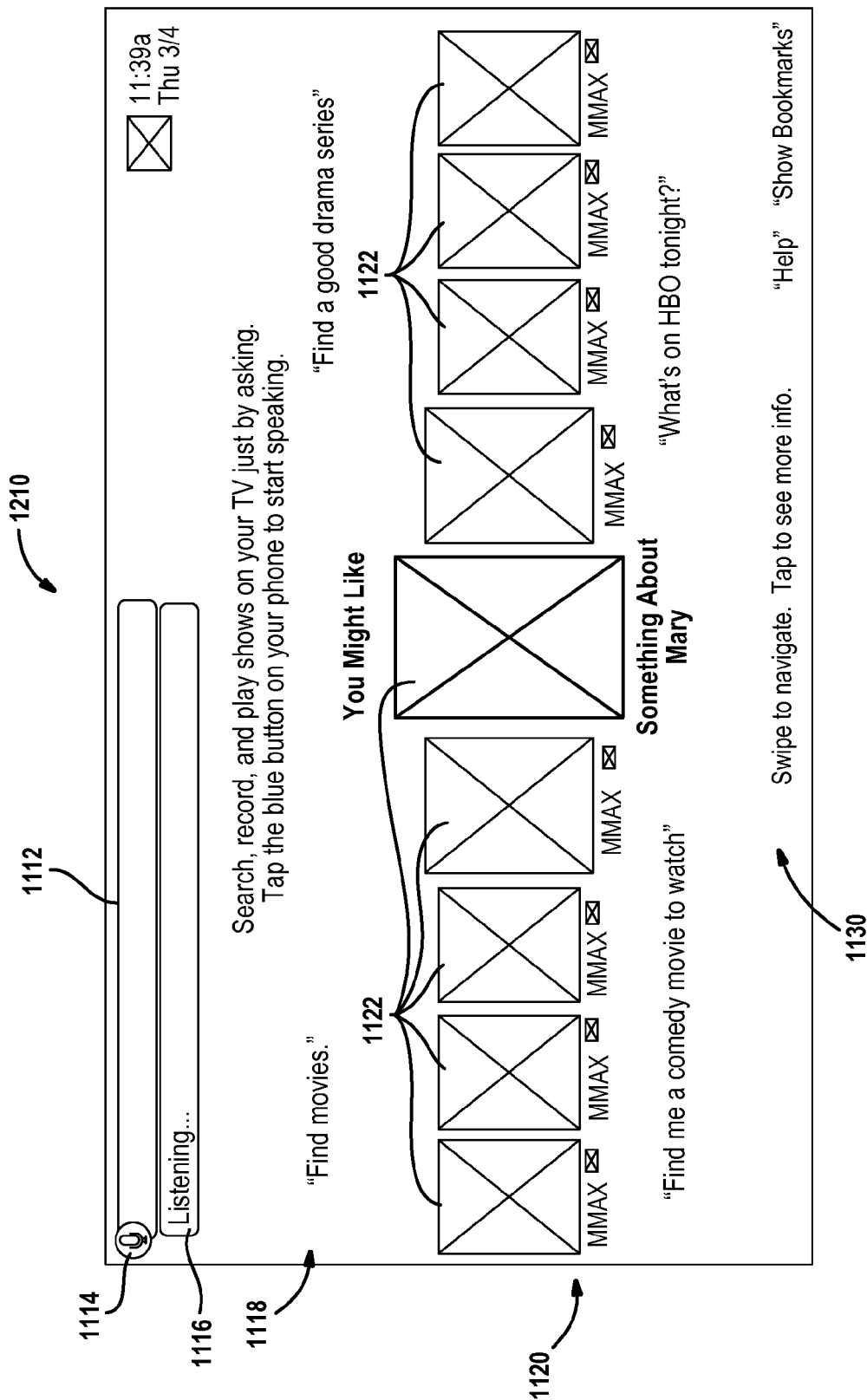
FIG. 12 is the screen display of FIG. 11 in a listening mode.

Referring now to FIG. 12, the screen display 1110 from FIG. 11 is shown at a different time. In this example, the icon 1114 is animated and the status box 1116 displays the wording "listening" indicating that the mobile device is listening for an audible signal from the user. As mentioned above, various types of commands such as "search" may be performed. Searching may take place in various aspects of the metadata. For example, a user may desire to search titles, keywords, categories, a person or a channel. The person controlling the user receiving device may also speak other commands such as "help" or "back." "Bookmark" may be interpreted to add a unique title to the bookmark list. In this example the center poster may be added to the bookmark list should the user speak the word "bookmark." The user may also speak "show my bookmarks" which will be interpreted as displaying a bookmark page with all of the bookmarks.

Figure 13:
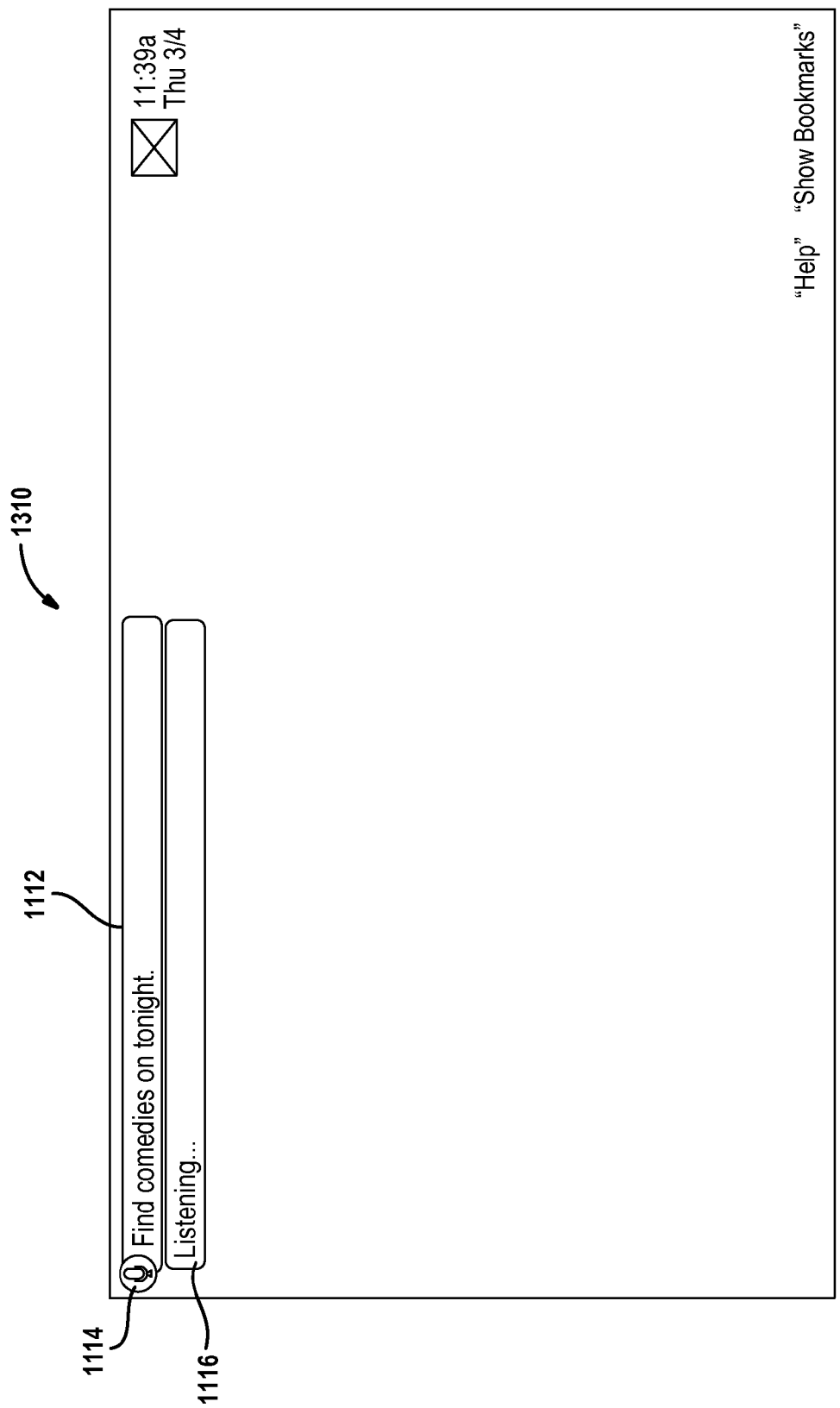
FIG. 13 is a screen display of a mobile device in a searching state.

Referring now to FIG. 13, the words "find comedies on tonight" have been interpreted by the language processing module and displayed within the text box 1112. The status box 1116 indicates the system is searching for metadata corresponding to the request. The screen display 1310 is thus an intermediate screen display.

Figure 14:
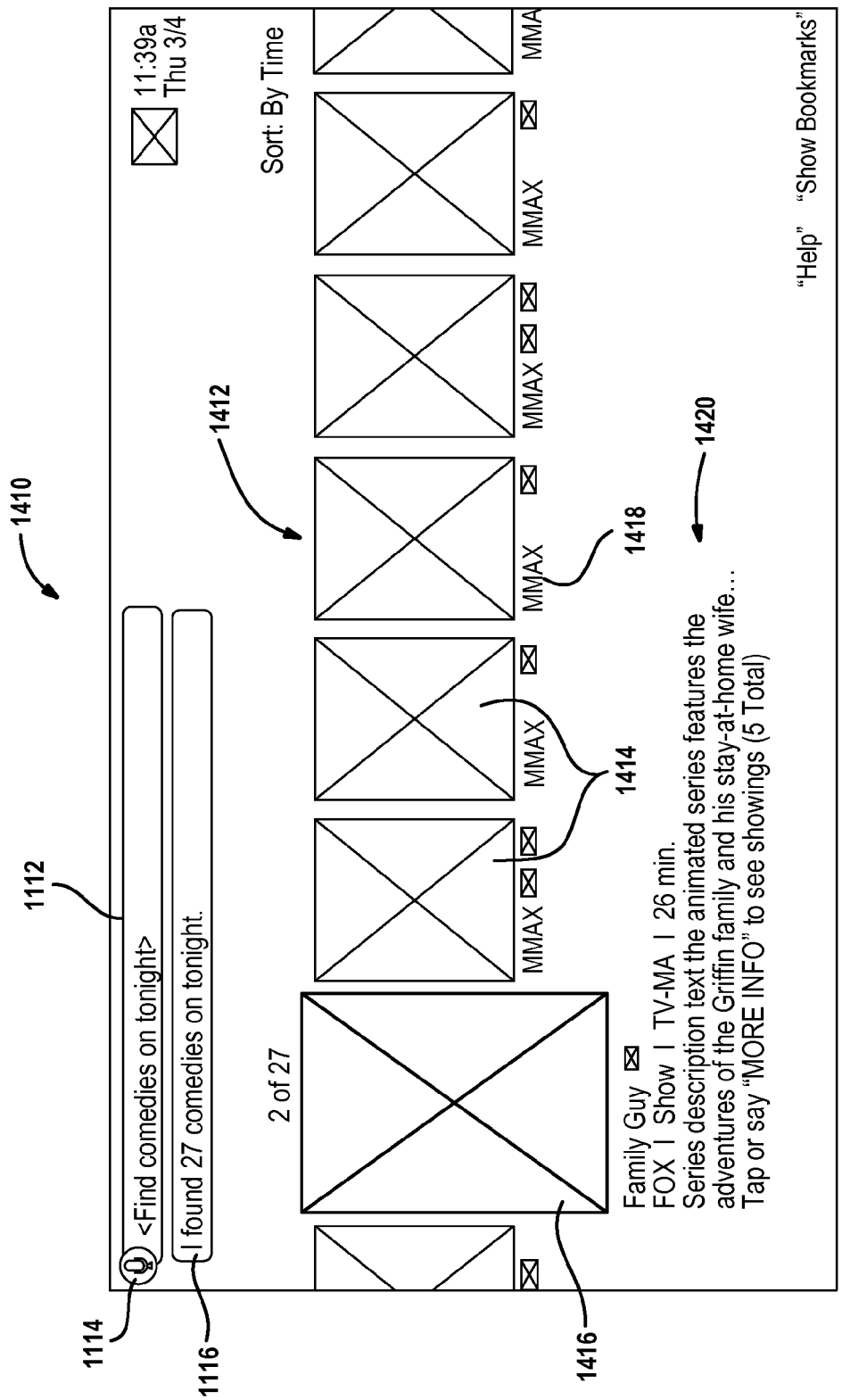
FIG. 14 is a screen display of a keyword search for the voice command system.

Referring now to FIG. 14, a screen display 1410 showing search results 1412 are illustrated. In this example the text box 1112 indicates the last command performed. The status box 1116 indicates, in this example, that "27 comedies" have been found for this evening. The results display area 1412 displays posters 1414 for the comedies searched at the head end. Again, the posters may provide a picture or other graphic corresponding to the content. A highlighted poster 1416 may be larger than the other posters on display. The posters 1416 may include a call sign of the channel 1418. The highlighted poster 1416 may include various other data 1420 regarding the content such as the time, the rating, the type of content, a description of the content a user rating of the content and the date of the content. By tapping the poster, further data may be generated. A high definition icon a Pay-Per-View icon or On-Demand icon may all be provided adjacent to the highlighted poster 1416.

In the present example the show "Family Guy" has been retrieved as one of the comedies being broadcasted this evening. A series description, the network, a program or a movie indicator, the rating and the time may be displayed. A "more info" instruction may also be provided to the user so that the user may cap the poster to obtain more information.

Figure 15:
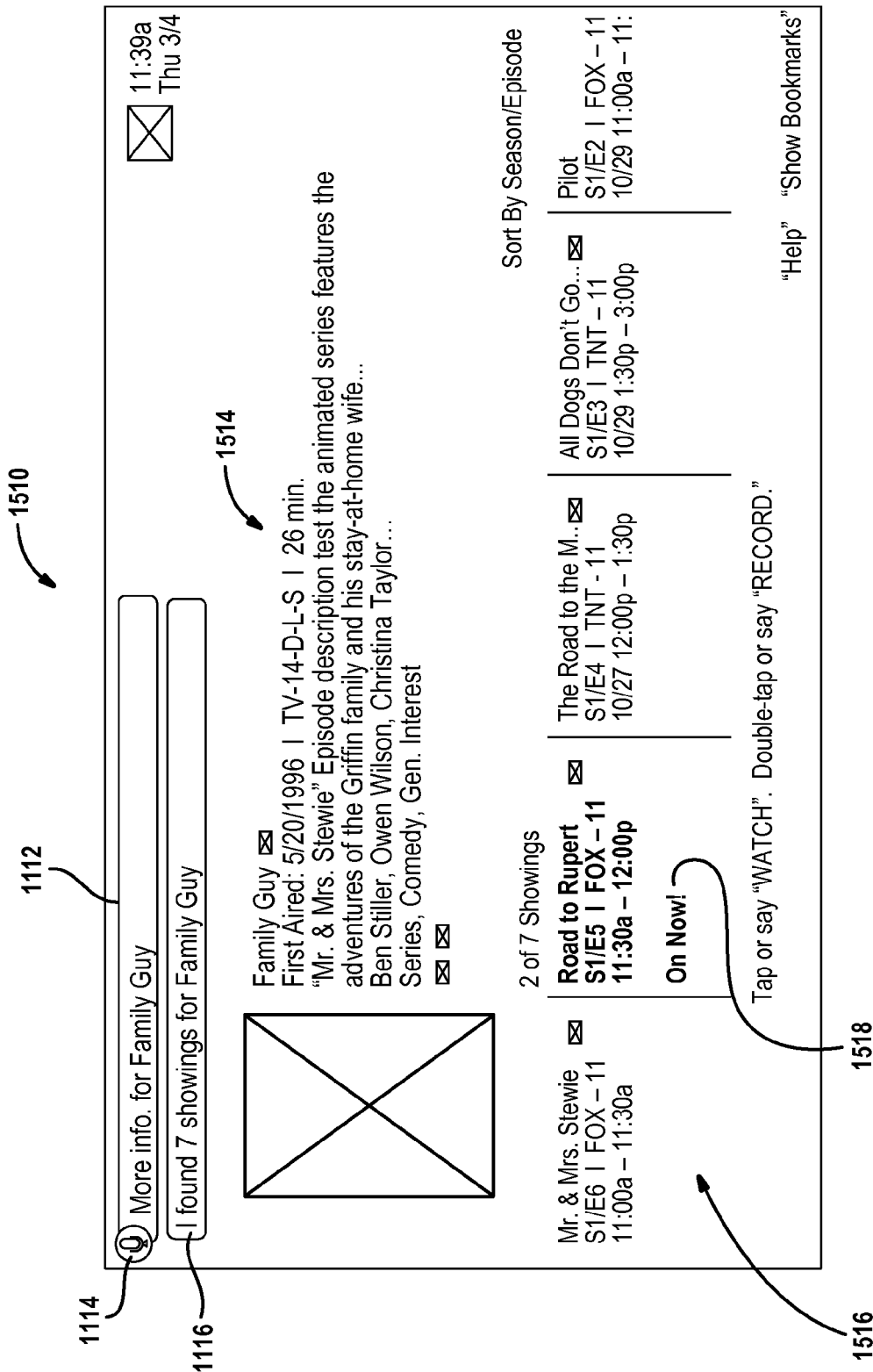
FIG. 15 is a screen display for a specific episode.

Referring now to FIG. 15, when the user taps for more information about "Family Guy" screen display 1510 is illustrated. In this example, the original poster 1512 with episode data 1514 is illustrated adjacent thereto. The head end may also return related data 1516 corresponding to other episodes of the "Family Guy." An "on now" indicator 1518 indicates that a particular episode is currently airing. Other dates and times of episodes are also displayed. If enough episodes are retrieved, scrolling right or left may provide further data. By tapping the episode corresponding to the "on now" indicator 1518, the user receiving device may receive a SHEF tuning function command signal to tune the user receiving device to the particular channel. By selecting any other content episode a recording indicator may be provided to the user to allow the user to set a recording function from the mobile device. This may be performed using a SHEF command as described above. When the content is a video On-Demand title, the user may watch the content by tapping a record indicator.

Figure 16:
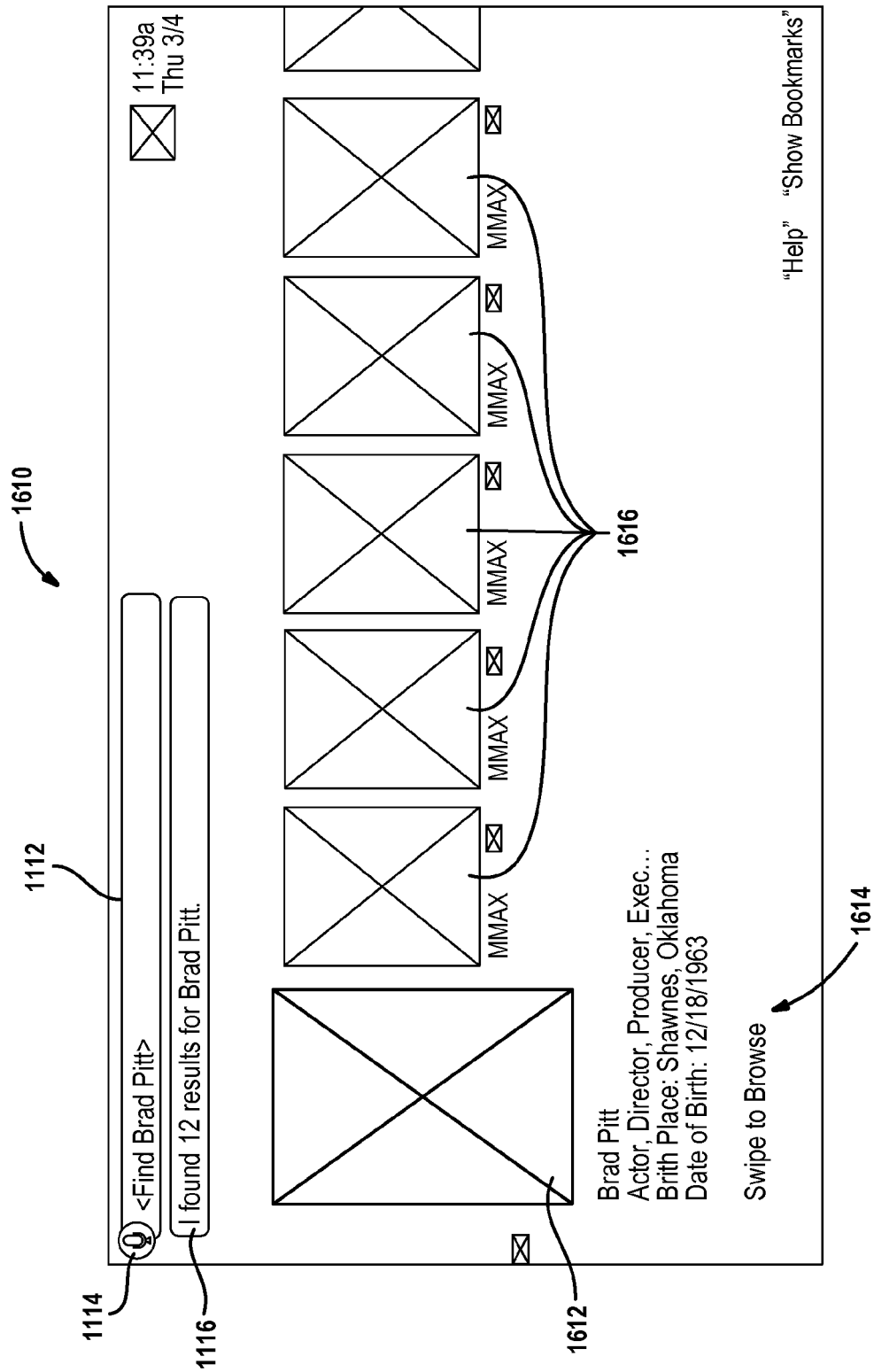
FIG. 16 is a screen display of a person search.

Referring now to FIG. 16, a screen display 1610 is illustrated that illustrates the status box 1116 displaying 12 results a person search. In this example, for Brad Pitt, the actor is used. The text box 1112 indicates "find Brad Pitt" was interpreted by the voice command system. In this example, a biographical poster 1612 is displayed with biographical data 1614 adjacent thereto. The biographical poster 1612 may display a picture of the actor and the data 1614 may display various items of interest regarding the particular actor or actress. In addition to the biographical poster 1612, posters 1616 may provide an indicator data for upcoming movies or shows featuring the actor. The same person may be performed for other actors or actresses, directors, writers, or other persons or companies included in a content.

Figure 17:
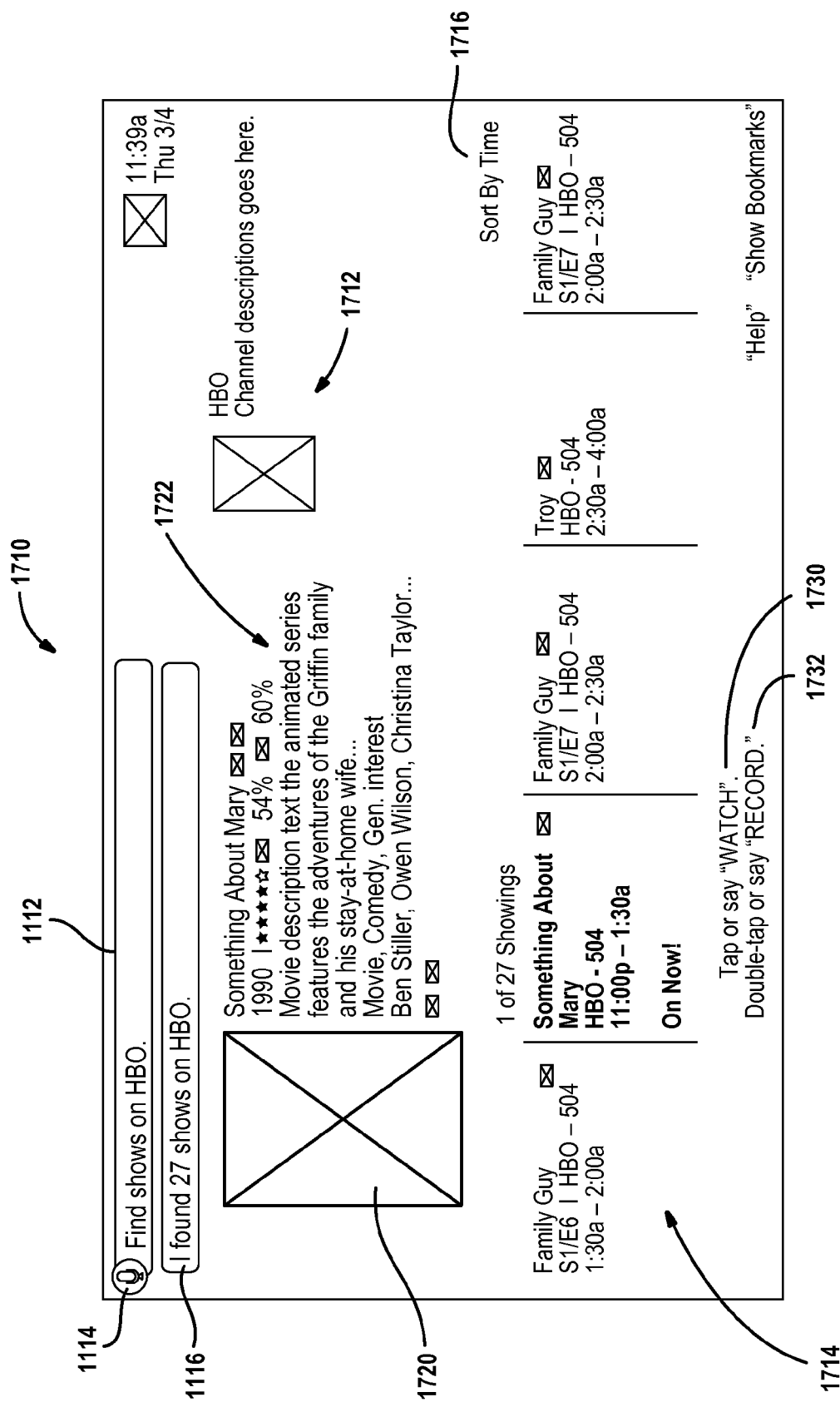
FIG. 17 is a screen display for a channel search.

Referring now to FIG. 17, a screen display 1710 showing the results of a "find shows on HBO" search request are illustrated. The text box 1112 indicates the understood text corresponding to finding shows on the network Home Box Office®. The status box 1116 indicates that 27 shows have been retrieved. A channel indicator 1712 indicates the channel logo, call sign and a channel description. Content data 1714 indicates a brief description of retrieved content for the channel. These shows may be sorted using time by the time sort selector 1716.

A poster 1720 may also be generated with data 1722 regarding the content illustrated in the poster. A "watch" instruction 1730 or "record" instruction 1732 may be generated to allow the user to either tap or speak a voice command.

Figure 18:
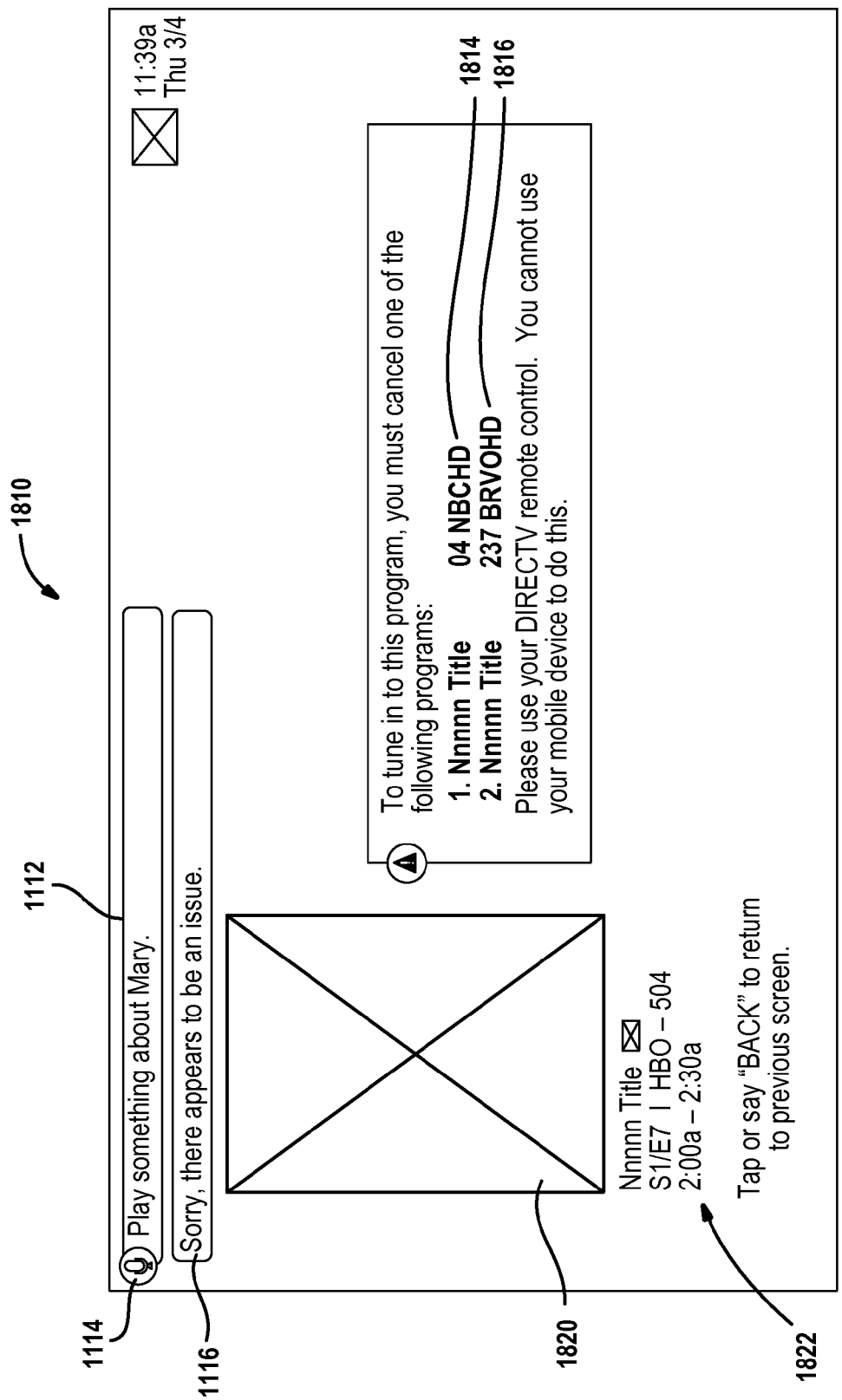
FIG. 18 is a screen display of a tuner conflict screen when playback is requested.

Referring now to FIG. 18, if "Something About Mary" is selected in the screen display 1710 of FIG. 17, the screen display 1810 is generated. In this example the text box 1112 indicates the command "play the movie Something About Mary." Conflict box 1812 is generated to show that at least one of the selections 1814 or 1816 may be selected to avoid the conflict. By selecting one of the resolution conflict choice selections 1814 or 1816, Something About Mary may be played back. Such a screen may indicate that the tuners in a user receiving device are busy.

A poster 1820 and data 1822 may be displayed for the desired playback content. The data 1822 may include the program title, series title, video quality, season number, episode number, channel call sign, start time, end time and various other data.

Figure 19:
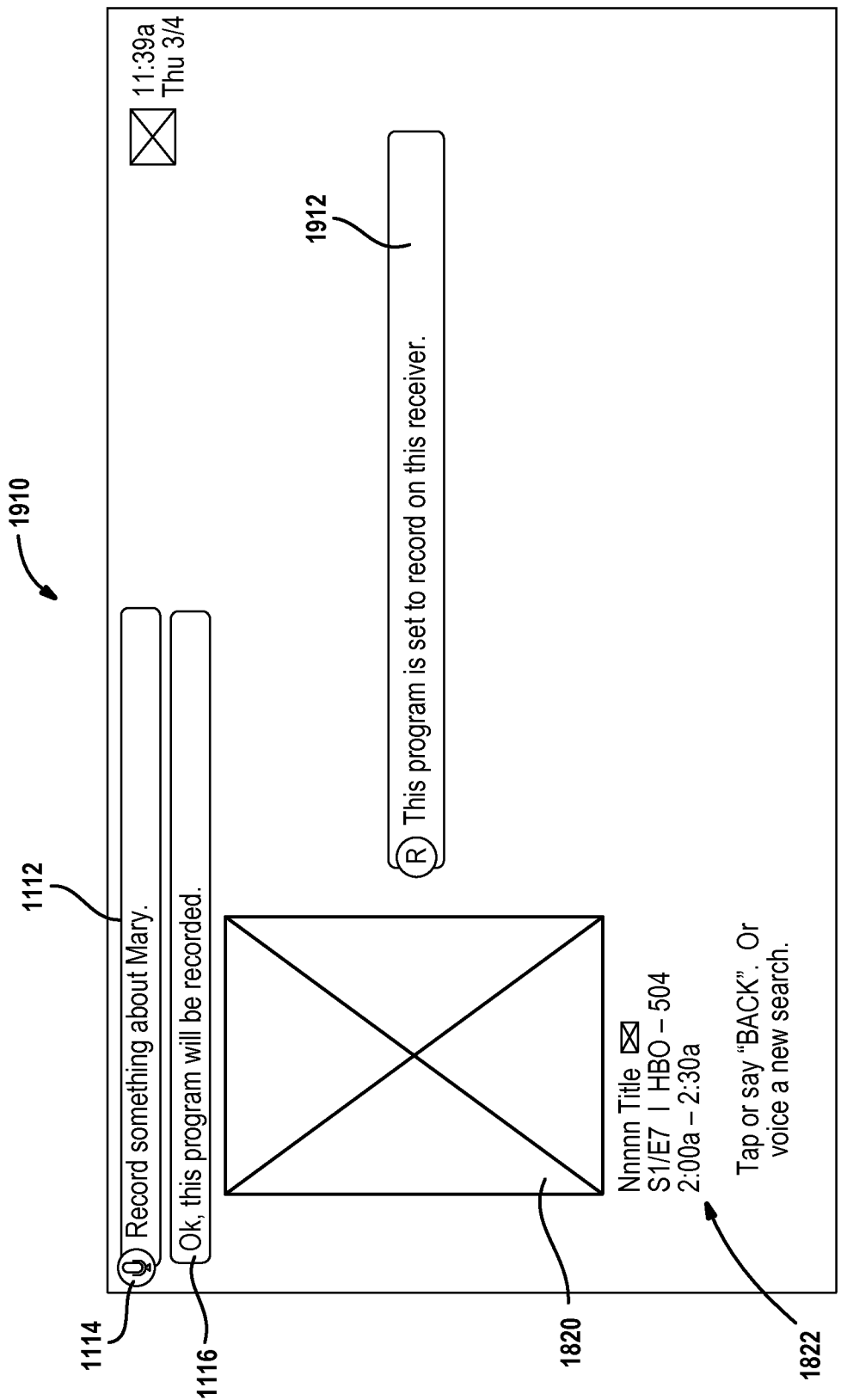
FIG. 19 is a screen display of a recording confirmation screen.

Referring now to FIG. 19, a screen display 1910 indicating that record selection was selected in FIG. 17 is set forth. The text box 1112 indicates "record Something About Mary." The status box 1116 indicates that the program will be recorded. A record indicator 1912 is generated to illustrate to the user that the content is set to be recorded at the user receiving device.

Figure 20:
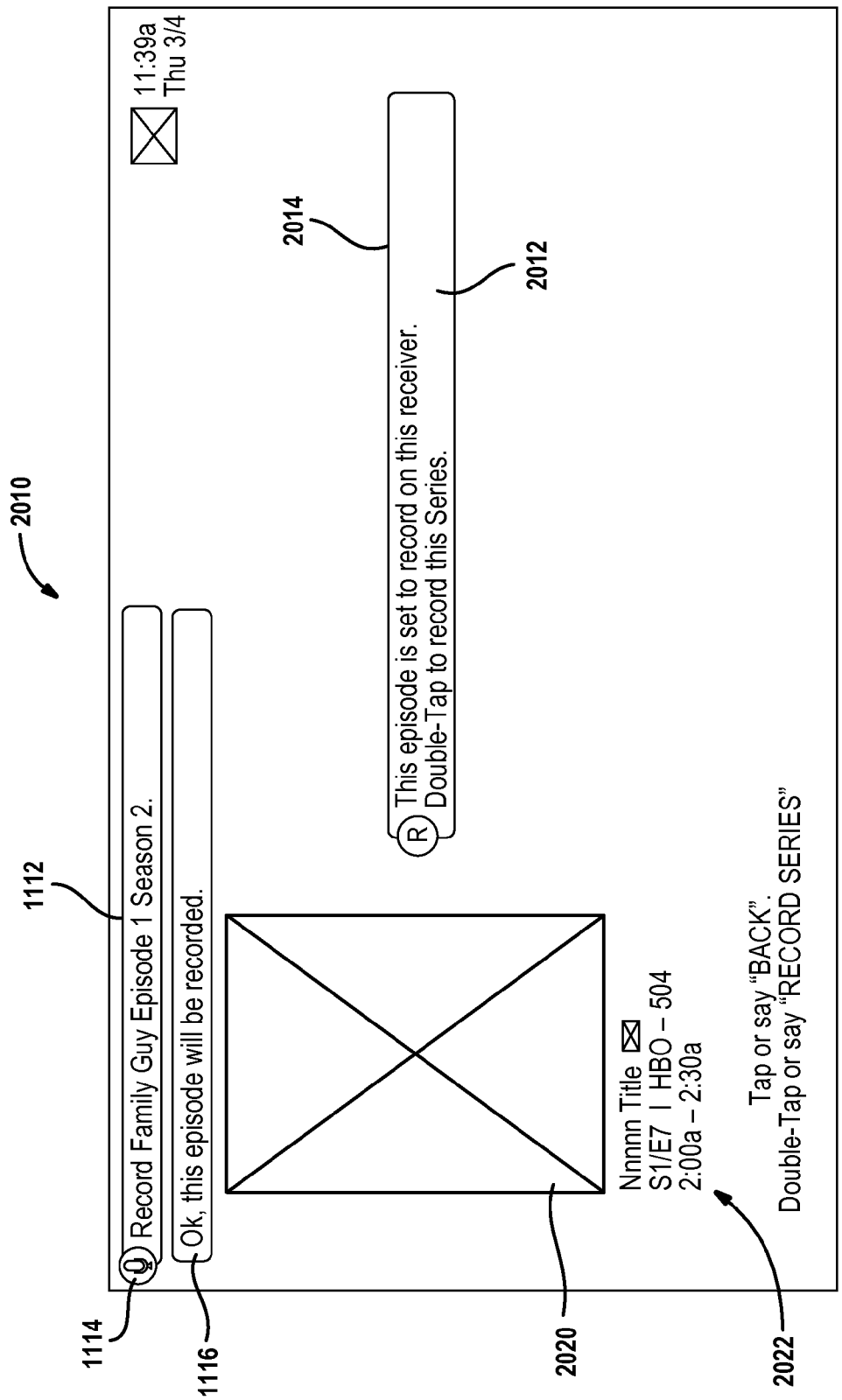
FIG. 20 is a screen display of an episode confirmation screen for a recording.

Referring now to FIG. 20, carrying through with a previous example, when "record Family Guy, episode one, season two" is voice commanded as indicated in the text box 1112, the episode may be recorded as indicated by the status box. The screen display 2010 may also generate a series query 2012 in a series query box 2014 that instructs the user to double tap on the series box to record the entire series rather than just the selected one episode.

Other items in display 2010 may include a poster 2020 and poster data 2022.

Figure 21:
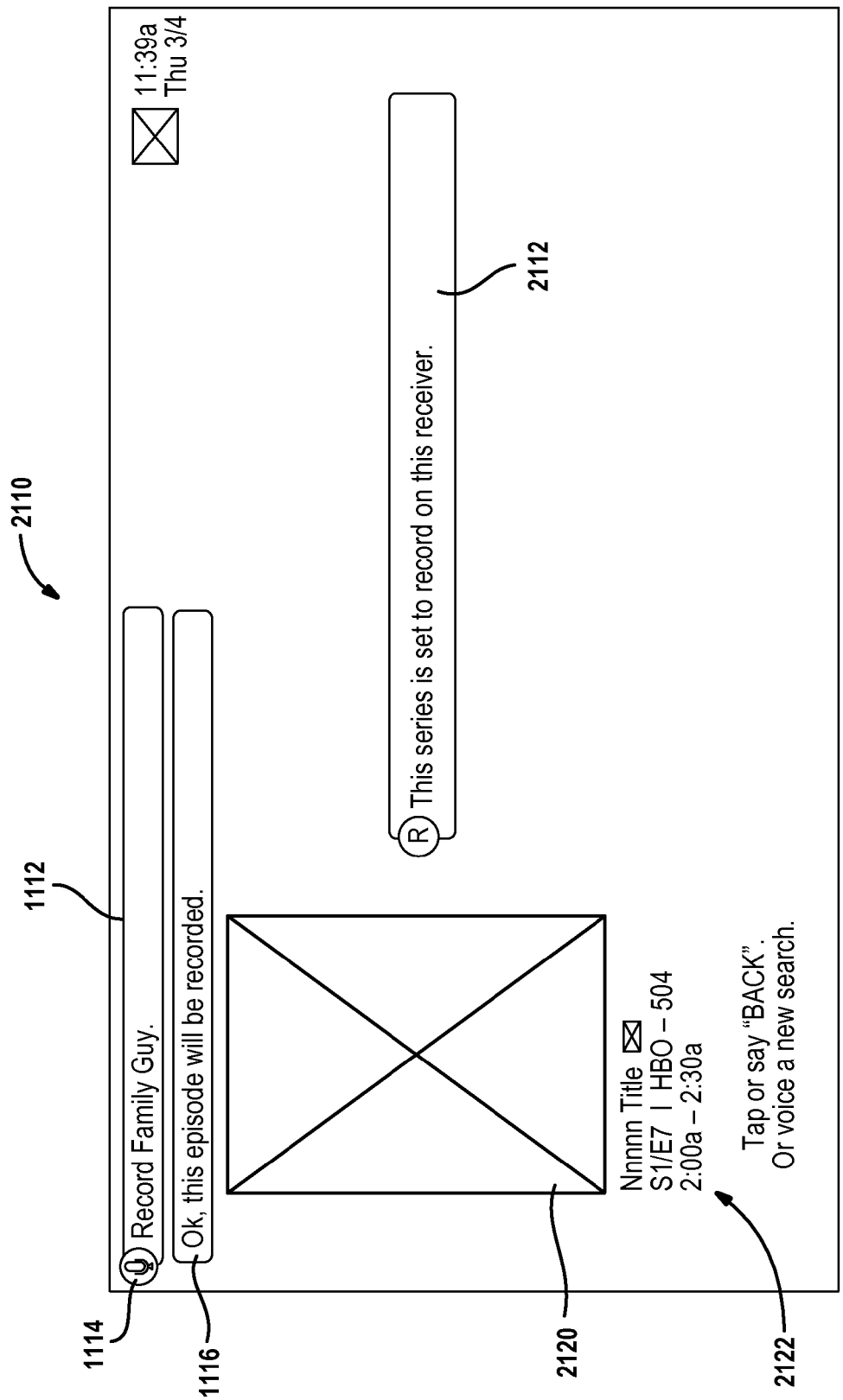
FIG. 21 is a screen display of a series confirmation.

Referring now to FIG. 21, a screen display 2110 is illustrated displaying a confirmation box 2112. The confirmation box 2112 is displayed after a series is recorded by clicking box 2014 illustrated in FIG. 20. The confirmation box 2112 in this example includes "this series is set to record on this receiver" as an indicator message that the entire series will be recorded. A series recording records upcoming shows for an entire series.

Figure 22:
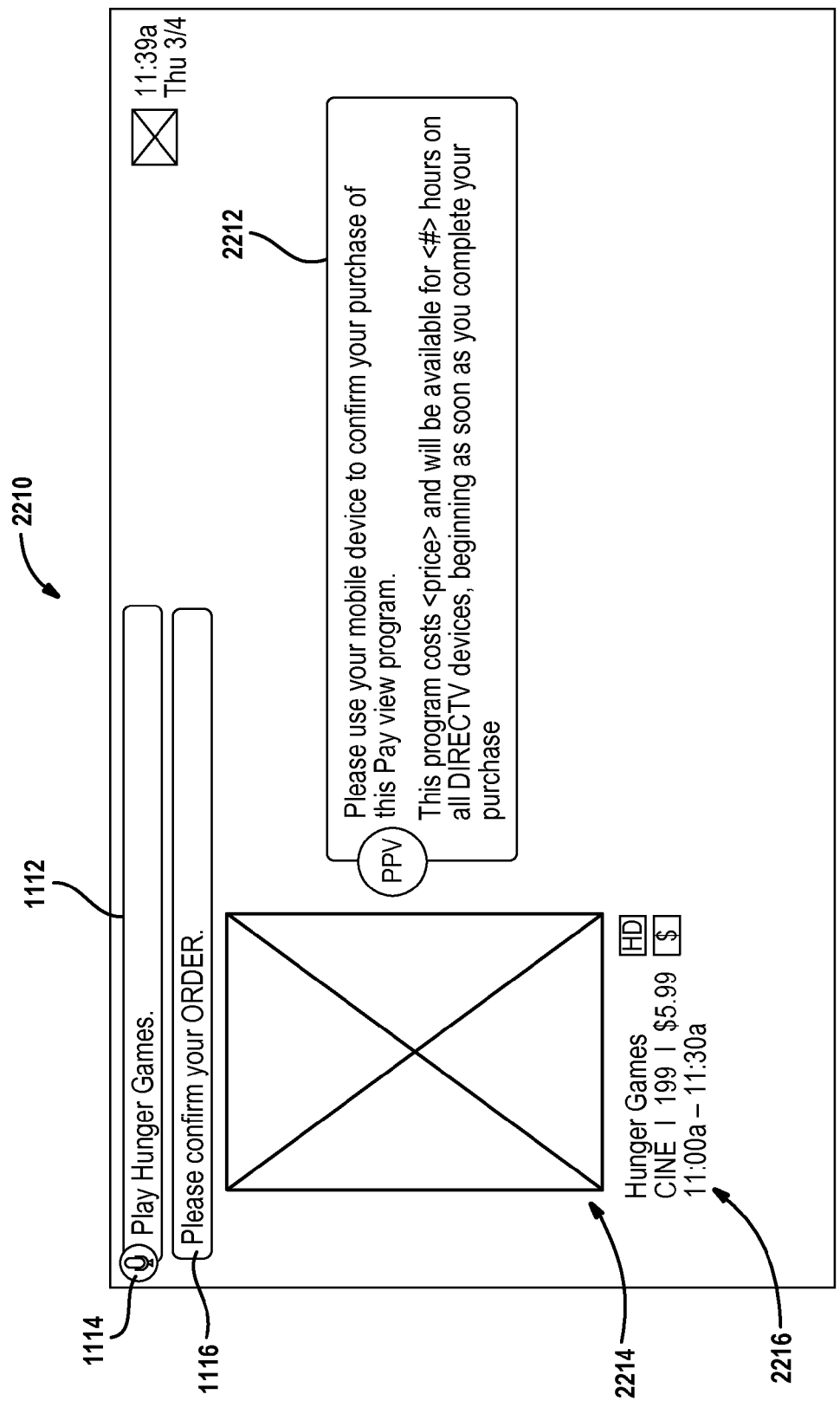
FIG. 22 is a screen display of an order purchasing onscreen display.

Referring now to FIG. 22, a screen display 2210 is illustrated for purchasing a content title. The text box 1112 indicates "play Hunger Games" has been received. In this example Hunger Games is a Pay-Per-View program. Status box 1116 indicates a confirmation of order. A confirmation box 2212 is illustrated that instructs the user of the mobile device to confirm the purchase. Purchases may be confirmed using an authentication scheme, by entering a credit card or by some other type of authorization. Instructions within the confirmation box 2212 may indicate the price and the number of hours the device may be available after completing purchase. A poster 2214 and data 2216 associated with the poster and the content selected for purchase.

Figure 23:
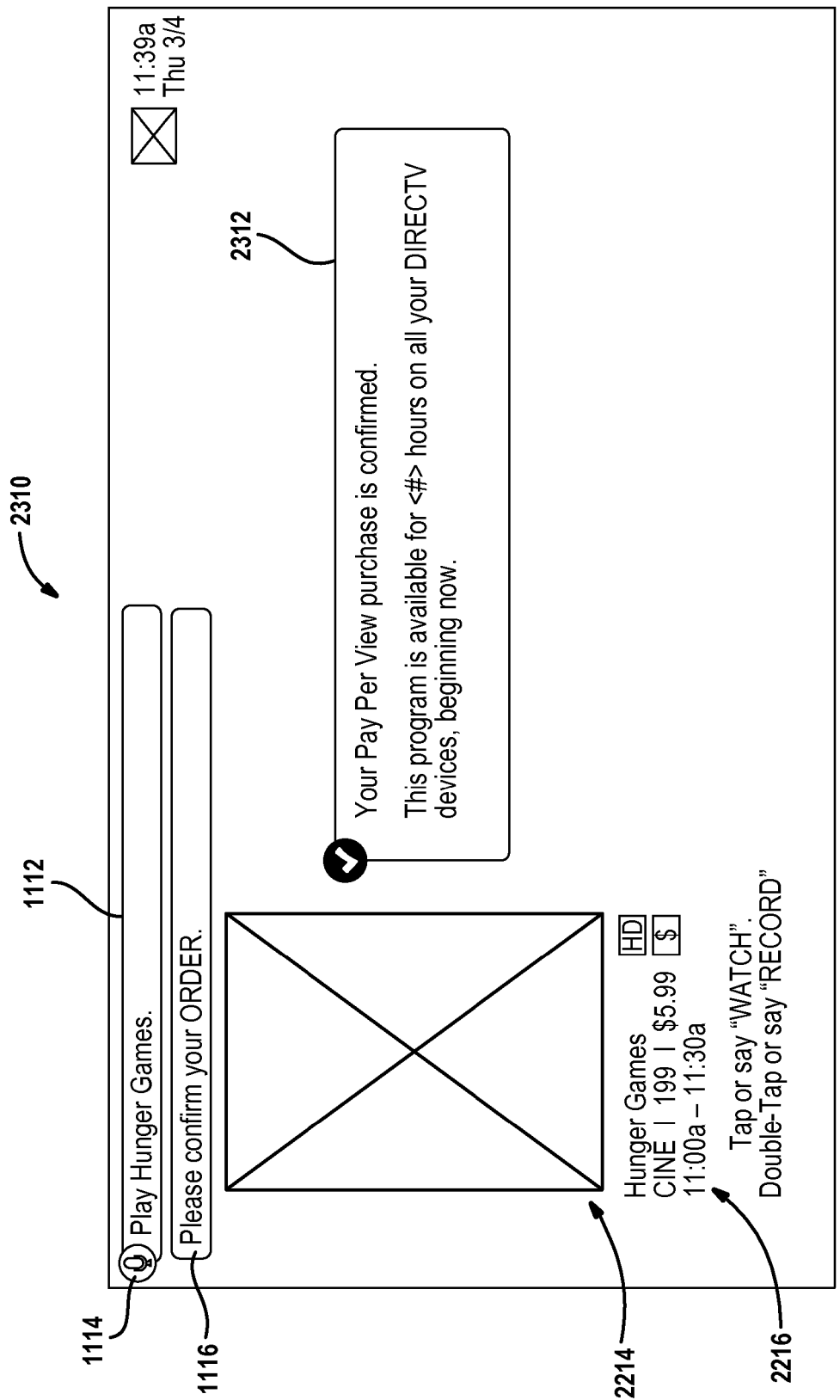
FIG. 23 is a screen display of an order purchase confirmation.

Referring now to FIG. 23, a screen display 2310 is illustrated having a confirmation box 2312 corresponding to a purchase confirmation. Instructions provided in this example include the number of hours that the DirecTV® devices will be enabled to receive the content.

Figure 24:
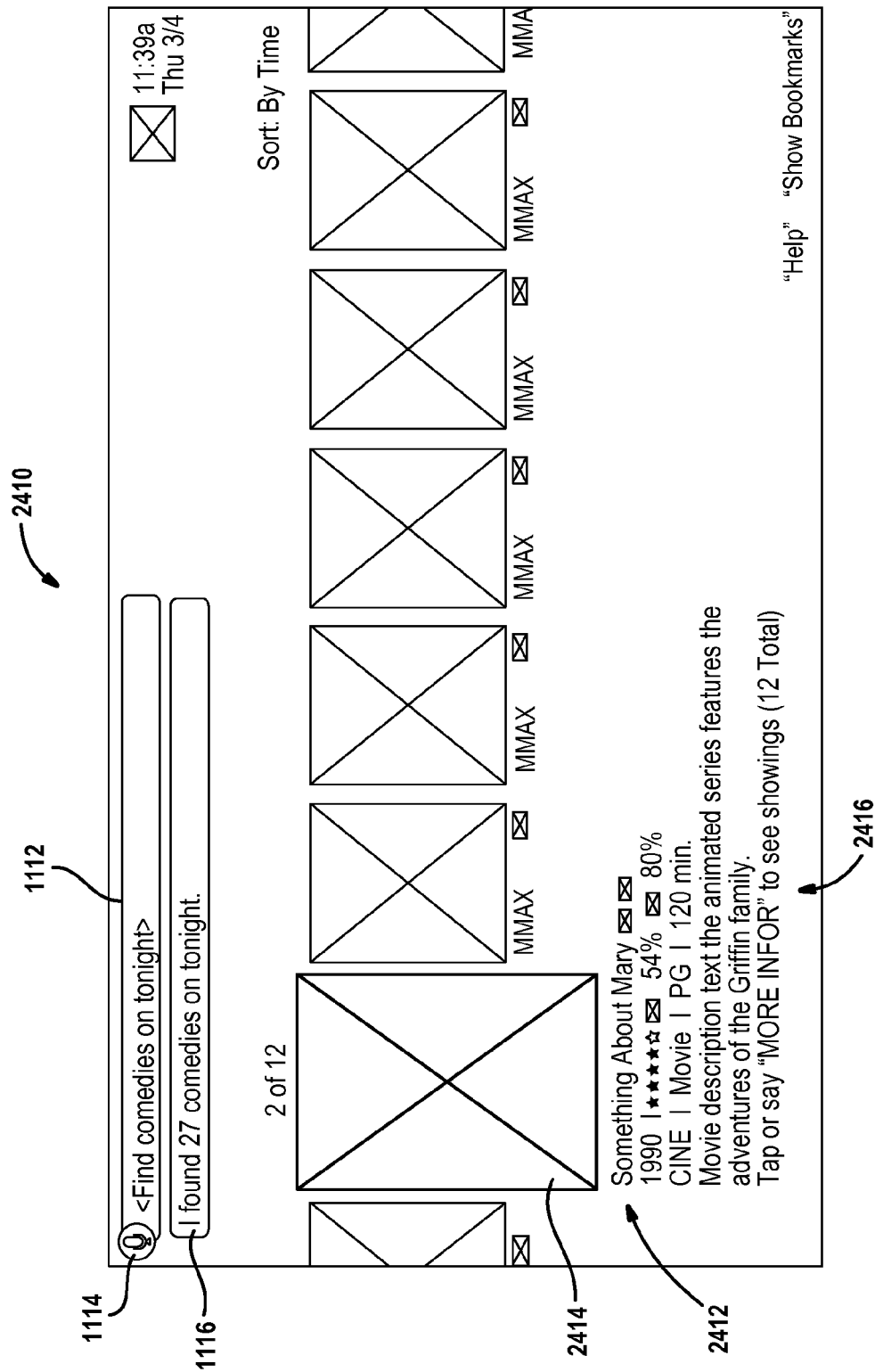
FIG. 24 is a screen display of a bookmarked page.

Referring now to FIG. 24, a screen display 2410 is displayed for displaying bookmarks. Text box 1112 illustrate "show my bookmarks" was interpreted by the voice system. Status box 1116 indicates that 12 bookmarks are available. As mentioned above, bookmarks may be set by an upward swipe, holding gesture or touch motion performed on a touch screen on the mobile device. Poster of a content title is illustrated the screen display. Various other methods of interacting and adding content titles to the bookmark list may be performed by interacting with the screen display. In this example a plurality of bookmarked posters 2412 are provided with a highlighted poster 2414. Additional data 2416 is provided below the highlighted poster. The posters may be moved or rotated through by swiping right to left or left to right. To return to the previous page a swipe from the bottom up allows the previous screen to be displayed on the user receiving device.

Figure 25:
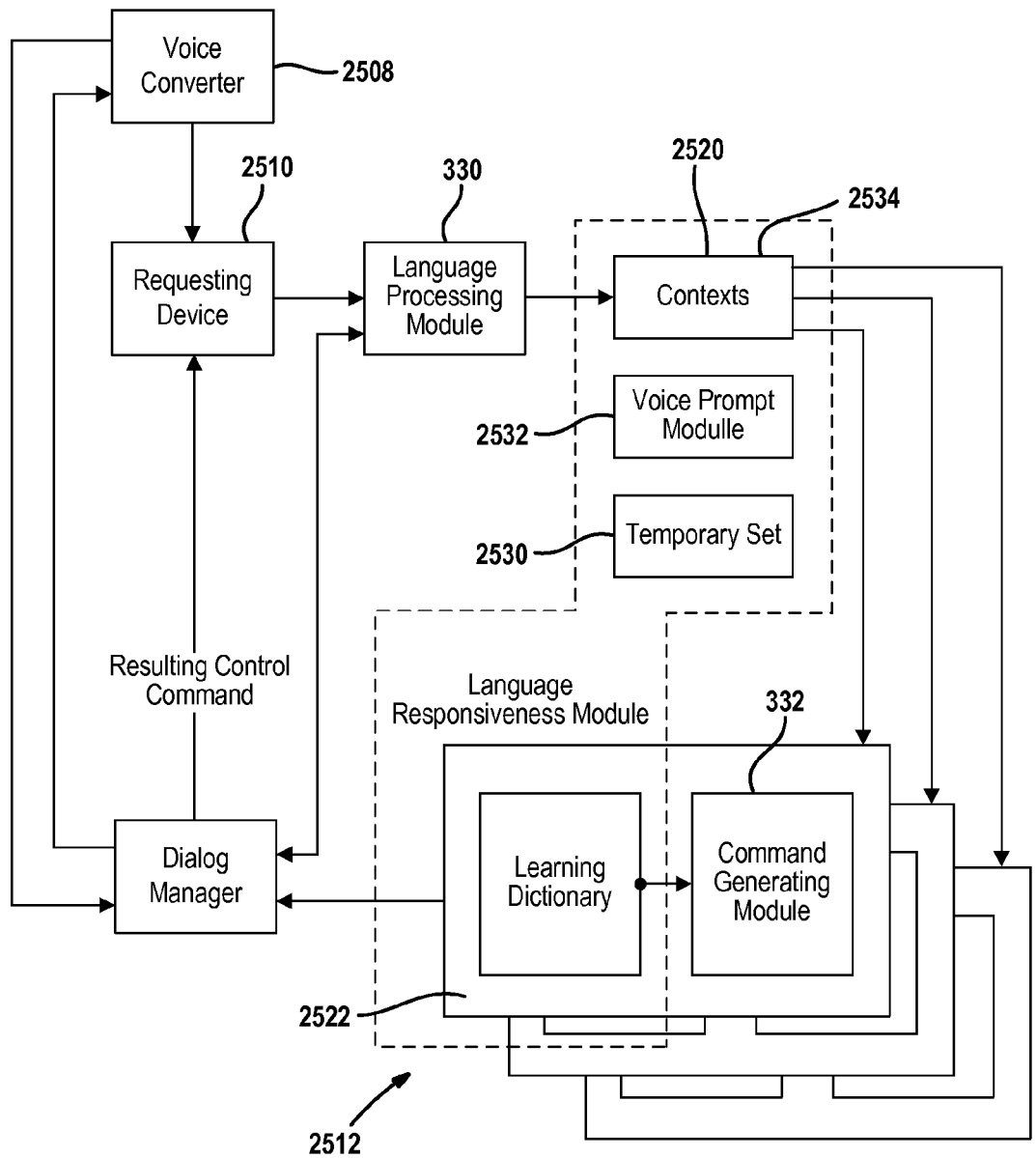
FIG. 25 is a high level block diagrammatic view of language recognition responsiveness module.

Referring now to FIG. 25, a simplified example of a requesting device in communication with the language processing system 2512 is set forth. In this example, a voice converter 2508 such as a microphone receives audible signals from a user. The voice converter 2508 converts the audible signal to an electrical signal and communicates the electrical signal corresponding to the audible signal to a requesting device 2510. The voice converter may be integrated into the requesting device 2510. The requesting device 2512 may be one of the different types of devices described above such as the head end, the mobile device or the user receiving device.

The requesting device 2510 communicates the electrical signal to the language processing module 330. As mentioned above the language processing module 330 converts the electrical signal into a text signal. The text signal is communicated to the language responsiveness module 2534. In this example the function of the command generation module 332 and the language responsiveness module 334 described above may be combined. The language responsiveness module 2534 is used to adjust and improve the responsiveness of the voice recognition system. The language responsiveness module 2534 is in communication with the command generation module 332 that generates a command corresponding to the recognized voice command.

The language responsiveness module 2534 may include a contexts module 2520 and a learning dictionary 2522. The context module 2520 determines a context for the spoken voice commands. The context corresponds to the current operating or menu state of the system, more specifically the mobile or user receiving device. In different menus or screen displays only a certain set of responses or answers are appropriate. The context narrows the possible responses. The learning dictionary 2522 may have a library with library contents corresponding to base commands and variable commands as described below. The learning dictionary 2522 learns the meaning of the particular voice command. This may be performed as described in the flow chart below. The present example of the language processing system 2512 recognizes variations in language mutations that are typically difficult to recognize. Synonyms for different commands are learned and stored as library content in the variable set. By using the learning dictionary 2522 interactivity with the requesting system allows the learning dictionary 2522 to be adjusted to improve responsiveness. The language processing system 2512 unobtrusively learns various phrases as described further below.

A temporary set 2530 may be a memory for storing temporary or commands not yet recognized in the variable or base set of commands. The temporary set is illustrated within the language responsiveness module 2534. However the temporary set may be physical outside the language responsiveness module 2534. In short, the temporary set 2530 is at least in communication with the language responsiveness module 2534.

A voice prompt module 2532 may prompt the requesting device 2510 to request another voice command. This may be done when a voice command is not recognized as a command not within the learning dictionary 2522 (as a base or variable command).

The output of the language responsiveness module 2534 may include search results that are communicated through the dialog manager 342. As mentioned above, the dialog manager 342 may generate a grammatically corrected text signal. The grammatically corrected text signal or response may be communicated directly to the requesting device 2510. However, a voice or audible signal may also be generated. The dialog manager 342 in generating a voice or audible signal communicates the text result to the voice converter 2508 which, in this case, may generate a voice or audible signal from the grammatically corrected text response. Of course, a text to voice converter may also be a separate module in communication with the dialog manager 342. In this example, the voice converter converts voice into text as well as converting text into voice.

Figure 26:
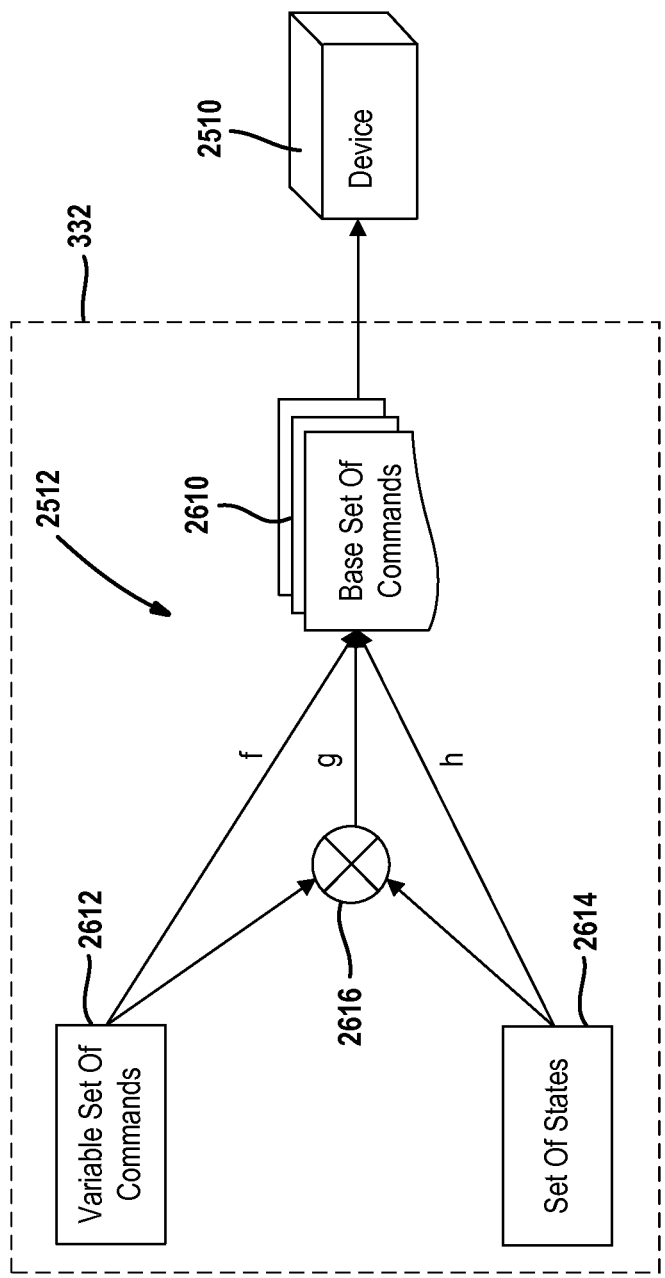
FIG. 26 is a detailed block diagrammatic view of the command generation module of FIG. 25.

Referring now to FIG. 26, the requesting device 2510 is in communication with the command generation module 332 and is provided with a base set of commands or library contents at a base library 2610. A variable set of commands in a variable command library 2612 and a set of states 2614 are used to provide better responsiveness to the base set of commands in the base library 2610. The combination block 2616 combines the output of the variable command library 2612 with the set of states 2614 to improve the base set of commands. The relationship between the variable set of commands and the base set of commands is a surjective map that extends to the base command set. The state modified commands provided at 2616 are surjective relative to the base set of commands. The set of states are used as a selector for the base set of commands. The base set of commands has a 1:1 correspondence or bijection to commands within the controlled device 2510.

The base set of recognizable commands in the base library 2610 is identical to the variable set of commands initially. However, the base set of commands is a simple set. The variable set of commands in the variable command library 2612 is a multi-set that allows its members to be present as multiple instances of synonyms which form subsets corresponding to appropriate commands. The set of states 2614 acts as a modifier for the variable set of commands that indicate the state the device 2510 is in. The state may indicate the current screen display so that appropriate potential responses are used. Once an unknown input voice is encountered, the system may conduct a fuzzy search on the set of known commands to determine the proper command. The current state of the controlled device indicated by the set of states 2614 may also be taken into consideration. When a search fails for a new command, another synonym may be requested for the command. Once a synonym with the original command is entered the variable command may be added to the variable set of commands in the variable command library 2612.

Various statistics may be maintained based on the frequency of the use command. The statistics may allow for the periodic cleansing of the database for commands that are unused for a considerable length of time. Therefore, a time stamp may be associated with the variable command. When the synonym in the variable set of commands in the variable command library 2612 is unused for a predetermined time, the synonym from the variable set of commands.

Figure 27:
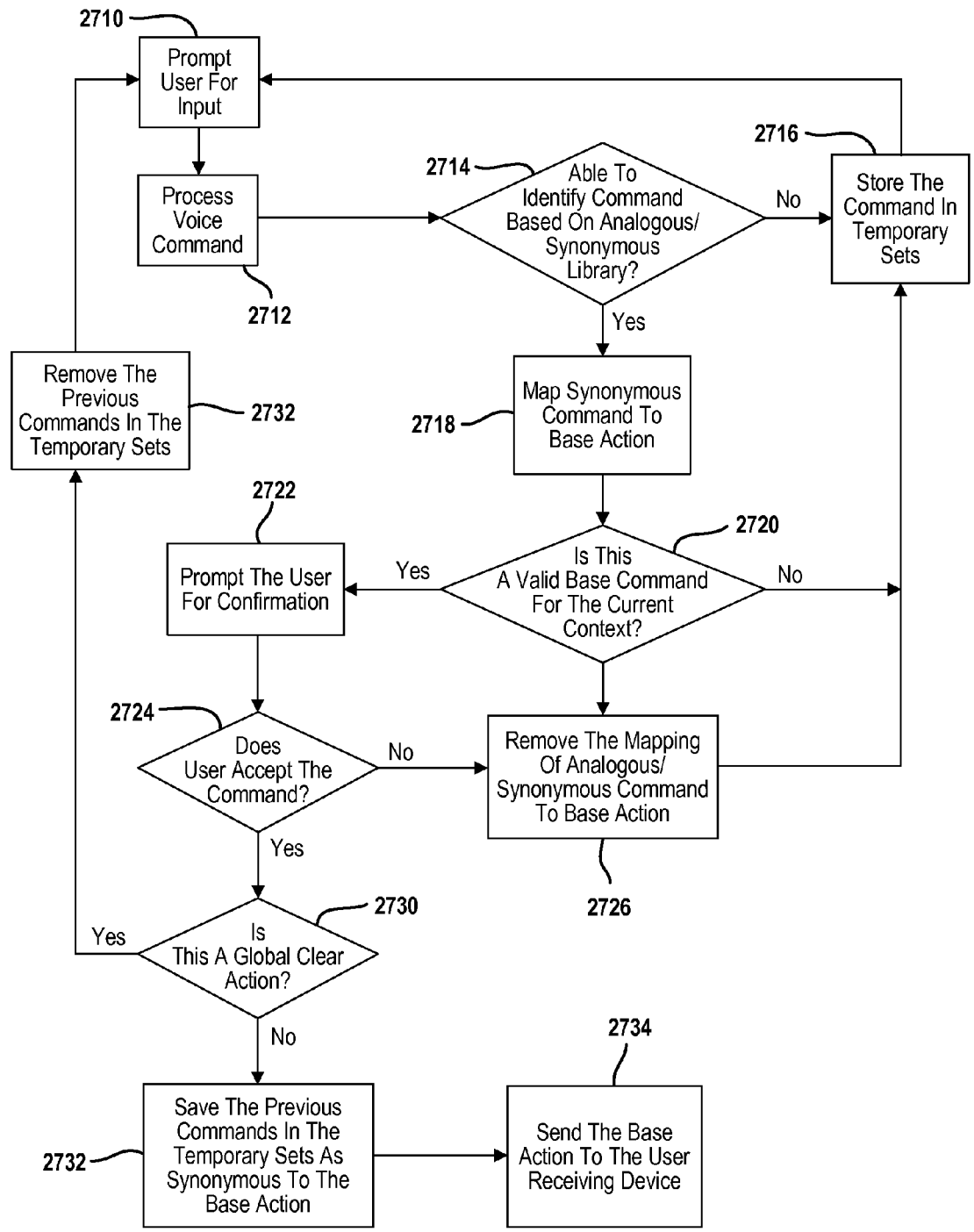
FIG. 27 is a flow chart for voice recognition learning according to the present disclosure.

Referring now to FIG. 27, a detailed flow chart of a method for improving responsiveness of a voice recognition system set forth. In step 2710, the user of the device such as the mobile device is prompted for input. In step 2712 a first voice command is received processed into an electrical signal such as a text signal. The conversion into the electrical signal may be performed at the requesting device such as the mobile device. In step 2714, the system determines whether a control command signal is identifiable based upon the learning dictionary. Both base library and the synonym or variable command library 2612 may be considered. This may take place in the mobile device or remotely at a stand-alone device or module or a head end.

If the command is not identifiable, step 2716 stores the command in a temporary set. Step 2710 is then performed again and the user is prompted for a second voice command. Steps 2712 and 2714 are again performed with the second voice command or the electrical signal corresponding to the second voice command.

Referring back to step 2714, if a command is identifiable from the processed (first) voice command, step 2718 maps the synonymous command to a base action. In step 2720 it is determined whether the base command is valid for the current context by reviewing the set of states 2614 in FIG. 26. If the base command is not valid in the current operating state or menu, the system returns to step 2716 and stores the command in a temporary set. The temporary set may be located at the place the comparisons are being performed.

Referring back to step 2720, if the base command is valid, the user is prompted for confirmation in step 2722. After step 2722 it is determined whether the user has indicated an acceptance of the command. If the user does not accept the command in step 2724, step 2726 removes the mapping of the synonym of the command to the base station. After step 2726, step 2716 stores the command in a temporary set.

Referring back to step 2724 when the user does not accept the command (a rejection signal), step 2730 determines whether the action is a global clear action. If the action is a global clear action step 2732 removes the previous commands in the temporary sets and thereafter prompts the user for an input in step 2710.

In step 2730, when the voice command is accepted, executing step 2730. Acceptance of the voice command may be performed by the user generating an acceptance signal when the second or subsequent voice command is accepted. An acceptance signal is generated at the receiving device in response to a voice or electrical signal (push button, screen tap. If the action is not a global clear action, step 2732 save the previous commands in a temporary set as synonymous to the base action. Step 2734 sends the base action to the user receiving device or requesting device. As can be seen, various synonyms may be added to the dictionary by using the temporary set. The temporary sets are saved until a positive identifier or synonym is determined in the command set. Once a command set is determined the synonyms for previously spoken voice commands are also entered into the command set. The synonyms are used to determine which base action was meant by the user voice command. An SHEF command may be returned for controlling the requesting device as the base command in step 2734. In this way, the responsiveness of the system may be improved by increasing the synonyms for a command.

When a third command is processed that corresponds to an entry in the variable command library, the third command will control a function of the device such as a user receiving device or mobile device.

Figure 28A:
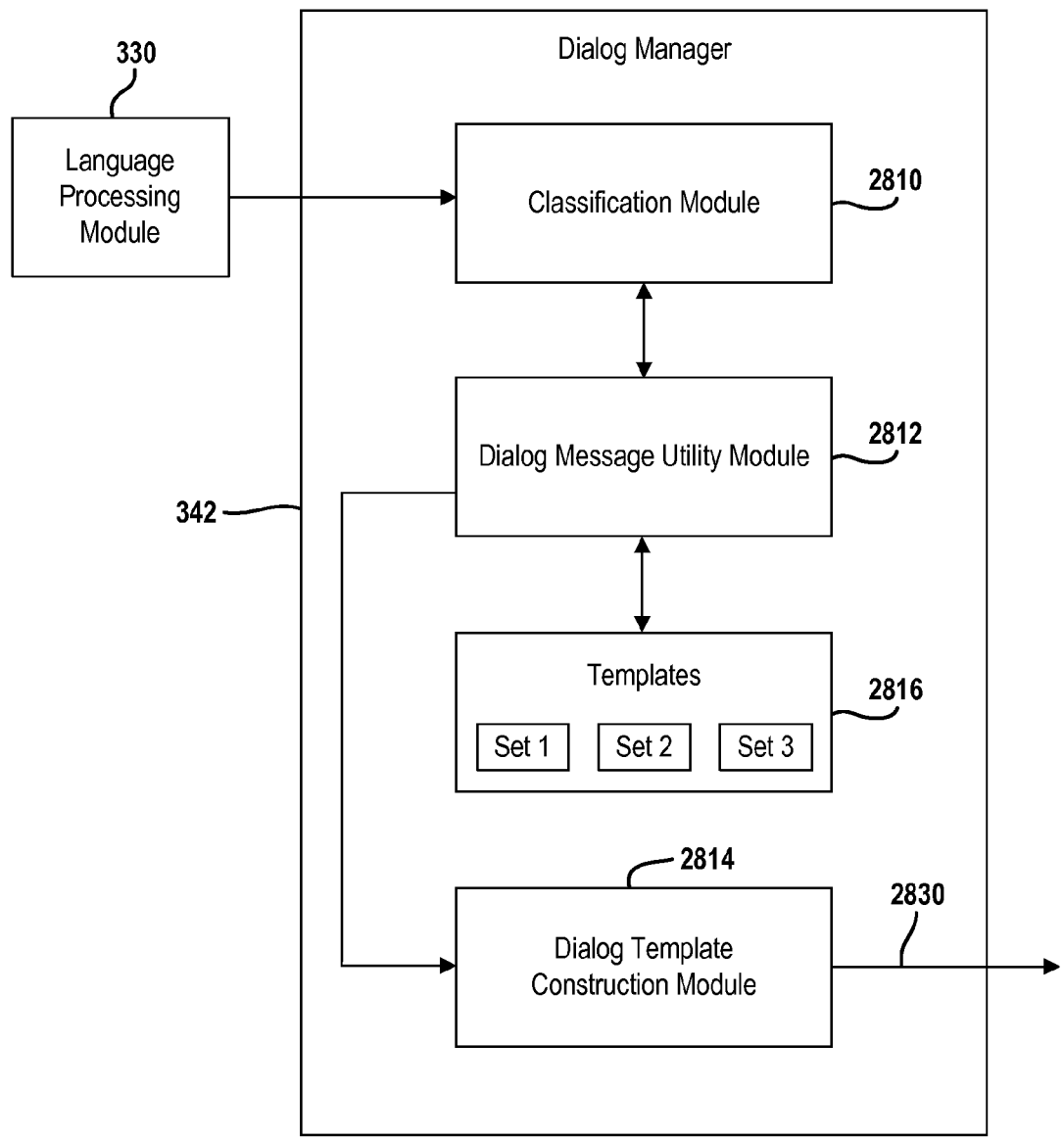
FIG. 28A is a block diagrammatic view of the dialog manager according to the present disclosure.

Referring now to FIG. 28A, a detailed block diagrammatic view of the dialog manager 342 is set forth. The dialog manager 342 includes a classification module 2810, a dialog message utility module 2812, a dialog template construction module 2814 and a template module 2816.

The classification module 2810 receives data identified by the language processing module from within the voice request. The identified data from the language processing module 330 may include, but is not limited to, a title, a sports team, a credit, a genre, a channel time, a channel date, a time keyword (such as tonight, this evening, this morning, this after), the day (the week, tomorrow, next week), description, media type (movie, TV, sports), media source (linear, On-Demand or recorded on the DVR), quality rating (such as a star rating) and a content rating (such as PG, TV-14). The identified data may be referred to as an intent, an intent object or a mention.

The classification module 210 is in communication with the dialog message utility module 2812. The dialog message module utility module returns a template type. The templates 2816 may include a plurality of sets of templates including set 1, set 2, and set 3. In this example, only three sets of templates are provided. A particular classification may have an associated set such as one of the sets 1-3.

The template or template identifier is returned to the dialog message utility module 2812 which, in return, is communicated to the dialog template construction module 2814. The dialog template construction module 2814 uses the intents from the language processing module 330 and combines the intents into the template. Thus, the output of the dialog manager 2830 is a grammatically correct text response that is communicated to a requesting device.

The classification module 2810 may classify the intents from the language processing module 330. Examples of response classification include titles/sports teams/person not present when the title/sports team and credit is not present. Another possible classification is title and/or sports team is the subject when the title or sports team is present. Yet another classification is person is the only subject when the credit is present but the title and sports team is not present. Another example is disambiguation for channel when the channel is the only identified data. An unsupported request may be returned when there is no identified data. Of course, other examples of classification may be generated. Template sets corresponding to the classification as set forth in FIG. 30.

Figure 28B:
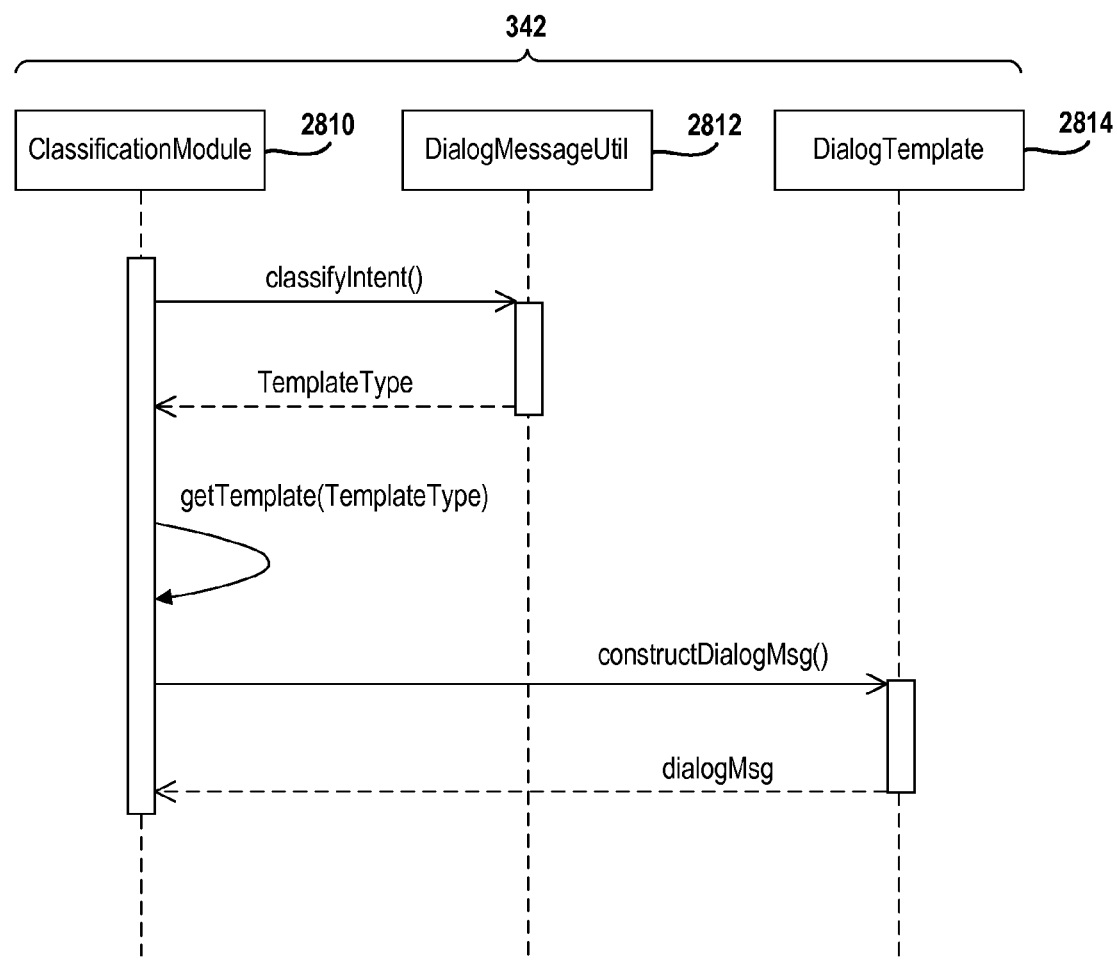
FIG. 28B is a sequence diagram of the operation of the dialog manager.

Referring now to FIG. 28B, a state diagram of the operation of the dialog manager 2830 is set forth. In this example, the classification module 2810 uses the dialog message utility module 2812 to classify the intents received from the language processing module. A template type is returned from the dialog message utility module to the classification module. The template may then be retrieved using a template identifier returned from the template type. The classification module may then use the dialog template construction module 2814 to apply or combine the template with the intents from the language processing module.

Figure 29:
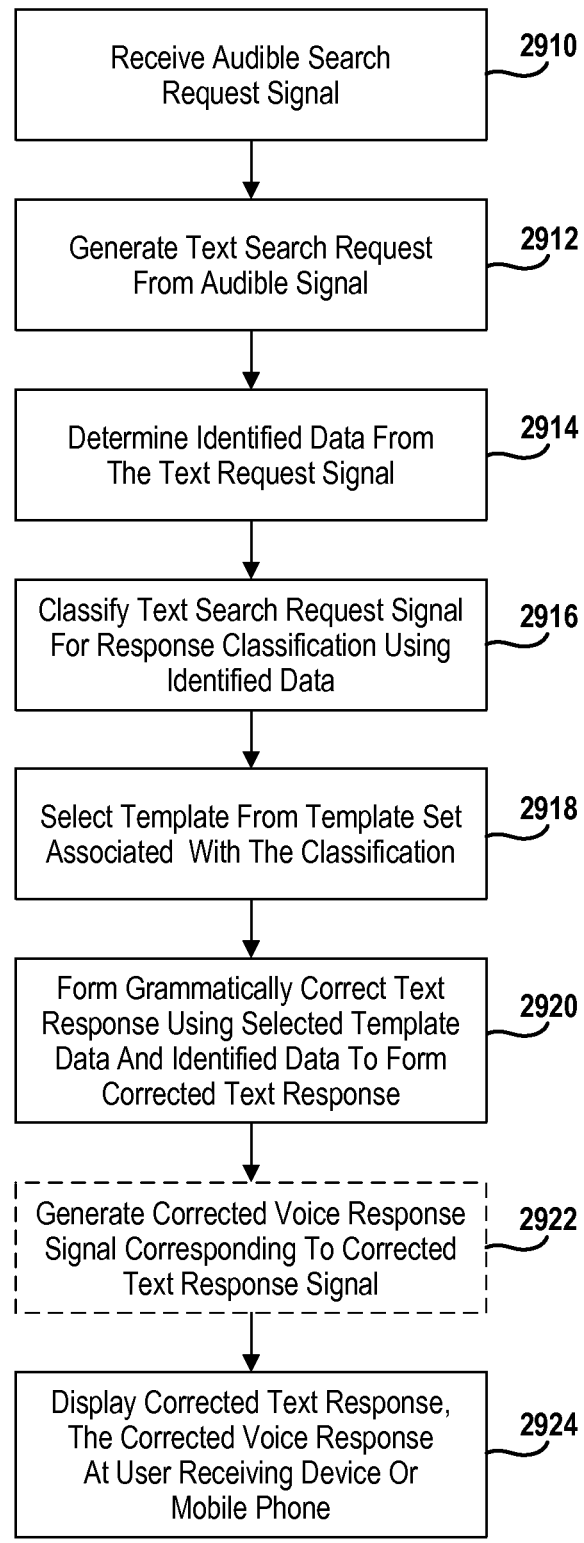
FIG. 29 is a flow chart of the operation of the dialog manager.

Referring now to FIG. 29, the method for operating the dialog manager is set forth. In step 2910 an audible search request signal is received at the language processing module. The search request may originate from an audibly requested search as described above. A text search request is generated from the audible search request. That is, the audible or received audible signal is converted into textual signals as described above. After step 2912, step 2914 determines identified data from the text request signal. As mentioned above, various categories of identified data may be determined. Unimportant words, such as, an article (a, an, the) may be unimportant.

Based upon the identified data, the text request signal is classified into a particular response classification in step 2916. Examples of response classifications are described above. In step 2918 one template is selected from the set of templates associated with the response classification. Templates are illustrated in FIG. 30 below. The templates comprise sentence portions to which search data is added to form the corrected response such as a grammatically corrected response.

In step 2920 the template and the identified data are used to form a grammatically correct text response. One example of a grammatically corrected text response may be "I have identified 25 programs on HBO tonight."

In step 2922 an optional step of converting the corrected text response signal into a corrected voice or audible response signal is performed. This may be performed as a dialog manager or at another module such as the voice converter 2508 illustrated in FIG. 25. The corrected voice or audible response signal is generated from the corrected text response signal.

In step 2924 either the corrected text response signal or the corrected voice response signal or both are communicated to a device such as a user receiving device or mobile phone. The user receiving device or mobile phone displays the corrected text response, the corrected voice response or both that is, the user receiving device or mobile phone may generate an audible signal or a visual signal corresponding to the corrected response signal.

Referring now to FIG. 30, various templates are illustrated for use with various requests. Other rules may apply to the first template or other templates, such as if only "genre" is present to pluralize or if "genre" is present without media type add "programs." Other rules may include if only media type is present pluralize. If both genre and media type are present pluralize the media type. If neither genre nor media type are present use generic term "programs."

The templates are filled with words or intents from the request and data from the search results. The first three rows 3012 of the template table 3010 illustrate the first classification being title/sports based team/person NOT present classification. In the first example "find me dramas about time travel" was entered. The template results are as follows: the verb phrase corresponds to "I found", the count is the count of the titles available from the search which states "12 results found", the genre is "drama", the description "with time travel" is also provided. Thus, the grammatically corrected sentence "I found 12 results for dramas with time travel" is returned back to the user display. In the next example "find me something to watch tonight" returns "Here are" as the verb phrase, "5 results for" as the count, the media type is "programs" and the airing time is "airing tonight." Thus, the result of "find me something to watch tonight" provides the results "here are 5 results for programs airing tonight."

The third row of the first classification 3012 describes a request "find any comedy movies on HBO." The results are "I found" as a verb phrase, "10 results for" as the count, the genre is "comedy", the media type is "movies", the channel is "HBO" and "airing tonight" is the airing time or date. Thus, the result is "I found 10 results for comedy movies on HBO airing tonight."

In the second section 3014 of the Table 3010 the "title and/or sports team is the subject" is the classification. In the first row of the second section "find The Godfather with the line about the cannoli" is requested. "I found" is returned as the verb phrase, "1 result for" is returned as the count, "The Godfather" is returned as the title and, "with 'the line about the cannoli'" is returned for the description. Thus, the result is "I found 1 result for The Godfather with the line about the cannoli." In the second line of the second section 3014 of the Table 3010, "find the Tigers' game that starts at 1:05 tomorrow" is the request. The results are "I found" as the verb phrase, "2 results for" as the count, "Tigers" as the sports team, and "airing at 1:05 tomorrow" as the time. Thus, the grammatically correct result is "I found 2 results for Tigers airing at 1:05 tomorrow."

In the third line of the second section 3014 of the Table 3010 "when are the Pistons playing" is entered. The returned result is "I found" as the verb phrase, "1 result for" as the count and "Pistons" as the sports team. Thus, the result is "I found 1 result for Pistons." The fourth row of the second section 3014 of the table has the request "find the U of M Football game." The verb phrase is "I found", the count is "1 result for", the sports team "U of M" is returned. Thus, the result is "I found 1 result for U of M."

In the third section 3016 of the Table 3010, the person is the only subject. In the first line of the third section "find Brad Pitt" is the request. "I found" is the verb phrase, "1 result for" is the count, "Brad Pitt" is the person. Thus, the grammatically correct result is "I found 1 result for Brad Pitt."

In the second row of the third section of the Table 3010 "find me movies with Ben Stiller tomorrow" returns "I found" as the verb phrase, "6 results for" as the count, "Ben Stiller" as the person, "movies" as the media type and "airing tomorrow" as the airing time. Thus, the final result is "I found 6 results for Ben Stiller movies airing tomorrow".

The third row of the third section 3016 of the Table 3010 describes "find Clair Danes on HBO." The verb phrase "I found", "10 results for" as the count, "Claire Danes" as the person and "on HBO" as the channel is returned. Thus, the grammatically corrected sentence is "I found 10 results for Claire Danes on HBO."

In the last section 3020 of the Table 3010, a disambiguation for channel classification is determined. "Find HBO" is the request. "I found" is the verb phrase, "3 results for" is the count and "HBO" is the channel. Thus, the final result is the grammatically correct sentence "I found 3 results for HBO."

It should be noted that the actual search listings of the context may be displayed on the screen display along with the corrected text result.

Figure 31:
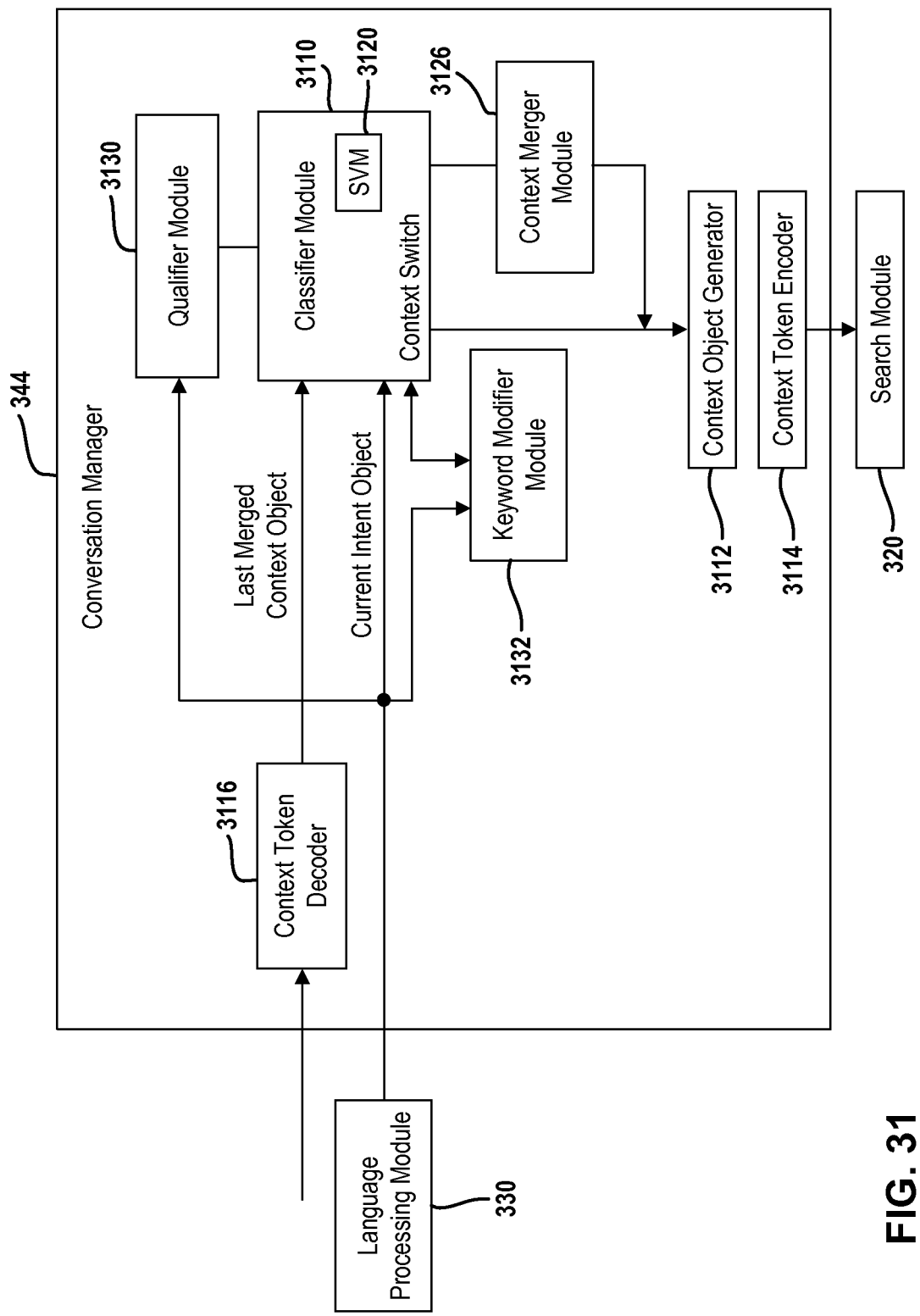
FIG. 31 is a block diagrammatic view of the conversation manager of the present disclosure.

Referring now to FIG. 31, a detailed bock diagrammatic view of the conversation manager 344 is set forth. Ultimately the conversion manager 344 determines whether a second request is related to a previous request. If there is no relationship a context switch is generated. If the current search and a previous search are related a context merger is performed as will be described below. When the first and second requests are related, the search module 320 uses the intents or intent objects for both search requests in the formulation of a search query. For example, if an audible signal such as "give me comedies" returns more than 200 results, a user may say "for channel 7." Clearly this is a continuing utterance and thus the narrowing of comedy movies only to those on channel 7 may be provided as a result of the search request. This prevents the user from repeating the entire query again. Multiple queries may be referred to as a conversation. Another example of a continuing conversation may be "show me comedy movies", "only those with Ben Stiller", "find those on tonight". These three queries are part of the same conversation. However, if the user then states "show me auto racing programs" the context has been switched and a new conversation will be generated. One modification of the auto racing program may be "how about Formula One" which narrows the previous auto racing request to only those of Formula One.

In the following description, a "last merged" context object refers to prior search results. In the following example, a first search and a second search will be described. However, multiple related searches may be performed as mentioned above. For example, after a first search and a second search are determined to be continuing, the continuing searches may have the intents combined into a last merged context object. The last merged context object may then be used with the intents of a third search request to determine if the third search request and the last merged context object are related.

The conversation manager 344 receives an initial search request which is processed to perform a search. A classifier module 3110 receives the intents objects from the language processing module 330. The classifier module, because there are no last merged context objects, refers to the classification of the first search as a context switch and communicates the context switch signal to the search module 320 which then performs the search based upon the intents in the current or first search request.

In a first example, a received text signal at the language processing module 330 is determined as "show me action movies on HBO tonight." The intents of the request are as follows:

Literal: [IntentSearch] show me [/IntentSearch] [Genre] action [/Genre] [MovieInfo] movies [/MovieInfo] [filler] on [/filler] [Station] HBO [/Station] [Time] tonight [/Time]
  Media type: movies
  Genre: action/adventure
  Time: 1900
  Station: HBO.

After the classifier module classifies the initial search request as a context switch a context object generator 3112 generates a context object from the intents objects received. A context token encoder 3114 encodes the context object from generator 3112 into an encoded context token. The context token that has been encoded in the encoder 3114 is communicated to a user device for use in subsequent requests.

In a second search, the context token is communicated along with the voice or audible signal to the language processing module 330. The context token is decoded in the context token decoder 3116. The context token decoder provides the context object corresponding to the token. This may be referred to as the last merged context object. The last merged context object may be a combination of all prior related search requests in the conversation that have occurred after a context switch. The last merged context object is provided to the classifier module 3110. The classifier module 3110 may use a support vector machine 3120 or other type of classification to determine whether the last merged context object and the current intent object are related. Details of the support vector machine 3120 will be described below.

When the classifier module 3110 determines that the first search request and the second search request are related, the context merger module 3126 merges the intents of the current intent object and the intents of the last merged content object. The merger may not be a straight combination when intents of the same type are found. For example, if action movies having an intent object under genre of a movie were included in the last merged content object and a second search includes "comedy as the genre", the context merger module would overwrite the first intent "action" under genre with the "comedy" genre in the second occurrence. In another example, a first search request such as "show me action movies" may be received. Because this is a first request movie, action is used in the intents for the current request and the intents for the last merged request. Thereafter, "that are on HBO tonight" is received. The current intent objects are "HBO" and "tonight." These actions are determined to be a continuance of the search. The context merger module 3126 will thus have the intents "movie, action, HBO, and tonight." These merged elements may be provided to the search module as a context object. When the second request for a search was received, the last merged context object of "movie, action" was received as a context token. If the search request was not related a new context object may have been generated.

A qualifier module 3130 may also be used to qualify or adjust the search results at the classifier module. The qualifier module 3130 monitors the current intent object and determines if any qualifier words or a combination of words are provided therein. The qualifier module 3130 may adjust the classification or weight as whether the context is switched or whether the search intents are combined. A description of the operation of the qualifier module 3130 will be set forth below.

A keyword modifier module 3132 may also be included within the conversation manager 344. The keyword modifier module also reviews the current intent object to determine if any keywords are provided. The keyword modifier module 3132 may modify the classification in the classification module 3110. An example of the keyword modifiers will be provided below.

Figure 32:
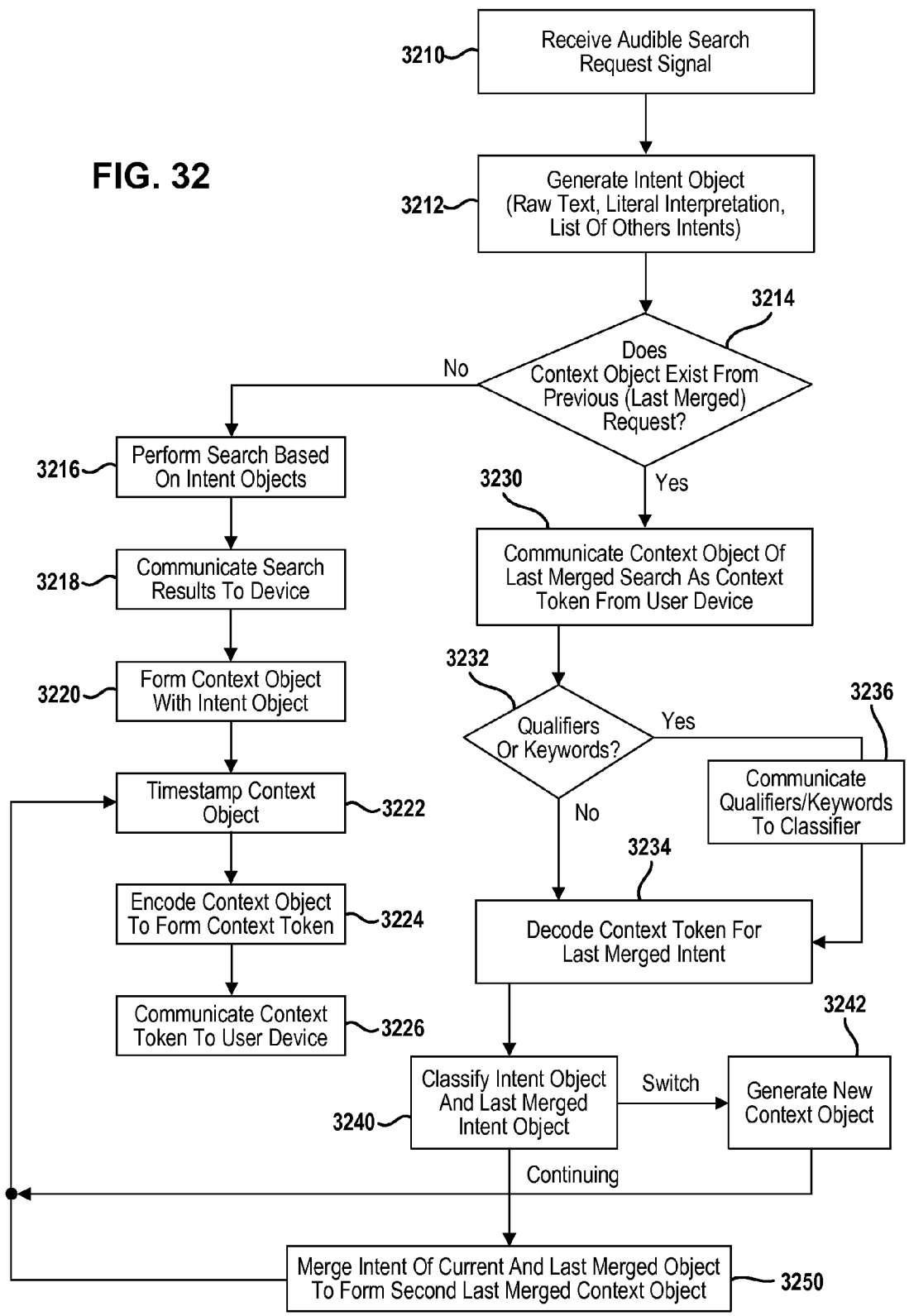
FIG. 32 is a flow chart of a method for classifying according to the present disclosure.

Referring now to FIG. 32, a detailed flow chart of the operation of the conversation manager 344 above is set forth. In step 3210 the audible search request signal is received. In step 3212 an intent object is generated. The intent object, as described above, may include the raw text, a literal interpretation and a list of other intents. The intent object may be determined in the language processing module.

In step 3214 if the request was not a first request, a previous content object would not be present. Step 3214 detects whether the context object exists from the previous or last merged request. If no context object exists in the audible search request signal, step 3216 is performed after step 3214. In step 3216 a search is performed based on the intent objects of the search request as identified by the language processing module 3030. In step 3218 the search results may be communicated to a device such as a requesting device. In one example, the requesting device may be a mobile device. The requesting device may also be a user receiving device such as a set top box.

In step 3220, a context object is formed with the intent objects determined above. In step 3222 the context object may be time stamped. That is, a time stamp may be associated with or stored within the context object.

In step 3224, the context object may be encoded to form a context token. In step 3226 the context token may be communicated to the user device to be used in a subsequent request.

Referring back to step 3214, when the context object exists from a previous request step 3230 is performed. In step 3230 the context object of the last merged search is communicated as a context token from a user device or requesting device. In step 3232 it is determined whether there are any qualifiers. The qualification process will be described below. Qualifiers or keywords may be added to influence the classification determination or weight therein. The qualifiers or keywords are determined from the current request for search results.

After step 3234, the intent object and the last merged intent objects are classified. As described above, the classification may use various types of classification, including support vector machines.

Referring back to step 3232, when qualifiers or keywords are present, step 3236 communicates the qualifiers or keywords to the classifier. After step 3236 the context token for the last merged intent may be decoded for use. After step 3234, step 3240 classifies the intent object and the last merged intent object. The intent of the first search and the intent of the second search may be classified relative to each other. The qualifiers or keywords may also be used for adjustment in the classification process. Essentially if there is a large correlation the search requests are related. If there is a low correlation the current search and the last merged search results are not related. When the search results are not related a new context object is generated in step 3242. After step 3242 the new context object is time stamped, encoded and communicated to the user device in steps 3222 through 3226 respectively.

After step 3240 if the intent object and the last merged object are continuing step 3250 is performed that merges the intents of the current object and the last merged object to form a second last merged content object. The second last merged content object is time stamped, encoded and communicated to the user device in steps 3222 through 3226, respectively.

Figure 33:
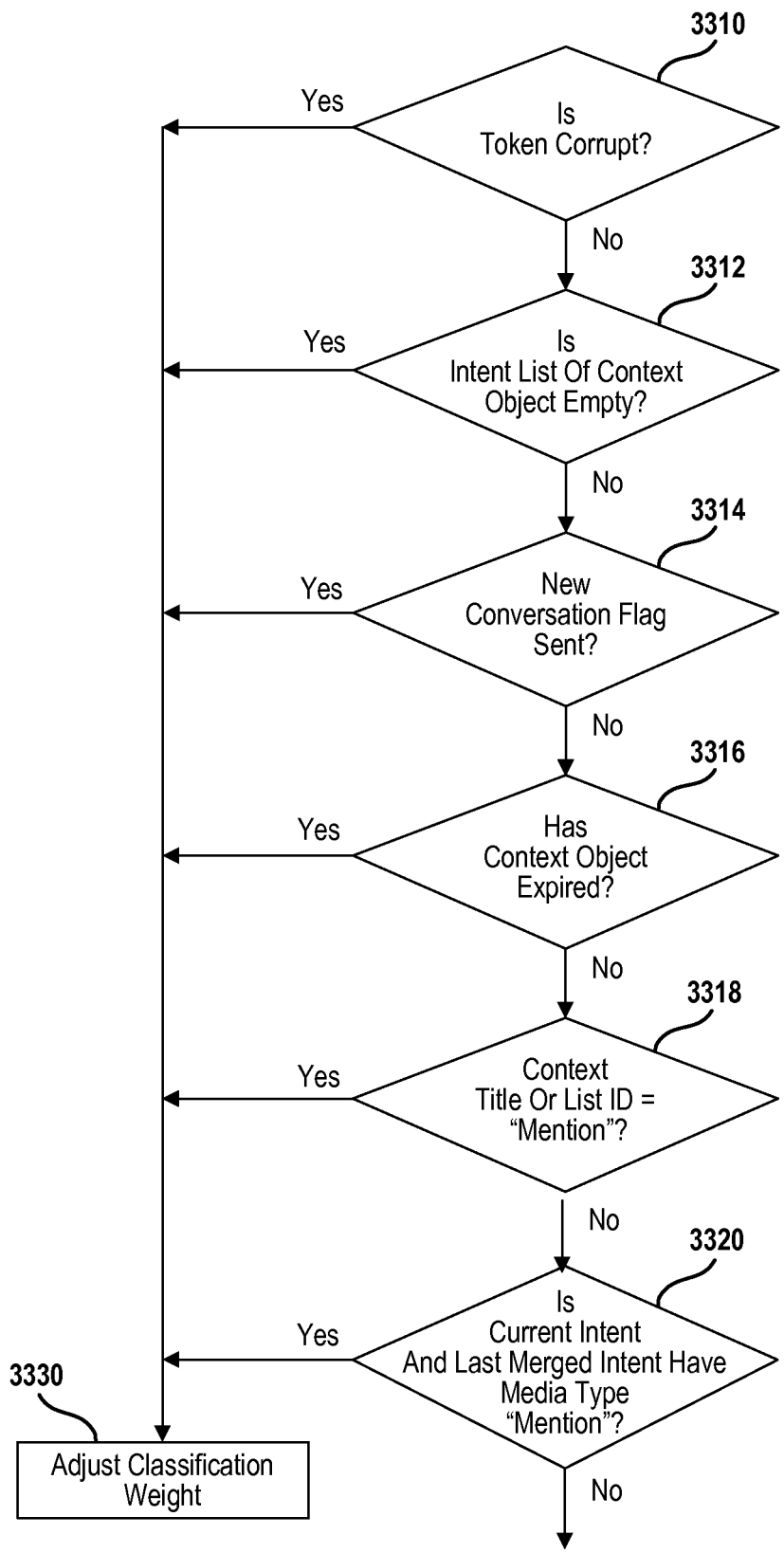
FIG. 33 is a flow chart of qualifiers for classification.

Referring now to FIG. 33, a plurality of augmentations to the switching rules is provided. Steps 3310-3320 set forth below may be included within the qualifiers or keyword block 3132 above. In step 3310 it is determined whether the token is corrupt. In step 3312 it is determined whether the intent list of the context objects are empty. In step 3314 it is determined whether a new conversation flag has been sent. In some embodiments, the user may use a user interface or voice interface to indicate a new conversation is being introduced. When a new conversation is being introduced a conversation flag may be sent. In step 3316 it is determined whether a context object has expired. As mentioned above, a time stamp may be associated with a context object and therefore the context object time stamp may be compared with the current time. If the time is greater than a predetermined time, then the context object is expired. Step 3318 determines whether the title or list identifier is "mention." This may be used as a training or other type of classification aid. In step 3320 it is determined whether the current intent or the last merged intent the media type mentioned therein. If either has "mention" as the media type a classification weight or relatedness is adjusted. If any of the answers to the queries 3310-3320 are affirmative, the classification weight or relatedness of the search request is adjusted in step 3330. In some cases, such as the token being corrupt or if the new conversation flag is sent, the weight may be adjusted so that a new context object is generated from the current search results. That is, a context switch may be indicated if the above queries are affirmative.

Figure 34:
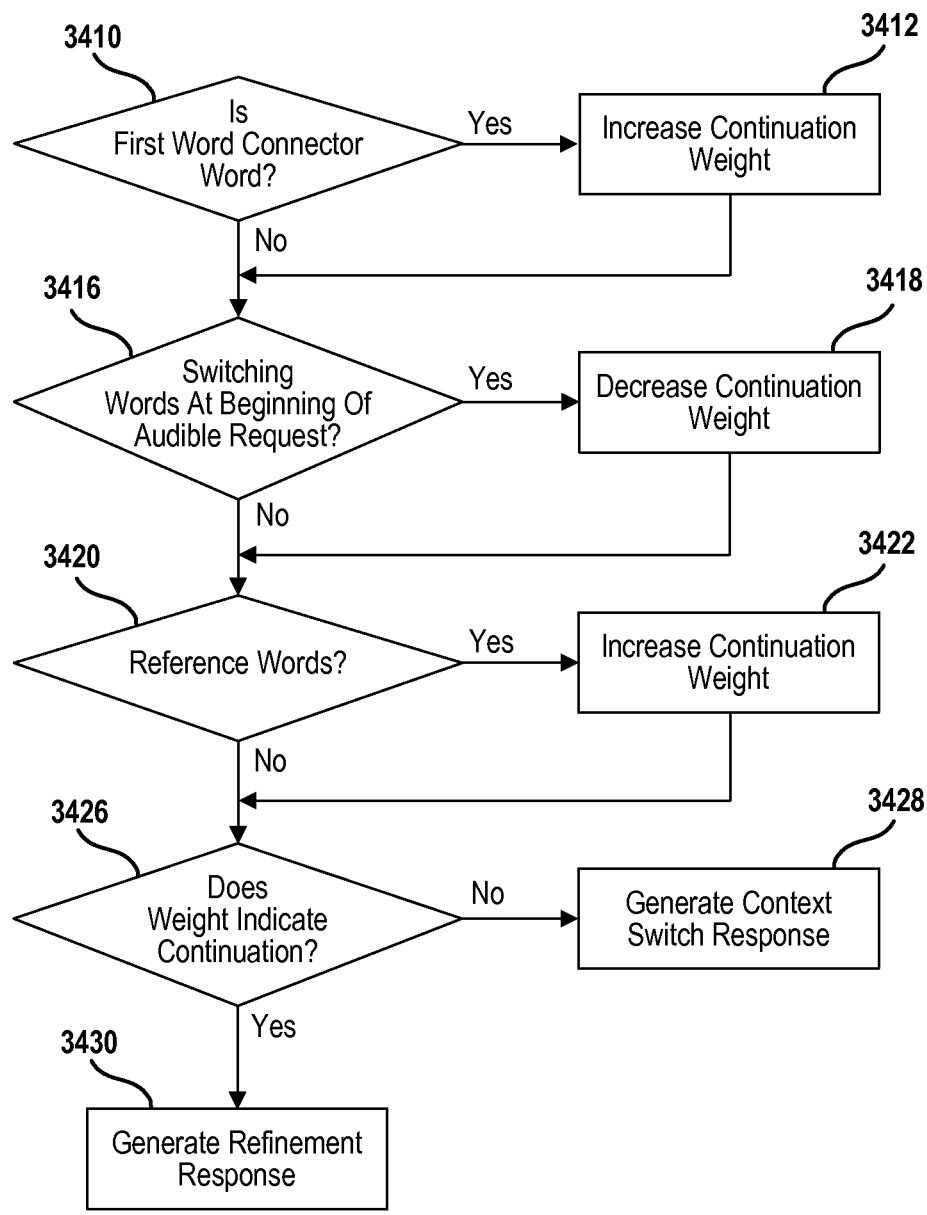
FIG. 34 is a flow chart of a method for correlating classification.

Referring now to FIG. 34, more qualifiers are used to adjust the weight determined within the classifying process. In step 3410 if the first word is a connector word such as "only", "just" or "how about" the weight (or correlation) may be increased toward a continuation in step 3412. After steps 3410 and 3412, step 3416 determines whether there are switching words at the beginning of the voice command. Switching words may include "what" such as in "what is only on tonight" or even the word "only". When switching words are present, step 3418 decreases the continuation weight toward a context switch. After step 3416 and 3418, step 3420 determines if there are any reference words. If there are reference words "the ones" step 3422 increases the continuation weight. The reference words may cancel the effect of switching words. After steps 3420 and 3422, step 3426 determines whether the weight indicates a continuation or refinement response. In step 3426 when the weight does indicate a continuation, a refinement response is generated in step 3428. When the weight does not indicate a continuation a switch response is generated in step 3430.

The details of the support vector machines (SVMs) are set forth. SVMs are supervised learning models with associated learning algorithms that analyze data and recognize patterns, used for classification and regression analysis. The basic SVM takes a set of input data and predicts, for each given input, which of two possible classes forms the output, making it a non-probabilistic binary linear classifier. Given a set of training examples, each marked as belonging to one of two categories, a SVM training algorithm builds a model that assigns new examples into one category or the other. A SVM model is a representation of the examples as points in space, mapped so that the examples of the separate categories are divided by a clear gap that is as wide as possible. New examples are then mapped into that same space and predicted to belong to a category based on which side of the gap they fall on.

In addition to performing linear classification, SVMs can efficiently perform non-linear classification using what is called the kernel trick, implicitly mapping their inputs into high-dimensional feature spaces.

In the present example with conversation refinement, each utterance or audible signal that is converted to an intent object contains a set of input data (previously referred to as "Intents" or "Mentions", for example media type, genre, actors, etc. . . . ). Given two intent objects, the second intent may be classified as either a refinement of the first intent or a completely new intent for which a new conversation (context switching) may be performed. The Support Vector Machine (SVM) 3120 of FIG. 31 is the module that processes the "mentions" from both sets of intents to make this happen. It can provide a classification because the new intents are compared against a previously trained model.

Figure 35A:
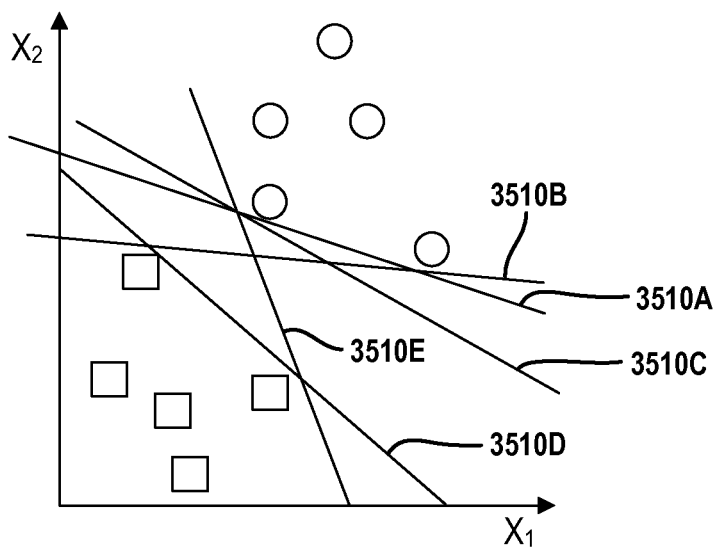
FIGS. 35A and 35B are examples of support vector machines illustrating a plurality of hyperplanes.
Figure 35B:
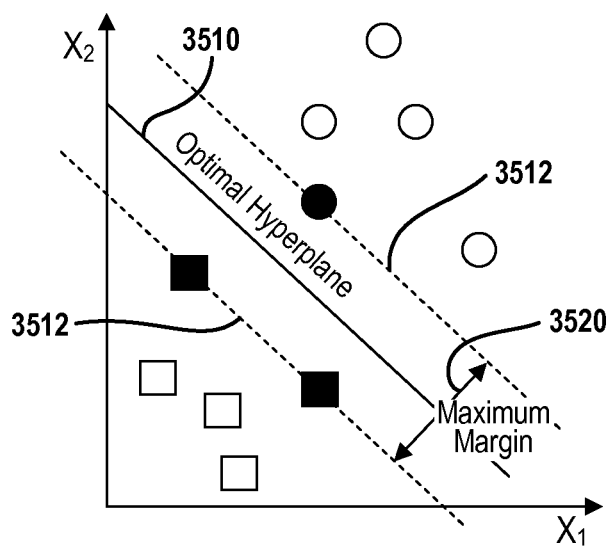

A Support Vector Machine (SVM) 3120 is a discriminative classifier formally defined by a separating hyperplane 3510. In other words, given labeled training data (supervised learning), the algorithm outputs an optimal hyperplane, which can be used later to categorize new examples. This hyperplane is called the optimal decision boundary or optimal decision surface. This is illustrated in FIGS. 35A and 35B. FIG. 35A shows possible hyperplanes 3510A-E relative to various data points.

In general, SVM is a linear learning system that builds two-class classifiers. Let the set of n training examples be $$T=\{(x_1,y_1),(x_2,y_2),\ldots,(x_n,y_n)\},$$

where $x_1=(x_{i1}, x_{i2}, \ldots, x_{ik})$ is a k-dimensional input vector, and the corresponding $y_1$ is its class label which is either 1 or −1. 1 denotes the positive class and −1 denotes the negative class.

To build a classifier, SVM finds a linear function of the form $$f(x)=\langle w \cdot x \rangle + b$$

so that an input vector $x_i$ is assigned to the positive class if $f(x_i) \geq 0$ and to the negative class otherwise, i.e., $$y_i = \begin{cases} 1 & \text{if } \langle w \cdot x_i \rangle + b \geq 0 \\ -1 & \text{if } \langle w \cdot x_i \rangle + b < 0 \end{cases}$$

Vector w defines a direction perpendicular to the hyperplane, $w=(w_1, w_2, \ldots, w_k)$.

If the two classes are linearly separable, there exist margin hyperplanes 3512 that well divide the two classes. In this case, the constraints can be represented in the following form:

$$\langle w \cdot x_i \rangle + b \geq 1 \text{ if } y_i = 1$$

$$\langle w \cdot x_i \rangle + b \leq -1 \text{ if } y_i = -1$$

$$\text{or } y_i(\langle w \cdot x_i \rangle + b) \geq 1, i=1,\ldots,n$$

The width of the margin is $$\frac{2}{\|w\|} = \frac{2}{\sqrt{\langle w \cdot w \rangle}} = \frac{2}{\sqrt[2]{w_1^2 + w_2^2 + \ldots + w_k^2}}$$

SVM looks for the separating hyperplane that maximizes the margin, hence the training algorithm boiled down to solving the constrained minimization problem, i.e. finding w and b that:

Minimize:

$$\frac{\langle w \cdot w \rangle}{2}$$

Subject to the n constraints:

$$y_i(\langle w \cdot x_i \rangle + b) \geq 1, i=1,\ldots,n$$

This optimization problem is solvable using the standard Lagrangian multiplier method.

Figure 36:
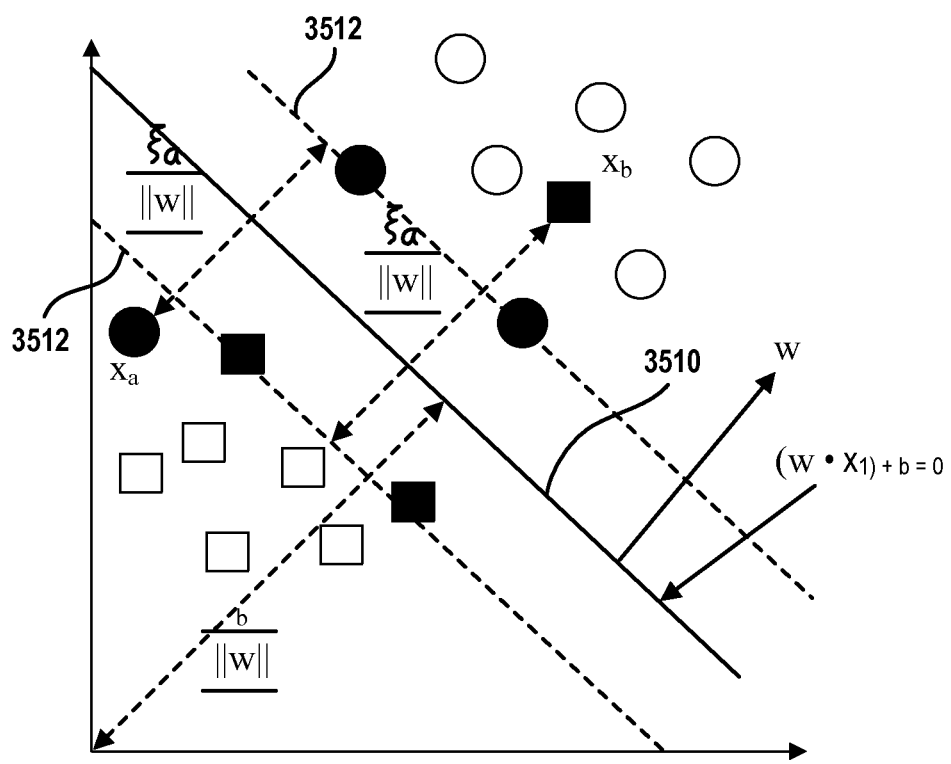
FIG. 36 is a plot of a non-separable data.

In practice, the training data is generally not completely separable due to noise or outliers. This is illustrated in FIG. 36.

To allow errors in data, the margin constraints are relaxed by introducing slack variables, $\xi \geq 0$ as follows:

$$\langle w \cdot x_i \rangle + b \geq 1 - \xi_i \text{ for } y_i = 1$$

$$\langle w \cdot x_i \rangle + b \leq -1 + \xi_i \text{ for } y_i = -1$$

Thus the new constraints are subject to: $y_i (\langle w \cdot x_i \rangle + b) \geq 1 - \xi_i$, i=1, . . . , n A natural way is to assign an extra cost for errors to change the objective function to Minimize:

$$\frac{\langle w \cdot w \rangle}{2} + C \sum_{i=1}^{n} \xi_i$$

where $C \geq 0$ is a user specified parameter.

Again, this is solvable using the standard Lagrangian multiplier method. Once w and b are specified, a new vector $x_*$ may classified based on $\text{sign}(\langle w \cdot x_* \rangle + b)$.

Figure 37:
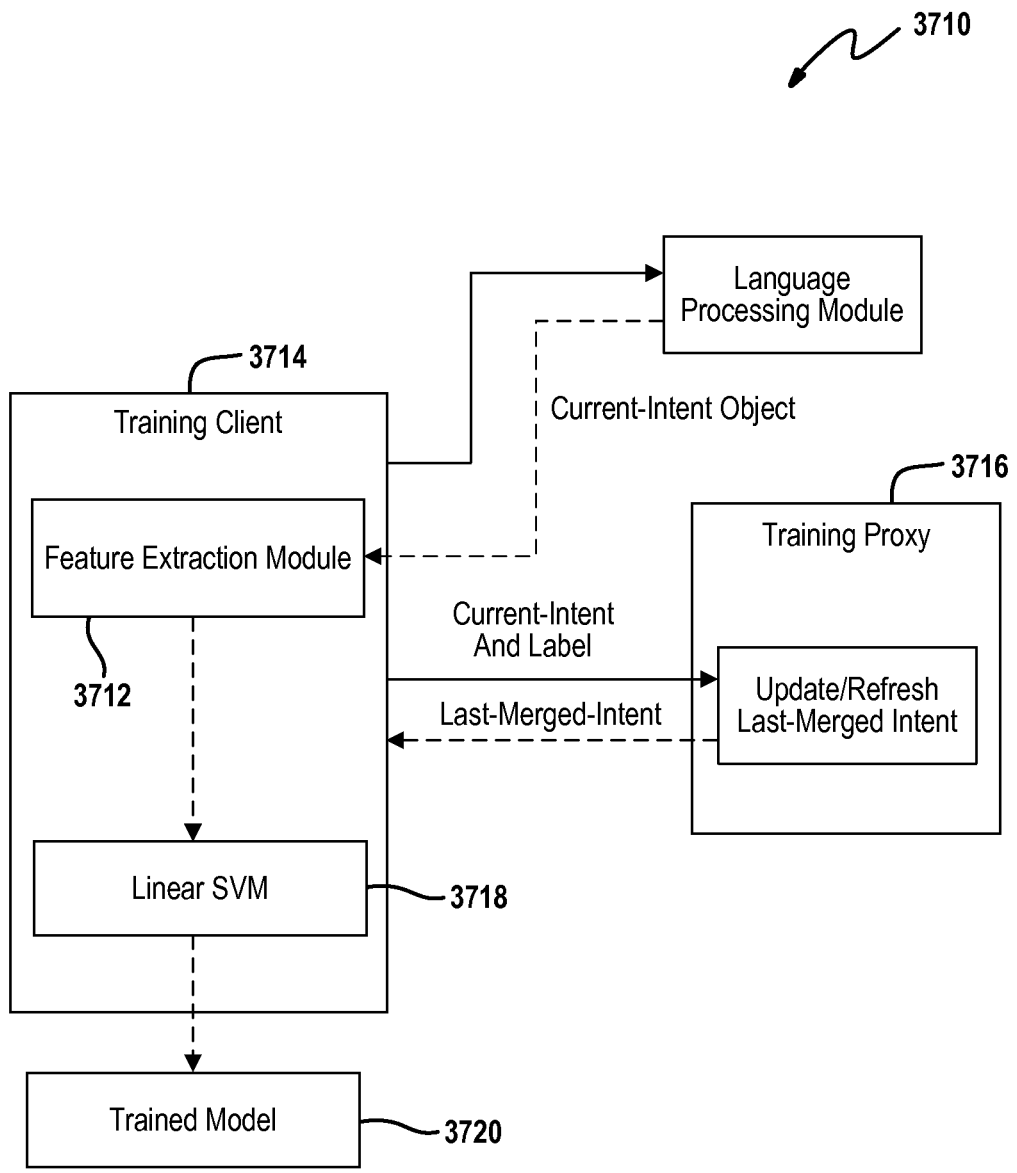
FIG. 37 is a high level flow chart of a method for training a classification system.

Referring now to FIG. 37, offline training may be used to refine the classifier using different input data. An offline training tool 3710 loads each utterance or voice command in the training dataset and sends it to the language processing module 330 to obtain the current-intent. The most recent last-merged-intent and the current-intent are then used for feature extraction of this training utterance in the feature extraction module 3712 of the training client 3714.

The received current-intent is also sent to the local training proxy 3716 together with its label, i.e. true or false (refinement/switch) in order to update or refresh the last-merged-intent for the next round feature extraction of the following utterance.

For feature following data and mentions from both last-merged-intent and current-intent are considered: literal, channel, content, rating, date, day, time, episode, genre, mediaType, qualityRating, source, title, stations, credit, season, intent, sportTeam, sportLeague and keywordText.

From these inputs, for each training command i, a feature vector $x_i$ that comprises of 36 binary components may generated in Table 1.

TABLE 1

| No | Feature | Value | Description |
|----|---------|-------|-------------|
| 1 | channel | 0 | =0 if the current-intent channel is empty |
| | | 1 | =1 if the current-intent channel has value |
| 2 | contentRating | 0 | =0 if the current-intent contentRating is empty |
| | | 1 | =1 if the current-intent contentRating has value |
| 3 | date | 0 | =0 if the current-intent date is empty |
| | | 1 | =1 if the current-intent date has value |
| 4 | day | 0 | =0 if the current-intent day is empty |
| | | 1 | =1 if the current-intent day has value |
| 5 | time | 0 | =0 if the current-intent time is empty |
| | | 1 | =1 if the current-intent time has value |
| 6 | episode | 0 | =0 if the current-intent episode is empty |
| | | 1 | =1 if the current-intent episode has value |
| 7 | genre | 0 | =0 if the current-intent genre is empty |
| | | 1 | =1 if the current-intent genre has value |
| 8 | mediaType | 0 | =0 if the current-intent mediaType is empty |
| | | 1 | =1 if the current-intent mediaType has value |
| 9 | qualityRating | 0 | =0 if the current-intent qualityRating is empty |
| | | 1 | =1 if the current-intent qualityRating has value |
| 10 | source | 0 | =0 if the current-intent source is empty |
| | | 1 | =1 if the current-intent source has value |
| 11 | title | 0 | =0 if the current-intent title is empty |
| | | 1 | =1 if the current-intent title has value |
| 12 | station | 0 | =0 if the current-intent station is empty |
| | | 1 | =1 if the current-intent station has value |
| 13 | credit | 0 | =0 if the current-intent credit is empty |
| | | 1 | =1 if the current-intent credit has value |
| 14 | season | 0 | =0 if the current-intent season is empty |
| | | 1 | =1 if the current-intent season has value |
| 15 | intent | 0 | =0 if the current-intent itent is empty |
| | | 1 | =1 if the current-intent intent has value |
| 16 | sportTeam | 0 | =0 if the current-intent sportTeam is empty |
| | | 1 | =1 if the current-intent sportTeam has value |
| 17 | connectorWord | 0 | =0 if there is no connector word in [filler], [description] tag of current-intent literal |
| | | 1 | =1 if there exists connector words in [filler], [description] tag of current-intent literal |
| 18 | thisTag | 0 | =0 if there is no [this] tag in current-intent literal |
| | | 1 | =1 if [this] tag exists in current-intent literal |
| 19 | channelLast | 0 | =0 if the last-merged-intent channel is empty |
| | | 1 | =1 if the last-merged-intent channel has value |
| 20 | contentRatingLast | 0 | =0 if the last-merged-intent contentRating is empty |
| | | 1 | =1 if the last-merged-intent contentRating has value |
| 21 | dateLast | 0 | =0 if the last-merged-intent date is empty |
| | | 1 | =1 if the last-merged-intent date has value |
| 22 | dayLast | 0 | =0 if the last-merged-intent day is empty |
| | | 1 | =1 if the last-merged-intent day has value |
| 23 | timeLast | 0 | =0 if the last-merged-intent time is empty |
| | | 1 | =1 if the last-merged-intent time has value |
| 24 | episodeLast | 0 | =0 if the last-merged-intent episode is empty |
| | | 1 | =1 if the last-merged-intent episode has value |
| 25 | genreLast | 0 | =0 if the last-merged-intent genre is empty |
| | | 1 | =1 if the last-merged-intent genre has value |
| 26 | mediaTypeLast | 0 | =0 if the last-merged-intent mediaType is empty |
| | | 1 | =1 if the last-merged-intent mediaType has value |
| 27 | qualityRatingLast | 0 | =0 if the last-merged-intent qualityRating is empty |
| | | 1 | =1 if the last-merged-intent qualityRating has value |
| 28 | sourceLast | 0 | =0 if the last-merged-intent source is empty |
| | | 1 | =1 if the last-merged-intent source has value |
| 29 | titleLast | 0 | =0 if the last-merged-intent title is empty |
| | | 1 | =1 if the last-merged-intent title has value |
| 30 | stationLast | 0 | =0 if the last-merged-intent station is empty |
| | | 1 | =1 if the last-merged-intent station has value |
| 31 | creditLast | 0 | =0 if the last-merged-intent credit is empty |
| | | 1 | =1 if the last-merged-intent credit has value |
| 32 | seasonLast | 0 | =0 if the last-merged-intent season is empty |
| | | 1 | =1 if the last-merged-intent season has value |
| 33 | intentLast | 0 | =0 if the last-merged-intent intent is empty |
| | | 1 | =1 if the last-merged-intent intent has value |
| 34 | sportTeamLast | 0 | =0 if the last-merged-intent sportTeam is empty |
| | | 1 | =1 if the last-merged-intent sportTeam has value |
| 35 | genreComp | 0 | =0 if the last-merged-intent genre and the current-intent genre both have values and are the same, or if at least one of them is empty |
| | | 1 | =1 if the last-merged-intent genre and the current-intent genre both have values and are the different |
| 36 | mediaTypeComp | 0 | =0 if the last-merged-intent mediaType and the current-intent mediaType both have values and are the same, or if at least one of them is empty |
| | | 1 | =1 if the last-merged-intent mediaType and the current-intent mediaType both have values and are the different |

Once the list of feature vectors associated with their labels (1 for switch and −1 for refinement) are generated, it is passed through the linear SVM training module 3718 to obtain the trained mode 3720, which includes the weight vector w and the scalar (real) value b. In the current training module, the user specified parameter C=20 which is currently optimal for our training set is used.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   receiving a first search request having first identified data from a first device;
   after receiving the first search request, receiving a second search request having second identified data from the first device;
   classifying the first search request as related to the second search request or not related to the second search request in an electronic classifier module by correlating at least some of the first identified data and at least some of the second identified data;
   when the first search request is related to the second search request in response to classifying, electronically combining the first identified data of the first search request and the second identified data of the second search request to form a merged search request;
   performing a second search at an electronic search module based on the merged search request to form search results; and
   electronically communicating the search results to the first device.

2. The method as recited in claim 1 further comprising after receiving the first search request, performing a first search for content to obtain first search results.

3. The method as recited in claim 2 further comprising displaying the first search results on a display at the first device.

4. The method as recited in claim 2 further comprising displaying the first search results on a display at the first device, said first device comprising a mobile device.

5. The method as recited in claim 2 further comprising after the first search generating a first context object.

6. The method as recited in claim 5 wherein generating the first context object comprises generating the first context object from intent objects identified from the first search request.

7. The method as recited in claim 6 wherein the intent objects comprise at least one of media type, genre, channel, content rating, date, episode, title and team.

8. The method as recited in claim 5 further comprising generating a first context token from the context object.

9. The method as recited in claim 5 further comprising generating a first encrypted context token from the context object.

10. The method as recited in claim 9 further comprising communicating the first encrypted context token and the second search request to a conversation manager.

11. The method as recited in claim 10 further comprising decrypting the first encrypted context token in the conversation manager to form the context object having first intents therein and wherein the second search request comprises second intents.

12. The method as recited in claim 11 wherein classifying comprises classifying the first intents relative to the second intents.

13. The method as recited in claim 12 wherein combining the first search request and the second search request comprises combining the first intents and the second intents to form a second context object comprising the first intents and the second intents.

14. The method as recited in claim 12 further comprising when the first search is not related to the second search, generating a second context object including the second intents.

15. The method as recited in claim 12 wherein classifying the first search request and the second search request comprises classifying the first search request relative to the second search request using a support vector machine.

16. The method as recited in claim 12 further comprising adjusting classifying in response to a qualifier word in the second search request.

17. The method as recited in claim 16 wherein adjusting comprises adjusting classifying in response to a connector word in the second search request.

18. The method as recited in claim 16 wherein adjusting comprises adjusting classifying in response to a switching word in the second search request.

19. The method as recited in claim 16 wherein adjusting comprises adjusting classifying in response to a reference or key word in the second search request.

20. A system comprising:
   a head end comprising:
   a conversation manager receiving a first search request having first identified data from a first device and, after receiving the first search request, receiving a second search request having second identified data from the first device;
   a classifier module within the conversation manager classifying the first search request related to the second search request or not related the second search request by correlating at least some of the first identified data and at least some of the second identified data;
   a context merger module within the classifier module combining the first identified data of the first search request and the second identifier data of the second search request to form a merged search request;
   a search module performing a second search based on the merged search request to form search results; and
   said head end electronically communicating the search results to the first device.

21. The system as recited in claim 20 wherein the search module performs a first search for content to obtain first search results after receiving the first search request.

22. The system as recited in claim 21 wherein the first device displaying the first search results on a display.

23. The system as recited in claim 21 wherein the first device comprises a mobile device that displays on a display.

24. The system as recited in claim 21 further comprising a context object generator generating a first context object after the first search.

25. The system as recited in claim 24 wherein the context object generator comprises generating intent objects from the first search request.

26. The system as recited in claim 25 wherein the intent objects comprise at least one of media type, genre, channel, content rating, date, episode, title and team.

27. The system as recited in claim 24 further comprising a context token encoder generating a first context token from the context object.

28. The system as recited in claim 24 further comprising a context token encoder generating a first encrypted context token from the context object and a wherein the first device receives the first encrypted context.

29. The system as recited in claim 28 wherein the first device communicates the first encrypted context token and the second search request to the conversation manager.

30. The system as recited in claim 29 further comprising a context token decoder decrypting the first encrypted context token to form the context object having first intents therein and wherein the second search request comprises second intents.

31. The system as recited in claim 30 wherein the classifier module classifies the first intents relative to the second intents.

32. The system as recited in claim 31 wherein the context merger module combines the first intents and the second intents to form the merged search request.

33. The system as recited in claim 31 wherein the context object generates a second context object having the second intents and not the first intents.

34. The system as recited in claim 31 wherein the classifier module comprises a support vector machine.

35. The system as recited in claim 31 wherein the classifier module adjusts classifying in response to a qualifier word in the second search request.

36. The system as recited in claim 31 wherein the classifier module adjusts classifying in response to a connector word in the second search request.

37. The system as recited in claim 31 wherein the classifier module adjusts classifying in response to a switching word in the second search request.

38. The system as recited in claim 31 wherein the classifier module adjusts classifying in response to a reference or key word in the second search request.

* * * * *